US012147186B2

(12) United States Patent
Ikegami et al.

(10) Patent No.: US 12,147,186 B2
(45) Date of Patent: Nov. 19, 2024

(54) IMAGE FORMING APPARATUS HAVING DEVELOPMENT CARTRIDGE MOVABLE BY CAM

(71) Applicant: BROTHER KOGYO KABUSHIKI KAISHA, Nagoya (JP)

(72) Inventors: Yusuke Ikegami, Nagoya (JP); Hiroshi Nakano, Nagoya (JP); Shuji Ota, Okazaki (JP); Shoichiro Nishimura, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/174,691

(22) Filed: Feb. 27, 2023

(65) Prior Publication Data

US 2023/0273567 A1 Aug. 31, 2023

(30) Foreign Application Priority Data

Feb. 28, 2022 (JP) ................................ 2022-028830
Feb. 28, 2022 (JP) ................................ 2022-028832
Sep. 27, 2022 (JP) ................................ 2022-153513

(51) Int. Cl.
*G03G 21/16* (2006.01)

(52) U.S. Cl.
CPC ..... *G03G 21/1652* (2013.01); *G03G 21/1676* (2013.01)

(58) Field of Classification Search
CPC ........... G03G 21/1652; G03G 21/1676; G03G 21/1825; G03G 21/1821; G03G 21/1814
See application file for complete search history.

(56) References Cited

U.S. PATENT DOCUMENTS

2020/0004198 A1 1/2020 Nakano et al.
2020/0301335 A1* 9/2020 Saeki ................ G03G 21/1821
2020/0301345 A1* 9/2020 Suzuki ............... G03G 21/1676
2020/0301350 A1 9/2020 Sakaguchi et al.
2020/0310281 A1* 10/2020 Haruta ............... G03G 21/1676
2020/0333727 A1* 10/2020 Sakaguchi ......... G03G 21/1676
2020/0409290 A1* 12/2020 Saeki ................ G03G 21/1814
2021/0011427 A1 1/2021 Saeki et al.

FOREIGN PATENT DOCUMENTS

JP 2020-003755 A 1/2020
JP 2020-154263 A 9/2020
JP 2021-015140 A 2/2021

* cited by examiner

*Primary Examiner* — Sandra Brase
(74) *Attorney, Agent, or Firm* — Merchant & Gould P.C.

(57) ABSTRACT

In an image forming apparatus, a development cartridge is movable between a contact position in which a development roller is in contact with a photosensitive drum and a separate position in which the development roller is separate from the photosensitive drum, by a cam and a cam follower that is caused to slide in directions parallel to a rotation axis of the cam between a push position in which the development cartridge is pushed by the cam and positioned in the separate position and a no-push position in which the development cartridge is in the contact position. The cam follower includes a first shaft and a contact arm extending from the first shaft and configured to contact a cam surface of the cam. A projection of the first shaft onto the first cam in a direction parallel to the rotation axis is positioned inside a contour of the first cam.

31 Claims, 39 Drawing Sheets

FRONT REAR

IMAGE FORMING APPARATUS HAVING DEVELOPMENT CARTRIDGE MOVABLE BY CAM

REFERENCE TO RELATED APPLICATIONS

This application claims priority from Japanese Patent Application No. 2022-028830 filed on Feb. 28, 2022, Japanese Patent Application No. 2022-028832 filed on Feb. 28, 2022, and Japanese Patent Application No. 2022-153513 filed on Sep. 27, 2022. The entire contents of the priority applications are incorporated herein by reference.

BACKGROUND ART

An image forming apparatus including a cam and a cam follower to cause a development roller to be located selectively in contact with and apart from a photosensitive drum is known in the art. The cam is rotatable about an axis. The cam follower may include a slide shaft portion slidable in directions parallel to the axis of rotation of the cam and a contact portion extending from the slide shaft portion. The cam includes a cam portion with which the contact portion of the cam follower is contactable. As the cam rotates, the cam follower is moved along the line by the cam portion between a standby position in which the development roller is kept in contact with the photosensitive drum and a protruding position in which the cam follower is pressed against the development cartridge including the development roller to locate the development roller in a position apart from the photosensitive drum.

DESCRIPTION

To downsize an image forming apparatus, compact arrangement of the cam and the cam follower is desirable. Thus, an image forming apparatus in which a cam and a cam follower are arranged in a compact manner is proposed herein.

In one aspect, an image forming apparatus disclosed herein comprises a first photosensitive drum, a first development cartridge, a first cam, and a first cam follower. The first development cartridge includes a first development roller. The first development cartridge is movable between a contact position in which the first development roller is in contact with the first photosensitive drum and a separate position in which the first development roller is separate from the first photosensitive drum. The first cam has a cam surface. The first cam is configured to rotate to thereby cause the first development cartridge to move between the contact position and the separate position. The first cam follower includes a first shaft supported slidably in directions parallel to a rotation axis of the first cam, and a contact arm extending from the first shaft to contact the cam surface of the first cam. The first cam follower is configured to be caused to slide, as the first cam rotates, between a push position in which the first development cartridge is pushed by the first cam follower and positioned in the separate position and a no-push position in which the first development cartridge is positioned in the contact position. A projection of the first shaft onto the first cam in a direction parallel to the rotation axis is positioned inside a contour of the first cam.

With this configuration, the first cam and the first cam follower can be arranged compactly as viewed from the direction parallel to the rotation axis.

The image forming apparatus as described above may further comprise a second shaft by which the first cam is rotatably supported. The first shaft may be engaged with the second shaft, slidably along the second shaft whereby the first cam follower is slidable between the push position and the no-push position.

With this configuration, the first cam and the first cam follower including the contact arm extending from the first shaft can be arranged more compactly as viewed from the direction parallel to the rotation axis.

The first cam follower may be restrained from rotating about the rotation axis of the first cam.

With this feature, the rotational motion of the first cam can be converted into the linear motion of the first cam follower efficiently.

Specifically, the image forming apparatus may further comprise a stopper by which the first cam follower is restrained from rotating about the rotation axis of the first cam. The contact arm may be held in the stopper. Alternatively, the first cam follower may further include a restraint arm extending from the first shaft, and the restraint arm may be provided independently of the contact arm and held in the stopper.

With these configurations, the rotation of the first cam follower about the rotation axis (or the second shaft with which the first shaft is engaged) can be restricted reliably.

The image forming apparatus may further comprise a housing, a cover, and a translation plate. The housing has an opening. The cover is movable between a closing position in which the opening is closed and an open position in which the opening is uncovered. The translation plate is configured to make a translational motion synchronized with the cover's motion between the closing position and the open position, and thereby caused to move between a first position in which the translation plate is located when the cover is in the closing position and a second position in which the translation plate is located when the cover is in the open position. The translational motion of the translation plate from the first position to the second position, made when the first cam follower is positioned in the push position, causes the first cam to rotate and thereby causes the first cam follower to be moved and positioned in the no-push position.

With this configuration, the first cam follower can be positioned in the no-push position by operation of opening the cover. Accordingly, the first cam follower can be restrained from causing an obstruction in the way of the first development cartridge being installed into or removed from the housing through the opening.

The cam may include a first protrusion protruding parallel to the rotation axis. The translation plate may include a first contact piece that contacts the first protrusion when the first cam follower is positioned in the push position and the translation plate moves from the first position to the second position, such that when the first contact piece of the translation plate moving from the first position to the second position contacts the first protrusion, the first cam is caused to rotate, whereby the first cam follower is positioned in the no-push position.

With this configuration, the linear motion of the translation plate can be converted into the rotational motion of the first cam.

The first contact piece may have a first contact surface that contacts the first protrusion when the first cam follower is positioned in the push position and the translation plate moves from the first position to the second position.

With this configuration, the first contact piece of the translation plate moving from the first position to the second position can be caused to contact the first protrusion of the first cam positioned within a predetermined phase range, without fail.

The first contact piece may have a second contact surface that is contactable with the first protrusion when the translation plate moves from the second position to the first position, such that when the translational motion of the translation plate from the second position to the first position causes the second contact surface to contact the first protrusion, the first contact piece retreats to prevent the first cam from rotating.

With this configuration, if the first contact piece is caused to contact the first protrusion by operation of closing the cover, the first contact piece retreats to prevent the first cam from rotating; therefore, an undesirable shift in the position of the first cam follower from the position before the operation of closing the cover can be restrained.

The first protrusion may have a cylindrical surface contactable with the first contact piece.

With this feature, even when the first cam rotates, the first contact piece can be kept continuously in contact with the first protrusion in such a manner that their contact state remains unvaried. Accordingly, the linear motion of the translation plate can be converted into the rotational motion of the first cam efficiently.

The image forming apparatus may further comprise a controller configured to cause the first cam to rotate in a first rotation direction to move the first development cartridge between the contact position and the separate position. The first cam may be an end cam, and the cam surface may include a first guide surface configured to cause the first cam follower to move from the no-push position to the push position when the first cam rotates in the first rotation direction, and a second guide surface configured to cause the first cam follower to move from the push position to the no-push position when the first cam rotates in the first rotation direction, such that an angle of the second guide surface with respect to a plane perpendicular to the rotation axis is greater than an angle of the first guide surface with respect to the plane perpendicular to the rotation axis.

With this configuration, the length of the cam surface in the direction of rotation of the first cam can be made shorter. Accordingly, an angle of rotation of the first cam as required to move the first cam follower between the no-push position and the push position can be made smaller. In addition, the first cam can be made smaller in size.

The image forming apparatus may further comprise: a second photosensitive drum; a third photosensitive drum located downstream of the second photosensitive drum in a sheet conveyance direction; a fourth photosensitive drum located downstream of the third photosensitive drum in the sheet conveyance direction; a second development cartridge including a second development roller, the second development cartridge being movable between a contact position in which the second development roller is in contact with the second photosensitive drum and a separate position in which the second development roller is separate from the second photosensitive drum; a third development cartridge including a third development roller, the third development cartridge being movable between a contact position in which the third development roller is in contact with the third photosensitive drum and a separate position in which the third development roller is separate from the third photosensitive drum; a fourth development cartridge including a fourth development roller, the fourth development cartridge being movable between a contact position in which the fourth development roller is in contact with the fourth photosensitive drum and a separate position in which the fourth development roller is separate from the fourth photosensitive drum; a second cam having a cam surface, the second cam being configured to rotate to thereby cause the second development cartridge to move between the contact position and the separate position; a third cam having a cam surface, the second cam being configured to rotate in synchronization with the second cam to thereby cause the third development cartridge to move between the contact position and the separate position; a fourth cam having a cam surface, the fourth cam being configured to rotate in synchronization with the second cam and the third cam to thereby cause the fourth development cartridge to move between the contact position and the separate position; a second cam follower including a first shaft supported slidably in the directions parallel to the rotation axis, and a contact arm extending from the first shaft of the second cam follower to contact the cam surface of the second cam, the second cam follower being configured to be caused to slide, as the second cam rotates, between a push position in which the second development cartridge is pushed by the second cam follower and positioned in the separate position and a no-push position in which the second development cartridge is positioned in the contact position; a third cam follower including a first shaft supported slidably in the directions parallel to the rotation axis, and a contact arm extending from the first shaft of the third cam follower to contact the cam surface of the third cam, the third cam follower being configured to be caused to slide, as the third cam rotates, between a push position in which the third development cartridge is pushed by the third cam follower and positioned in the separate position and a no-push position in which the third development cartridge is positioned in the contact position; and a fourth cam follower including a first shaft supported slidably in the directions parallel to the rotation axis, and a contact arm extending from the first shaft of the fourth cam follower to contact the cam surface of the fourth cam, the fourth cam follower being configured to be caused to slide, as the fourth cam rotates, between a push position in which the fourth development cartridge is pushed by the fourth cam follower and positioned in the separate position and a no-push position in which the fourth development cartridge is positioned in the contact position, wherein a projection of the first shaft of the second cam follower onto the second cam in the direction parallel to the rotation axis is positioned inside a contour of the second cam, a projection of the first shaft of the third cam follower onto the third cam in the direction parallel to the rotation axis is positioned inside a contour of the third cam, and a projection of the first shaft of the fourth cam follower onto the fourth cam in the direction parallel to the rotation axis is positioned inside a contour of the fourth cam.

With this configuration in which a plurality of cams and a plurality of cam followers are provided, the cams and the cam followers can be arranged compactly as viewed from the direction parallel to the rotation axis.

The image forming apparatus with a plurality of cams and a plurality of cam followers are provided as described above may further comprise a housing, a cover, and a translation plate. The housing has an opening. The cover is movable between a closing position in which the opening is closed and an open position in which the opening is uncovered. The translation plate is configured to make a translational motion synchronized with the cover's motion between the closing position and the open position, and thereby caused to move between a first position in which the translation plate is located when the cover is in the closing position and a second position in which the translation plate is located when the cover is in the open position. The translational motion of the translation plate from the first position to the second position, made when at least one of the second cam follower, the third cam follower and the fourth cam follower is positioned in the push position, causes the second cam, the third cam and the fourth cam to rotate and thereby causes the second cam follower, the third cam follower and the fourth cam follower to be positioned in the respective no-push positions thereof.

With this configuration, the second cam follower, the third cam follower and the fourth cam follower can be positioned in the respective no-push positions. Accordingly, when the development cartridges are installed into or removed from the housing through the opening, each of the cam followers corresponding to the development cartridges can be restrained from causing an obstruction in the way of the corresponding development cartridge.

The second cam, the third cam and the fourth cam may be end cams, and the cam surfaces of the second cam, the third cam and the fourth cam may be configured such that: the third cam follower is caused to start moving from the no-push position to the push position at a time after the second cam follower reaches the push position; the fourth cam follower is caused to start moving from the no-push position to the push position at a time after the third cam follower reaches the push position; and there is a point in time at which the second cam follower, the third cam follower and the fourth cam follower are positioned in the respective push positions thereof concurrently.

With this configuration, the times at which force is applied to the cam followers can be shifted so as not to coincide with each other. Accordingly, an undesirable increase of driving force for rotating the cam can be restrained.

One of the second cam, the third cam and the fourth cam may comprise a second protrusion protruding parallel to the rotation axis, and another of the second cam, the third cam and the fourth cam may comprise a third protrusion protruding parallel to the rotation axis. The translation plate may comprise: a second contact piece contactable with the second protrusion during the translational motion of the translation plate from the first position to the second position, made when the cam follower corresponding to the cam comprising the second protrusion is in the push position, which second contact piece, when caused to contact the second protrusion by the translational motion of the translation plate, causes the second cam, the third cam and the fourth cam to rotate; and a third contact piece contactable with the third protrusion during the translational motion of the translation plate from the first position to the second position, which third contact piece, when caused to contact the third protrusion by the translational motion of the translation plate, causes the second cam, the third cam and the fourth cam to rotate, to thereby cause the second cam follower, the third cam follower and the fourth cam follower to be positioned in the respective no-push positions thereof. When the translational motion of the translation plate from the first position to the second position causes the second contact piece and the third contact piece to contact the second protrusion and the third protrusion, respectively, the third contact piece is caused to contact the third protrusion at a time after the second contact piece is caused to contact the second protrusion.

With this configuration, the second cam, of which the length of the cam surface in the direction of rotation of the second cam is longer, can be caused to rotate reliably, so that the second cam follower can be caused to move from the push position to the no-push position without fail.

The translation plate may be configured such that the third contact piece is caused to contact the third protrusion, at a time after the second contact piece is caused to separate from the second protrusion, by the translational motion of the translation plate from the first position to the second position.

With this configuration, the translation plate and the cams can be caused to move smoothly.

The image forming apparatus may further comprise a controller configured to cause the second cam, the third cam and the fourth cam to rotate in a first rotation direction to move the second development cartridge, the third development cartridge and the fourth development cartridge between the respective contact positions and the respective separate positions, wherein the translational motion of the translation plate from the first position to the second position, made when at least the second cam follower is positioned in the push position, causes the second cam, the third cam and the fourth cam to rotate in a second rotation direction opposite to the first rotation direction and thereby causes the second cam follower, the third cam follower and the fourth cam follower to be positioned in the respective no-push positions thereof.

With this configuration, the load acted on the moving translation plate can be made smaller. Accordingly, the load counteracting a user's operation of opening the cover can be made smaller.

The cam surfaces of the second cam, the third cam and the fourth cam may be configured such that motion of the second cam follower from the push position to the no-push position, motion of the third cam follower from the push position to the no-push position and motion of the fourth cam follower from the push position to the no-push position overlap in time.

With this configuration, the length of each of the cam surfaces in the direction of rotation of the respective cams cam can be made shorter. Accordingly, an angle of rotation of each cam as deemed necessary to move the corresponding cam follower between the no-push position and the push position can be made smaller. In addition, the cams can be made smaller in size.

The image forming apparatus may further comprise a motor, an input gear, an output gear, a movable gear, and a switching gear. The motor drives the second development roller, the third development roller and the fourth development roller. The input gear receives a driving force derived from the motor. The output gear outputs the driving force for the second development roller, the third development roller and the fourth development roller. The movable gear engages with the input gear, and is movable between a transmission position in which the movable gear engages with the output gear and a disconnection position in which the movable gear is disengaged from the output gear. The switching cam is configured to rotate in synchronization with the second cam to thereby cause the movable gear to move between the transmission position and the disconnection position.

With this configuration, the development rollers can be caused to rotate when the development cartridges are in their contact positions, and to stop rotating when the development cartridges are in their separate positions. Accordingly, the development rollers can be restrained from rotating more than necessary.

The switching cam may be configured such that the movable gear is caused to move to the transmission position at a time before the second development cartridge reaches the contact position, and to move to the disconnection position at a time after the fourth development cartridge reaches the separate position.

With this configuration, the second development roller, the third development roller and the fourth development roller can be caused to rotate before the second development roller is caused to contact the second photosensitive drum, whereas the second development roller, the third development roller and the fourth development roller can be caused to stop rotating after the fourth development roller is caused to separate from the fourth photosensitive drum.

The cam surface of the first cam may include a first cam surface, and a second cam surface symmetric to the first cam surface with respect to the rotation axis of the first cam. The contact arm may comprise: a first contact arm extending from the first shaft, the first contact arm being contactable with the first cam surface and the second cam surface alternately; and a second contact arm extending from the first shaft in a direction opposite to a direction in which the first contact arm extends, the second contact arm being contactable with the second cam surface and the first cam surface alternately.

With this configuration, the load imposed on the cam surface by the contact arm can be distributed approximately uniformly over the cam surface. The cam and/or the cam follower can be restrained from inclining at an angle with respect to the second shaft, so that the cam and the cam follower can be caused to operate stably.

Meanwhile, taking the state of the art into consideration, it would be desirable to provide an image forming apparatus with which a force received by a contact surface of the cam follower from a cam surface of the cam can be utilized efficiently as a force for causing a surface of the cam follower to be pressed against and thereby push the development cartridge.

From this point of view, in another aspect, an image forming apparatus comprising a photosensitive drum, a development cartridge, a cam, and a cam follower is disclosed herein. The development cartridge includes a development roller. The development roller is movable between a contact position in which the development roller is in contact with the photosensitive drum and a separate position in which the development roller is separate from the photosensitive drum. The cam has a cam surface. The cam is configured to rotate to thereby cause the development cartridge to move between the contact position and the separate position. The cam follower comprises a pushing surface that pushes the development cartridge, and a contact surface that contacts the cam surface. The cam follower is configured to be caused to slide in directions parallel to a rotation axis of the cam, as the cam rotates, between a push position in which the development cartridge is pushed by the cam follower and positioned in the separate position and a no-push position in which the development cartridge is positioned in the contact position. Orthographic projections of the pushing surface and the contact surface on a picture plane perpendicular to the rotation axis overlap each other. For example, the orthographic projection of the pushing surface on a picture plane perpendicular to the rotation axis and containing the contact surface overlaps the contact surface.

With this configuration, in which the pushing surface is located in such a position that an orthographic projection thereof on a picture plane perpendicular to the rotation axis overlaps an orthographic projection of the contact surface on the same picture plane, the force received by the contact surface from the cam surface of the cam can be efficiently utilized as a force for causing the pushing surface to be pressed against the development cartridge.

The pushing surface may comprise a contact spot contactable with the development cartridge, such that orthographic projections of the contact spot of the pushing surface and the contact surface on the picture plane overlap each other.

With this configuration, the force received by the contact surface from the cam surface of the cam can be more efficiently utilized as a force for causing the pushing surface to be pressed against the development cartridge.

The cam may include a boss extending in a direction parallel to the rotation axis. The cam follower may comprise a slide shaft, an arm, and a pin. The slide shaft is engaged with the boss, slidably along the boss in directions parallel to the rotation axis. The arm extends from the slide shaft perpendicularly to the rotation axis. The pin protrudes from the arm in the direction parallel to the rotation axis. The pin has the pushing surface.

With this configuration, the cam follower can be located to overlap the cam when viewed from a direction parallel to the rotation axis of the cam; therefore, the cam follower and the cam can be arranged in a compact manner.

The contact surface may be provided on a side of the arm facing in a direction (opposite to the direction in which the pin protrudes from the arm) parallel to the rotation axis, and the pin, and the pin may protrude from another side of the arm opposite to the side on which the contact surface is provided.

The image forming apparatus may further comprise a sensor configured to detect a position of the cam follower, and the cam follower may further comprise a rib extending from the slide shaft perpendicularly to the rotation axis, in a direction different from a direction in which the arm extends from the slide shaft, which rib is configured to be detectable by the sensor.

With these additional features, the position of the development cartridge can be determined from the position of the cam follower which is pressed against the development cartridge.

The image forming apparatus may further comprise a first cover with which at least part of the cam and at least part of the cam follower are covered, wherein the first cover comprises a pair of stoppers extending toward the cam, between which the arm is located.

With this configuration, the cam follower can be restrained from rotating about the boss of the cam.

The image forming apparatus may further comprise: a first cover with which at least part of the first cam and at least part of the first cam follower are covered; and a first spring located between the first cover and the slide shaft to bias the first cam follower toward the no-push position.

With this simple configuration in which the first spring is located between the first cover and the slide shaft of the cam follower, the cam follower can be biased toward the no-push position.

The arm may have a shape of a plate.

With this feature, the contact area of the contact surface of the arm with the cam can be made larger.

The image forming apparatus may further comprise: a housing, a second cover, and a translation plate. The housing has an opening. The second cover is movable between a closing position in which the opening is closed and an open position in which the opening is uncovered. The translation plate is configured to make a translational motion synchronized with the second cover's motion between the closing position and the open position, and thereby caused to move between a first position in which the translation plate is located when the second cover is in the closing position and a second position in which the translation plate is located when the second cover is in the open position. Herein, the first cam may include a protrusion, and the translation plate may comprise a contact piece that is contactable with the protrusion during the translational motion of the translation plate between the first position and the second position, made when the first cam follower is positioned in the push position, the contact piece being swingable between an acting position and a retreating position; and a second spring configured to bias the contact piece toward the acting position. When the translational motion of the translation plate from the first position to the second position causes the contact piece to contact the protrusion, the first cam is caused to rotate, whereby the first cam follower is positioned in the no-push position. When the translational motion of the translation plate from the second position to the first position causes the contact piece to contact the protrusion, the contact piece is caused to retreat from the acting position to the retreating position, whereby the first cam is prevented from rotating.

With this configuration, the cam follower can be positioned in the no-push position by operation of opening the second cover. In addition, when the second cover is closed, an undesirable shift in the position of the cam follower from the position before the operation of closing the second cover can be restrained.

The second spring may be a torsion coil spring.

With this feature, the second spring can be arranged in a compact manner; therefore, the translation plate can be made smaller in size.

In still another aspect, an image forming apparatus proposed herein comprises: a first photosensitive drum, a first motor, a first development cartridge, a first cam, a first cam follower, a switching lever, and a translation plate. The first development cartridge includes a first development roller. The first development roller is movable between a contact position in which the first development roller is in contact with the first photosensitive drum and a separate position in which the first development roller is separate from the first photosensitive drum. The first cam has a cam surface. The first cam is configured to rotate to thereby cause the first development cartridge to move between the contact position and the separate position. The first cam follower is configured to be caused to slide in first and second directions parallel to a rotation axis of the first cam, by the cam surface of the first cam as the first cam rotates, between a push position in which the first development cartridge is pushed by the first cam follower and positioned in the separate position and a no-push position in which the first development cartridge is positioned in the contact position. The switching lever is configured to be caused to move, by the first cam as the first cam rotates, between a first transmission position in which a driving force from the first motor is transmittable to the first development roller, and a first disconnection position in which the driving force from the first motor is not transmitted to the first development roller. The translation plate is configured to make a translational motion between a first position and a second position, such that the translational motion of the translation plate from the first position to the second position, made when the first cam follower is positioned in the push position, causes the first cam to rotate and thereby causes the first cam follower to be moved and positioned in the no-push position. The first cam comprises a switching protrusion and a first protrusion. The switching protrusion is configured to be contactable with the switching lever to cause the switching lever to move between the first transmission position and the first disconnection position. The switching protrusion is located on a side of the first cam facing in a first direction parallel to the rotation axis. The first protrusion is configured to be contactable with the translation plate to cause the first cam to rotate when the translation plate comes in contact with the first protrusion. The first protrusion is located on an opposite side of the first cam opposite to the side on which the switching protrusion is located.

With this configuration, in which the first cam follower can be positioned in the no-push position, the first cam and the first cam follower can be arranged compactly.

This image forming apparatus may further comprise: a housing having an opening; and a cover movable between a closing position in which the opening is closed and an open position in which the opening is uncovered. Herein, the translational motion made by the translation plate is synchronized with the cover's motion between the closing position and the open position, wherein the first position is a position in which the translation plate is located when the cover is in the closing position, and the second position is a position in which the translation plate is located when the cover is in the open position.

With this configuration, the first cam follower can be moved and positioned in the no-push position by operation of opening the cover. Accordingly, the first cam follower can be restrained from causing an obstruction in the way of the first development cartridge being installed into or removed from the housing through the opening.

The cam surface may be located on the side of the first cam facing in the first direction parallel to the rotation axis, that is the same side as the side on which the switching protrusion is located.

With this configuration, the first protrusion located on the opposite side of the first cam opposite to the side on which the cam surface is located can be arranged in a desired position with increased flexibility. Accordingly, upsizing of the first cam can be restrained, and the first cam and the translation plate can be arranged compactly.

The cam surface may have a retaining surface configured to retain the first cam follower in the push position, such that as viewed from a direction parallel to the rotation axis, the retaining surface extends along a segment of a circle of which a center coincides with the rotation axis and has two ends located apart from each other in a direction of rotation of the first cam, and the switching protrusion is located at least partially within bounds confined by two straight lines of a sector which are drawn from the rotation axis through the two ends of the retaining surface.

With this configuration, the first cam and the first cam follower can be given structural compactness. Accordingly, the first cam and the first cam follower can be arranged more compactly.

The first cam may comprise a disk portion, a gear portion, and a flange portion. Herein, the disk portion is formed on a circumference of the disk portion; the flange portion is formed on the circumference of the disk portion and located on a side of the gear portion facing in the first direction parallel to the rotation axis; and the switching protrusion is located on a side of the flange portion facing in the first direction parallel to the rotation axis.

With this configuration, the cam surface can be located near the circumference of the disk portion. Accordingly, the first cam can be restrained from upsizing, while a sufficient length of the cam surface in the direction of rotation of the first cam can be allocated on the first cam.

The cam surface may be located on the opposite side of the first cam opposite to the side on which the switching protrusion is located.

With this configuration, the switching protrusion located on the opposite side of the first cam opposite to the side on which the cam surface is located can be arranged in a desired position with increased flexibility. Accordingly, upsizing of the first cam can be restrained, and the first cam and the switching lever can be arranged compactly.

The cam surface may have a retaining surface configured to retain the first cam follower in the push position, such that as viewed from a direction parallel to the rotation axis, the retaining surface extends along a segment of a circle of which a center coincides with the rotation axis and has two ends located apart from each other in a direction of rotation of the first cam, and the first protrusion is located at least partially within bounds confined by two straight lines of a sector which are drawn from the rotation axis through the two ends of the retaining surface.

With this configuration, the first cam and the first cam follower can be given structural compactness. Accordingly, the first cam and the first cam follower can be arranged more compactly.

The first cam may comprise a disk portion, a gear portion, and a flange portion. Herein, the gear portion is formed on a circumference of the disk portion; the flange portion is formed on the circumference of the disk portion, and located on a side of the gear portion facing in a second direction opposite to the first direction parallel to the rotation axis; and the first protrusion is located on a side of the flange portion facing in the second direction.

With this configuration, the cam surface can be located near the circumference of the disk portion. Accordingly, the first cam can be restrained from upsizing, while a sufficient length of the cam surface in the direction of rotation of the first cam can be allocated on the first cam.

The image forming apparatus may further comprise a second motor provided separately from the first motor to cause the first cam to rotate.

With this configuration, the first motor and the second motor can be controlled individually so that the first development roller to which a driving force is transmitted from the first motor and the first cam to which a driving force is transmitted from the second motor can be independently caused to rotate or stop rotating.

The transmission plate may include a first contact piece that contacts the first protrusion when the first cam follower is positioned in the push position and the translation plate moves from the first position to the second position, such that when the first contact piece of the translation plate moving from the first position to the second position contacts the first protrusion, the first cam is caused to rotate, whereby the first cam follower is positioned in the no-push position.

With this configuration, the linear motion of the translation plate can be converted into the rotational motion of the first cam.

The first cam may be configured such that when the translational motion of the translation plate from the second position to the first position causes the first contact piece to contact the first protrusion, the first contact piece retreats to prevent the first cam from rotating.

With this configuration, when the translation plate moves from the second position to the first position, an undesirable shift in the position of the first cam follower from the position before the translation plate moves can be restrained.

The first cam may be configured such that the switching protrusion causes the switching lever to move to the first transmission position at a time before the first development cartridge reaches the contact position, and to move to the first disconnection position at a time after the first development cartridge reaches the separate position.

With this configuration, the first development roller can be caused to rotate before the first development roller is caused to contact the first photosensitive drum, whereas the first development roller can be caused to stop rotating after the first development roller is caused to separate from the first photosensitive drum.

The image forming apparatus may further comprise a planetary gear train which comprises an input element, an output element, and a transmission element. The input element receives the driving force derived from the first motor. The output element outputs the driving force for the first development roller. The transmission element is allowed to transmit the driving force from the input element to the output element when a rotation of the transmission element is restricted, and prevented from transmitting the driving force from the input element to the output element when the rotation of the transmission element is not restricted. The switching lever positioned in the first transmission position restricts the rotation of the transmission element, and the switching lever positioned in the first disconnection position does not restrict the rotation of the transmission element.

The image forming apparatus with the planetary gear train may further comprise a controller configured to cause the first cam to rotate in a first rotation direction to move the first development cartridge between the contact position and the separate position. The translational motion of the translation plate from the first position to the second position, made when the first cam follower is positioned in the push position, causes the first cam to rotate in a second rotation direction opposite to the first rotation direction and thereby causes the first cam follower to be moved and positioned in the no-push position.

The image forming apparatus with the planetary gear train may be further configured such that the switching lever is swingable on a pivot between the first transmission position and the first disconnection position. Herein, the switching lever may comprise a first lever, a second lever, a rotation restriction portion, and a first spring. The first lever is swingable on the pivot and contactable with the switching protrusion. The second lever is swingable on the pivot and engageable with the transmission element. The rotation restriction portion is provided on the second lever to restrict rotation of the first lever relative to the second lever in one direction. The first spring biases the first lever to prevent rotation of the first lever relative to the second lever when the rotation restriction portion provided on the second lever comes in contact with the first lever. The image forming apparatus may further comprise a second spring that biases the second lever to cause the second lever to swing toward the transmission element. When the second lever is engaged with the transmission element and the first cam rotates in the second rotation direction to cause the first lever to be pushed by the switching protrusion, the first lever swings relative to the second lever against a biasing force of the first spring.

This configuration can serve to prevent the switching lever from getting overstressed when the first cam rotates in the second rotation direction.

The image forming apparatus may further comprise: a second photosensitive drum; a third photosensitive drum located downstream of the second photosensitive drum in a sheet conveyance direction; a fourth photosensitive drum located downstream of the third photosensitive drum in the sheet conveyance direction; a second development cartridge including a second development roller, the second development cartridge being movable between a contact position in which the second development roller is in contact with the second photosensitive drum and a separate position in which the second development roller is separate from the second photosensitive drum; a third development cartridge including a third development roller, the third development cartridge being movable between a contact position in which the third development roller is in contact with the third photosensitive drum and a separate position in which the third development roller is separate from the third photosensitive drum; a fourth development cartridge including a fourth development roller, the fourth development cartridge being movable between a contact position in which the fourth development roller is in contact with the fourth photosensitive drum and a separate position in which the fourth development roller is separate from the fourth photosensitive drum; a second cam having a cam surface, the second cam being configured to rotate to thereby cause the second development cartridge to move between the contact position and the separate position; a third cam having a cam surface, the third cam being configured to rotate in synchronization with the second cam to thereby cause the third development cartridge to move between the contact position and the separate position; a fourth cam having a cam surface, the fourth cam being configured to rotate in synchronization with the second cam and the third cam to thereby cause the fourth development cartridge to move between the contact position and the separate position; a second cam follower configured to be caused to slide in first and second directions parallel to a rotation axis, by the cam surface of the second cam as the second cam rotates, between a push position in which the second development cartridge is pushed by the second cam follower and positioned in the separate position and a no-push position in which the second development cartridge is positioned in the contact position; a third cam follower configured to be caused to slide in first and second directions parallel to a rotation axis, by the cam surface of the third cam as the third cam rotates, between a push position in which the third development cartridge is pushed by the third cam follower and positioned in the separate position and a no-push position in which the third development cartridge is positioned in the contact position; and a fourth cam follower configured to be caused to slide in first and second directions parallel to a rotation axis, by the cam surface of the fourth cam as the fourth cam rotates, between a push position in which the fourth development cartridge is pushed by the fourth cam follower and positioned in the separate position and a no-push position in which the fourth development cartridge is positioned in the contact position.

The translation plate may be configured such that the translational motion of the translation plate from the first position to the second position, made when at least one of the second cam follower, the third cam follower and the fourth cam follower is positioned in the push position, causes the second cam, the third cam and the fourth cam to rotate and thereby causes the second cam follower, the third cam follower and the fourth cam follower to be positioned in the respective no-push positions thereof.

With this configuration, the second cam follower, the third cam follower and the fourth cam follower can be positioned in the no-push position by the translation plate.

Herein, the second cam, the third cam and the fourth cam may be end cams, and the cam surfaces of the second cam, the third cam and the fourth cam may be configured such that: the third cam follower is caused to start moving from the no-push position to the push position at a time after the second cam follower reaches the push position; the fourth cam follower is caused to start moving from the no-push position to the push position at a time after the third cam follower reaches the push position; and there is a point in time at which the second cam follower, the third cam follower and the fourth cam follower are positioned in the respective push positions thereof concurrently.

With this configuration, the times at which force is applied to the cam followers can be shifted so as not to coincide with each other. Accordingly, an undesirable increase of driving force for rotating the cam can be reduced.

One of the second cam, the third cam and the fourth cam may comprise a second protrusion protruding parallel to the rotation axis, and another of the second cam, the third cam and the fourth cam may comprise a third protrusion protruding parallel to the rotation axis. The translation plate may comprise: a second contact piece contactable with the second protrusion during the translational motion of the translation plate from the first position to the second position, made when the cam follower corresponding to the cam comprising the second protrusion is in the push position, which second contact piece, when caused to contact the second protrusion by the translational motion of the translation plate, causes the second cam, the third cam and the fourth cam to rotate; and a third contact piece contactable with the third protrusion during the translational motion of the translation plate from the first position to the second position, which third contact piece, when caused to contact the third protrusion by the translational motion of the translation plate, causes the second cam, the third cam and the fourth cam to rotate, to thereby cause the second cam follower, the third cam follower and the fourth cam follower to be positioned in the respective no-push positions thereof. When the translational motion of the translation plate from the first position to the second position causes the second contact piece and the third contact piece to contact the second protrusion and the third protrusion, respectively, the third contact piece is caused to contact the third protrusion at a time after the second contact piece is caused to contact the second protrusion.

With this configuration, the second cam, of which the length of the cam surface in the direction of rotation of the second cam is longer, can be caused to rotate reliably, so that the second cam follower can be caused to move from the push position to the no-push position without fail.

The translation plate may be configured such that the third contact piece is caused to contact the third protrusion, at a time after the second contact piece is caused to separate from the second protrusion, by the translational motion of the translation plate from the first position to the second position.

With this configuration, the translation plate and the cams can be caused to move smoothly.

The image forming apparatus may further comprise a controller configured to cause the second cam, the third cam and the fourth cam to rotate in a first rotation direction to move the second development cartridge, the third development cartridge and the fourth development cartridge between the respective contact positions and the respective separate positions, wherein the translational motion of the translation plate from the first position to the second position, made when at least the second cam follower is positioned in the push position, causes the second cam, the third cam and the fourth cam to rotate in a second rotation direction opposite to the first rotation direction and thereby causes the second cam follower, the third cam follower and the fourth cam follower to be positioned in the respective no-push positions thereof.

With this configuration, the load acted on the moving translation plate can be made smaller. Accordingly, the load counteracting a user's operation of opening the cover can be made smaller.

The cam surfaces of the second cam, the third cam and the fourth cam may be configured such that motion of the second cam follower from the push position to the no-push position, motion of the third cam follower from the push position to the no-push position and motion of the fourth cam follower from the push position to the no-push position overlap in time.

With this configuration, the length of each of the cam surfaces in the direction of rotation of the respective cams cam can be made shorter. Accordingly, an angle of rotation of each cam as required to move the corresponding cam follower between the no-push position and the push position can be made smaller. In addition, the cams can be made smaller in size.

The image forming apparatus may further comprise a third motor, an input gear, an output gear, a movable gear, and a switching cam. The third motor drives the second development roller, the third development roller and the fourth development roller. The input gear that receives a driving force derived from the third motor. The output gear outputs the driving force for the second development roller, the third development roller and the fourth development roller. The movable gear engages with the input gear, and is movable between a second transmission position in which the movable gear engages with the output gear and a second disconnection position in which the movable gear is disengaged from the output gear. The switching cam is configured to rotate in synchronization with the second cam to thereby cause the movable gear to move between the second transmission position and the second disconnection position.

With this configuration, the development rollers can be caused to rotate when the development cartridges are in their contact positions, and to stop rotating when the development cartridges are in their separate positions. Accordingly, the development rollers can be restrained from rotating more than necessary.

The switching cam may be configured such that the movable gear is caused to move to the second transmission position at a time before the second development cartridge reaches the contact position, and to move to the second disconnection position at a time after the fourth development cartridge reaches the separate position.

With this configuration, the second development roller, the third development roller and the fourth development roller can be caused to rotate before the second development roller is caused to contact the second photosensitive drum, whereas the second development roller, the third development roller and the fourth development roller can be caused to stop rotating after the fourth development roller is caused to separate from the fourth photosensitive drum.

The above and other aspects, further features and advantages will become more apparent by describing in detail illustrative, non-limiting embodiments thereof with reference to the accompanying drawings, in which.

The first embodiment is described below.

Figure 1:
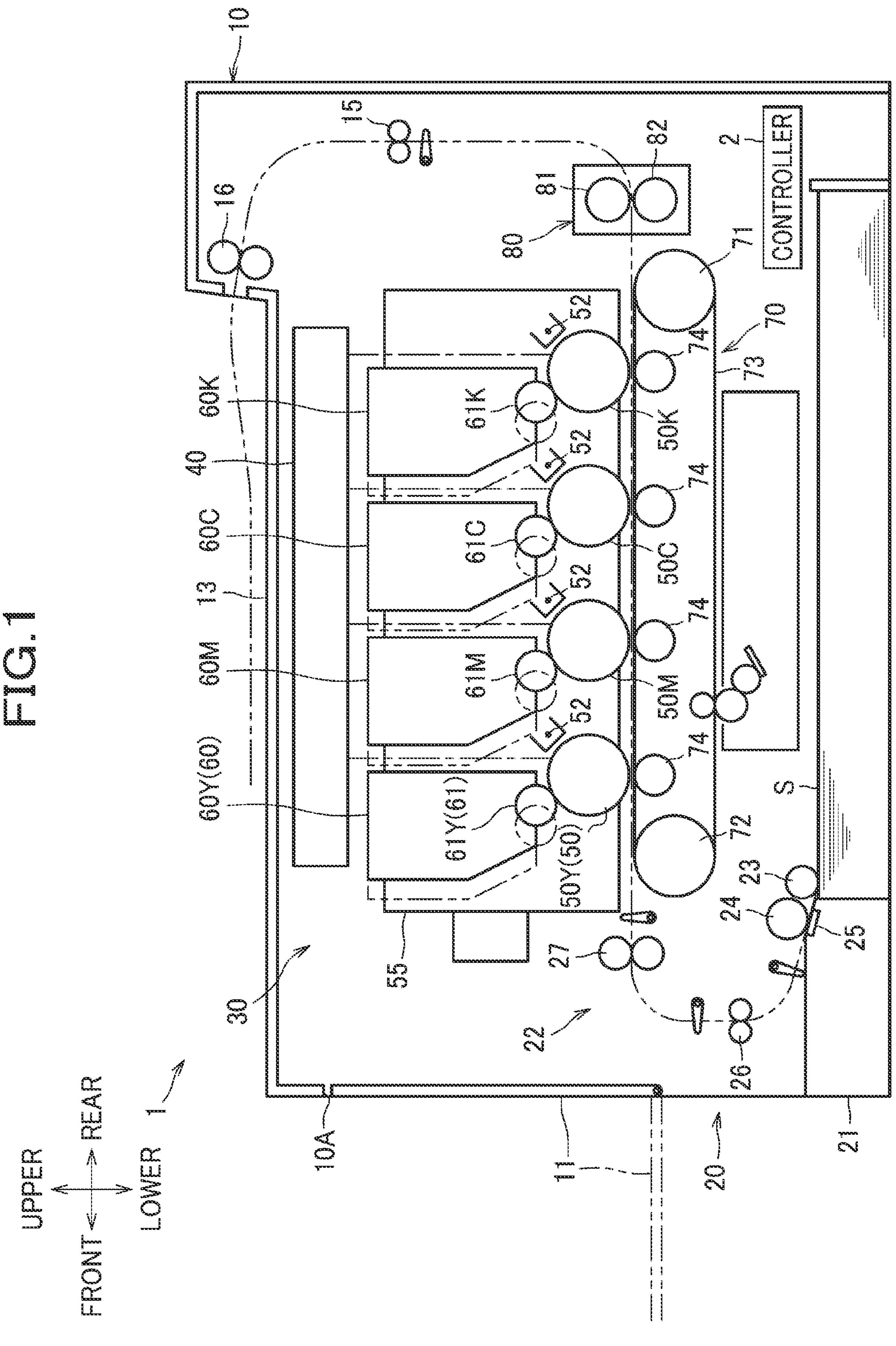
FIG. 1 is a diagram of an image forming apparatus according to a first embodiment.

As shown in FIG. 1, an image forming apparatus 1 is a color printer, which comprises a housing 10, a cover 11, a sheet feeder unit 20, an image forming unit 30, and a controller 2. In describing the embodiments, the left side of the drawing sheet of FIG. 1 will be called “front” as this is the front side of the printer. Similarly, of the drawing sheet of FIG. 1, the right side will be referred to as “rear”, the top/bottom sides as “upper/lower (or upward/rearward)”, the front side as “right”, and the reverse side as “left”.

The housing 10 has an opening 10A at a front side thereof. The cover 11 is configured to openably close the opening 10A. Specifically, the cover 11 is movable between a closing position in which the opening 10A is closed and an open position in which the opening 10A is uncovered. More specifically, the cover is swingable between the closing position indicated by a solid line and the open position indicated by a chain double-dashed line.

The sheet feeder unit 20 comprises a sheet tray 21 in which sheets S are held, and a sheet feed mechanism 22. The sheet feed mechanism 22 comprises a pickup roller 23, a separation roller 24, a separation pad 25, a conveyor roller 26, and a registration roller 27. Sheets S in the sheet tray 21 are picked up by the pickup roller 23, separated one from the others by the separation roller 24 and the separation pad 25, and fed by the conveyor roller 26 and the registration roller 27 to the image forming unit 30.

The image forming unit 30 comprises an exposure unit 40, a plurality of photosensitive drums 50, a plurality of development cartridges 60, a transfer unit 70, and a fixing unit 80.

The exposure unit 40 comprises a light source, deflector, lenses, mirrors, etc., not illustrated. The exposure unit 40 emit light beams (see alternate long and short dashed lines) to expose the photosensitive drums 50 to light.

The photosensitive drums 50 include a first photosensitive drum 50K for black, a second photosensitive drum 50Y for yellow, a third photosensitive drum 50M for magenta, and a fourth photosensitive drum 50C for cyan. The third photosensitive drum 50M is located downstream of the second photosensitive drum 50Y in a direction of conveyance of a sheet S (hereinafter referred to simply as "sheet conveyance direction"). The fourth photosensitive drum 50C is located downstream of the third photosensitive drum 50M in the sheet conveyance direction. The first photosensitive drum 50K is located downstream of the fourth photosensitive drum 50C in the sheet conveyance direction. In other words, the second photosensitive drum 50Y, the third photosensitive drum 50M, the fourth photosensitive drum 50C, and the first photosensitive drum 50K are arranged in the sheet conveyance direction (from the front rearward) in this sequence.

In the description and the drawings, each of the members provided for corresponding colors may be designated by a specific reference numeral with a label Y, M, C or K appended thereto if distinction in color is necessary for explanation. On the other hand, if explanation is given without distinction in color, the reference numeral without the label Y, M, C or K may be used.

Each development cartridge 60 includes a development roller 61. The development cartridge 60 is provided for each photosensitive drum 50. To be more specific, the development cartridges 60 include a first development cartridge 60K including a first development roller 61K for supplying toner to the first photosensitive drum 50K, a second development cartridge 60Y including a second development roller 61Y for supplying toner to the second photosensitive drum 50Y, a third development cartridge 60M including a third development roller 61M for supplying toner to the third photosensitive drum 50M, and a fourth development cartridge 60C including a fourth development roller 61C for supplying toner to the fourth photosensitive drum 50C.

The development cartridge 60 is movable between a contact position indicated by a solid line in which the development roller 61 thereof is in contact with the corresponding photosensitive drum 50 and a separate position indicated by a chain double-dashed line in which the development roller 61 thereof is separate from the corresponding photosensitive drum 50.

To elaborate, the first development cartridge 60K is movable between a contact position in which the first development roller 61K is in contact with the first photosensitive drum 50K and a separate position in which the first development roller 61K is separate from the first photosensitive drum 50K. The second development cartridge 60Y is movable between a contact position in which the second development roller 61Y is in contact with the second photosensitive drum 50Y and a separate position in which the second development roller 61Y is separate from the second photosensitive drum 50Y. The third development cartridge 60M is movable between a contact position in which the third development roller 61M is in contact with the third photosensitive drum 50M and a separate position in which the third development roller 61M is separate from the third photosensitive drum 50M. The fourth development cartridge 60C is movable between a contact position in which the fourth development roller 61C is in contact with the fourth photosensitive drum 50C and a separate position in which the fourth development roller 61C is separate from the fourth photosensitive drum 50C.

The photosensitive drums 50 are rotatably supported in a drawer 55. Also provided in the drawer 55 are chargers 52 located in positions corresponding to the respective photosensitive drums 50 for electrically charging the photosensitive drums 50. The drawer 55 supports a plurality of development cartridges 60 in a manner that permits the development cartridges 60 to be installed therein and removed therefrom. The drawer 55 is installable into and removable from the housing 10 through the opening 10A which is exposed when the cover 11 is opened.

The transfer unit 70 includes a drive roller 71, a follower roller 72, an endless conveyor belt 73, and four transfer rollers 74. The conveyor belt 73 is looped round and stretched between the drive roller 71 and the follower roller 72. The outside surface of the conveyor belt 73 is in contact with the respective photosensitive drums 50. The transfer rollers 74 are located inside the conveyor belt 73. The inside surface of the conveyor belt 73 is in contact with the respective transfer rollers 74. The conveyor belt 73 is nipped between each transfer roller 74 and the corresponding photosensitive drum 50.

The fixing unit 80 includes a heating roller 81, and a pressure roller 82 located opposite to the heating roller 81. A conveyor roller 15 and an ejection roller 16 are provided on a path of conveyance of a sheet S, downstream of the fixing unit 80 in the sheet conveyance direction.

In the image forming unit 30, the surfaces of the photosensitive drums 50 are uniformly charged by the chargers 52, and then exposed to light beams emitted from the exposure unit 40. Accordingly, an electrostatic latent image based on image data is formed on each photosensitive drum 50. Toner held in each of the development cartridges 60 is carried on the surface of the development roller 61, and supplied from the development roller 61 positioned in the contact position to the electrostatic latent image formed on the photosensitive drum 50. In this way, a toner image is formed on the photosensitive drum 50.

When a sheet fed onto the conveyor belt 73 is conveyed on the conveyor belt 73 through between each photosensitive drum 50 and the corresponding transfer roller 74, the toner image formed on the photosensitive drum 50 is transferred onto the sheet S. Subsequently, when the sheet S passes through between the heating roller 81 and the pressure roller 82, the toner image is fixed onto the sheet S. Thereafter, the sheet S is ejected by the conveyor roller 15 and the ejection roller 16 onto a sheet output tray 13.

Figure 2:
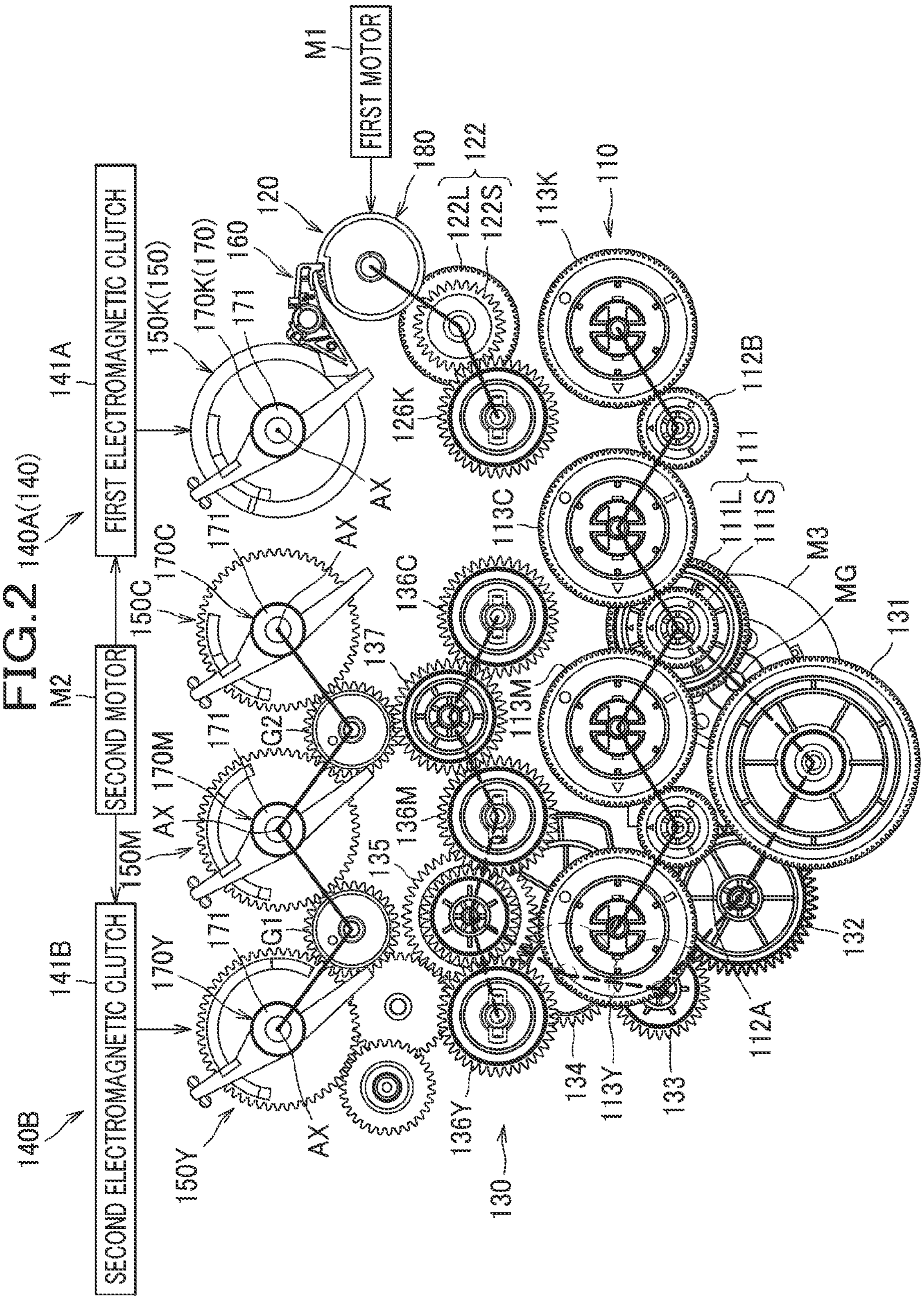
FIG. 2 is a diagram for explaining a mechanism for transmitting driving forces to photosensitive drums, development rollers and cams.

As shown in FIG. 2, the image forming apparatus 1 further comprises a first motor M1, a second motor M2, a third motor M3, a drum driving gear train 110, a first development roller driving gear train 120, a second development roller driving gear train 130, a cam driving gear train 140, a plurality of cams 150, a switching lever 160, and a plurality of cam followers 170.

The first motor M1 is a driving source used mainly for causing the first development roller 61K to rotate.

The second motor M2 is a driving source used mainly for causing the cams 150 to rotate, specifically, for causing a first cam 150K, a second cam 150Y, a third cam 150M, and a fourth cam 150C, which will be described later, to rotate. The second motor M2 is provided separately from the first motor M1.

The third motor M3 is a driving source used mainly for causing the photosensitive drums 50 (50Y, 50M, 50C, 50K), the second development roller 61Y, the third development roller 61M, and the fourth development roller 61C to rotate. The third motor M3 is a motor that drives the development rollers 61 (61Y, 61M, 61C). The third motor is provided separately from the first motor M1 and from the second motor M2.

The drum driving gear train 110 is capable of transmitting a driving force of the third motor M3 to the four photosensitive drums 50 (50Y, 50M, 50C, 50K). The drum driving gear train 110 comprises idle gears 111, 112A, 112B, a first drum gear 113K, a second drum gear 113Y, a third drum gear 113M, and a fourth drum gear 113C. The idle gear 111 is a two-stage gear including a large-diameter gear 111L and a small-diameter gear 111S having gear teeth less than those of the large-diameter gear 111L. The large-diameter gear 111L engages with a gear MG provided on the output shaft of the third motor M3.

The third drum gear 113M is a gear that rotates together with the third photosensitive drum 50M. The third drum gear 113M engages with the small-diameter gear 111S of the idle gear 111. The idle gear 112A engages with the third drum gear 113M. The second drum gear 113Y is a gear that rotates together with the second photosensitive drum 50Y. The second drum gear 113Y engages with the idle gear 112A. The fourth drum gear 113C is a gear that rotates together with the fourth photosensitive drum 50C. The fourth drum gear 113C engages with the small-diameter gear 111S of the idle gear 111. The idle gear 112B engages with the fourth drum gear 113C. The first drum gear 113K is a gear that rotates together with the first photosensitive drum 50K. The first drum gear 113K engages with the idle gear 112B.

The first development roller driving gear train 120 is capable of transmitting a driving force of the first motor M1 to the first development cartridge 60K.

The second development roller driving gear train 130 is capable of transmitting a driving force of the third motor M3 to the second development cartridge 60Y, the third development cartridge 60M, and the fourth development cartridge 60C.

The cam driving gear train 140 is capable of transmitting a driving force of the second motor M2 to the cams 150. The cam driving gear train 140 comprises a first cam driving gear train 140A capable of transmitting the driving force to the first cam 150K, and a second cam driving gear train 140B capable of transmitting the driving force to the second cam 150Y, the third cam 150M, and the fourth cam 150C.

The first cam driving gear train 140A includes a first electromagnetic clutch 141A. The first electromagnetic clutch 141A selectively transmits and stops transmitting the driving force from the second motor M2 to the first cam 150K by connecting or disconnecting the second motor M2 and the first cam 150K, to switch the operation of the first cam 150K, i.e., selectively causing the first cam 150K to rotate and stop rotating. For example, when the first electromagnetic clutch 141A is energized, it transmits the driving force (from the second motor M2 to the first cam 150K). Accordingly, the first cam 150K is caused to rotate. On the other hand, when the first electromagnetic clutch 141A is not energized, it stops transmitting the driving force to the first cam 150K. Accordingly, the first cam 150K is caused to stop rotating. The controller 2 (see FIG. 1) controls the first electromagnetic clutch 141A to selectively transmit and stop transmitting the driving force from the second motor M2, to thereby cause the first cam 150K to rotate and stop rotating.

The second cam driving gear train 140B includes a second electromagnetic clutch 141B. The second electromagnetic clutch 141B selectively transmits and stops transmitting the driving force from the second motor M2 to the second cam 150Y, the third cam 150M and the fourth cam 150C (e.g., by connecting or disconnecting the second motor M2 and the second cam 150Y interlocked with the third cam 150M and the fourth cam 150C via idle gears G1 and G2), to switch the operations of the second cam 150Y, the third cam 150M, and the fourth cam 150C, i.e., selectively causing the second cam 150Y, the third cam 150M, and the fourth cam 150C to rotate and stop rotating. For example, when the second electromagnetic clutch 141B is energized, it transmits the driving force (from the second motor M2 to the second cam 150Y). Accordingly, the second cam 150Y, the third cam 150M and the fourth cam 150C are caused to rotate. On the other hand, when the second electromagnetic clutch 141B is not energized, it stops transmitting the driving force to the second cam 150Y, the third cam 150M, and the fourth cam 150C. Accordingly, the second cam 150Y, the third cam 150M and the fourth cam 150C are caused to stop rotating. The controller 2 controls the second electromagnetic clutch 141B to selectively transmit and stop transmitting the driving force from the second motor M2, to thereby cause the second cam 150Y, the third cam 150M, and the fourth cam 150C to rotate and stop rotating selectively.

The controller 2 comprises a central processing unit or CPU, a read-only memory or ROM, a random-access memory, an input/output unit and other components, and executes pre-stored programs to execute various processes of control. The controller 2 controls the operation of the motors M1, M2 and M3. The controller 2 controls the operation of the cams 150 by controlling the electromagnetic clutches 141A and 141B. Accordingly, the development rollers 61 are selectively caused to rotate and stop rotating, and selectively brought into contact with and separated from the corresponding photosensitive drums 50 under control of the controller 2.

Figure 3:
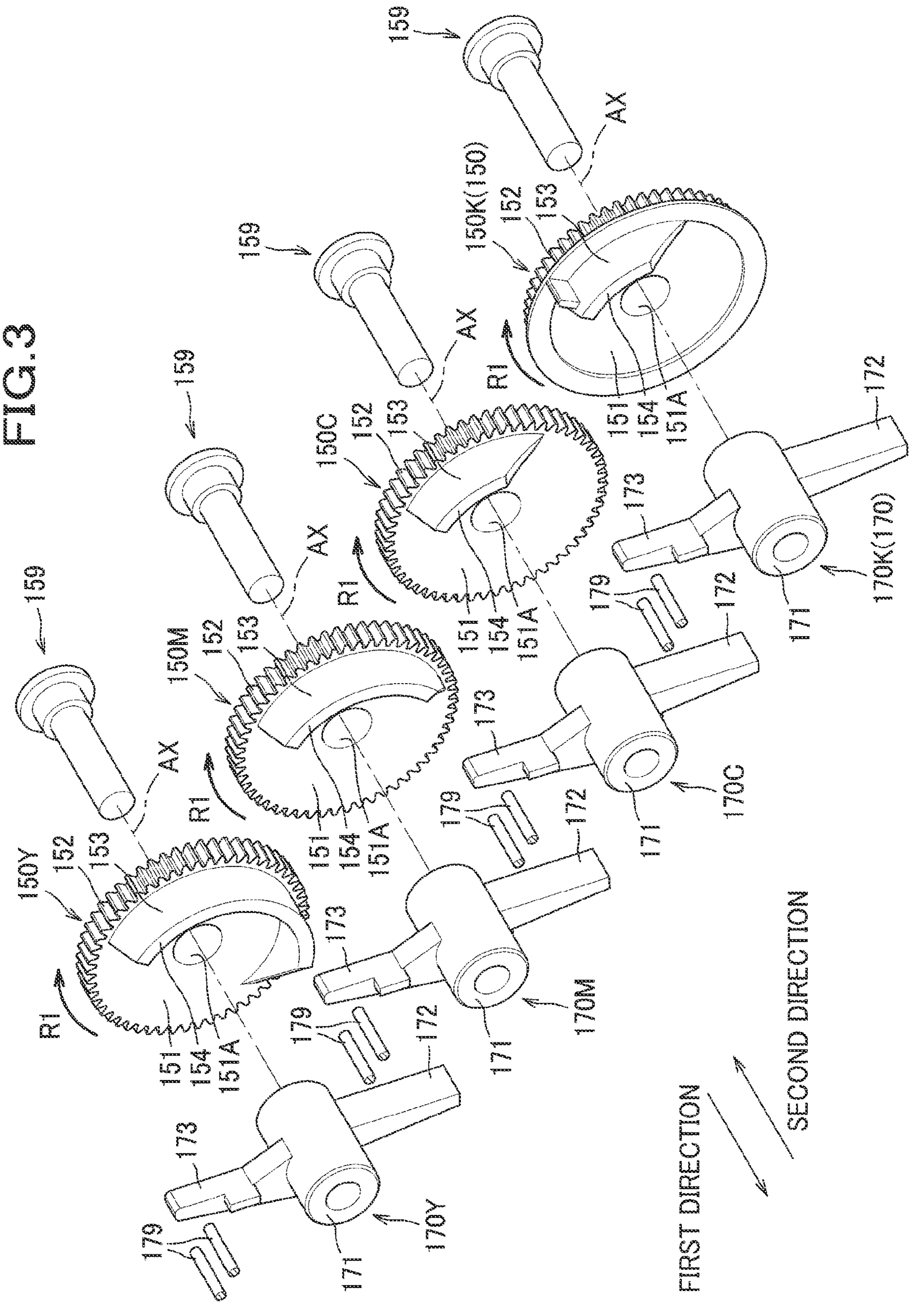
FIG. 3 is a perspective view showing cams, cam followers, second shafts and stoppers.

The cams 150 rotate as shown in FIG. 3, to cause the development cartridges 60 to move between the contact positions and the separate positions. The cams 150 include a first cam 150K, a second cam 150Y, a third cam 150M and a fourth cam 150C. As the first cam 150K rotates, the first development cartridge 60K is caused to move between the contact position and the separate position by the first cam 150K. As the second cam 150Y rotates, the second development cartridge 60Y is caused to move between the contact position and the separate position by the second cam 150Y. As the third cam 150M rotates, the third development cartridge 60M is caused to move between the contact position and the separate position by the third cam 150M. As the fourth cam 150C rotates, the fourth development cartridge 60C is caused to move between the contact position and the separate position by the fourth cam 150C.

The cam followers 170 are slidable in directions parallel to a rotation axis AX (indicated by alternate long and short dashed lines in FIG. 3) of the first cam 150K (or rotation axes AX of the cams 150). The two opposite directions parallel to the rotation axis AX will be hereinafter referred to as "first and second directions" where appropriate. Each cam follower 170 is caused to slide, as the corresponding cam 150 rotates, between a push position as shown in FIG.

Figures 4A, 4B:
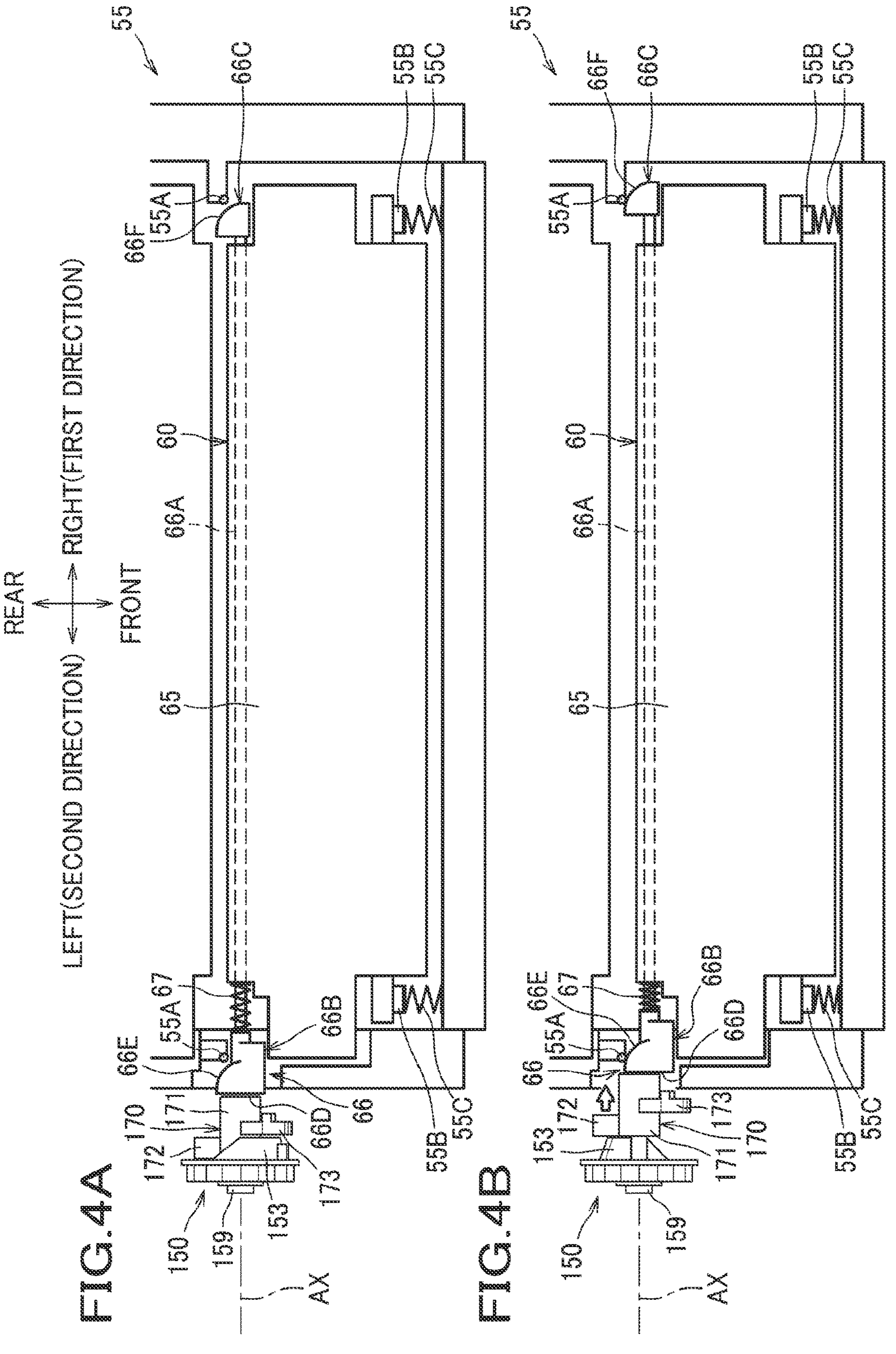
FIGS. 4A and 4B are diagrams for explaining an arrangement for moving a development cartridge, showing a state in which the development cartridge is positioned in a contact position and a state in which the development cartridge is positioned in a separate position, respectively.

4B in which the corresponding development cartridge 60 is pushed by the cam follower 170 and positioned in the separate position and a no-push position as shown in FIG. 4A in which the corresponding development cartridge 170 is positioned in the contact position.

As shown in FIGS. 4A and 4B, the development cartridge 60 is slidably supported by the drawer 55 so that the development cartridge 60 can slide frontward and rearward. The drawer 55 includes contact portions 55A and push members 55B. The contact portions 55A are portions with which a slide member 66, which will be described below, is contactable. Each of the contact portions 55A consists of a roller rotatable on a vertical axis. The push members 55B are biased by springs 55C rearward. When the development cartridge 60 is installed in the drawer 55, the push member 55B pushes and causes the development cartridge 60 to move to the contact position in which the development roller 61 is in contact with the photosensitive drum 50.

The development cartridge 60 comprises a case 65 that holds toner, and a slide member 66. The slide member 66 is slidable relative to the case 65 in the directions parallel to the rotation axis AX. When the slide member 66 is pushed by the cam follower 170, the slide member 66 is caused to move in a direction parallel to the rotation axis AX. The slide member 66 comprises a shaft 66A, a first contact member 66B and a second contact member 66C. The shaft 66A is oriented parallel to the rotation axis AX and slidably supported by the case 65. The first contact member 66B is provided at one end of the shaft 66A and the second contact member 66C is provided at the other end of the shaft 66A.

The first contact member 66B has a to-be-pushed surface 66D and an inclined surface 66E. The inclined surface 66E is a surface inclined with respect to the rotation axis AX of the cam 150 (150K) and parallel to the axis on which the contact portion 55A of the drawer 55 is rotatable. The second contact member 66C has an inclined surface 66F similar to the inclined surface 66E. The to-be-pushed surface 66D is pushed by the cam follower 170. When the slide member 66 is pushed by the cam follower 170, the inclined surfaces 66C and 66E come in contact with the contact portions 55A, and bias and cause the development cartridge 60 to move in a direction perpendicular to the rotation axis AX to the separate position in which the development roller 61 is separate from the photosensitive drum 50. A spring 67 is located between the first contact member 66B and the case 65 to bias the slide member 66 leftward.

Referring back to FIG. 3, the cam followers 170 include a first cam follower 170K, a second cam follower 170Y, a third cam follower 170M and a fourth cam follower 170C.

The first cam follower 170K is caused to slide, as the first cam 150K rotates, between a push position in which the first development cartridge 60K is pushed by the first cam follower 170K and positioned in the separate position and a no-push position in which the first development cartridge 60K is positioned in the contact position. The first cam follower 170K is caused to slide in the directions parallel to the rotation axis AX between the push position and the no-push position by the action of a cam surface 154, which will be described later, of the first cam 150K as exerted when the first cam 150K rotates.

The second cam follower 170Y is caused to slide, as the second cam 150Y rotates, between a push position in which the second development cartridge 60Y is pushed by the second cam follower 170Y and positioned in the separate position and a no-push position in which the second development cartridge 60Y is positioned in the contact position. The second cam follower 170Y is caused to slide in the directions parallel to the rotation axis AX between the push position and the no-push position by the action of the cam surface 154 of the second cam 150Y as exerted when the second cam 150Y rotates.

The third cam follower 170M is caused to slide, as the third cam 150M rotates, between a push position in which the third development cartridge 60M is pushed by the third cam follower 170M and positioned in the separate position and a no-push position in which the third development cartridge 60M is positioned in the contact position. The third cam follower 170M is caused to slide in the directions parallel to the rotation axis AX between the push position and the no-push position by the action of the cam surface 154 of the third cam 150M as exerted when the third cam 150M rotates.

The fourth cam follower 170C is caused to slide, as the fourth cam 150C rotates, between a push position in which the fourth development cartridge 60C is pushed by the fourth cam follower 170C and positioned in the separate position and a no-push position in which the fourth development cartridge 60C is positioned in the contact position. The fourth cam follower 170C is caused to slide in the directions parallel to the rotation axis AX between the push position and the no-push position by the action of the cam surface 154 of the fourth cam 150C as exerted when the fourth cam 150C rotates.

The cams 150 (the first cam 150K, the second cam 150Y, the third cam 150M, and the fourth cam 150C) are end cams. Each cam 150 comprises a disk portion 151, a gear portion 152, and a cam portion 153.

The disk portion 151 has a through hole 151A at a center thereof. The through hole 151A pierces through both sides of the disk portion 151 facing in opposite directions parallel to the rotation axis AX.

The image forming apparatus 1 further comprises four second shafts 159. Each of the second shafts 159 supports the corresponding cam 150 (i.e., the first cam 150K, the second cam 150Y, the third cam 150M, or the fourth cam 150C). The second shafts 159 are provided in the housing 10. The through hole 151A provided in the disk portion 151 of each cam 150 is fitted on the corresponding second shaft 159, whereby the cam 150 is rotatably supported by the housing 10.

The gear portion 152 is formed on a circumference of the disk portion 151.

Figure 5A:
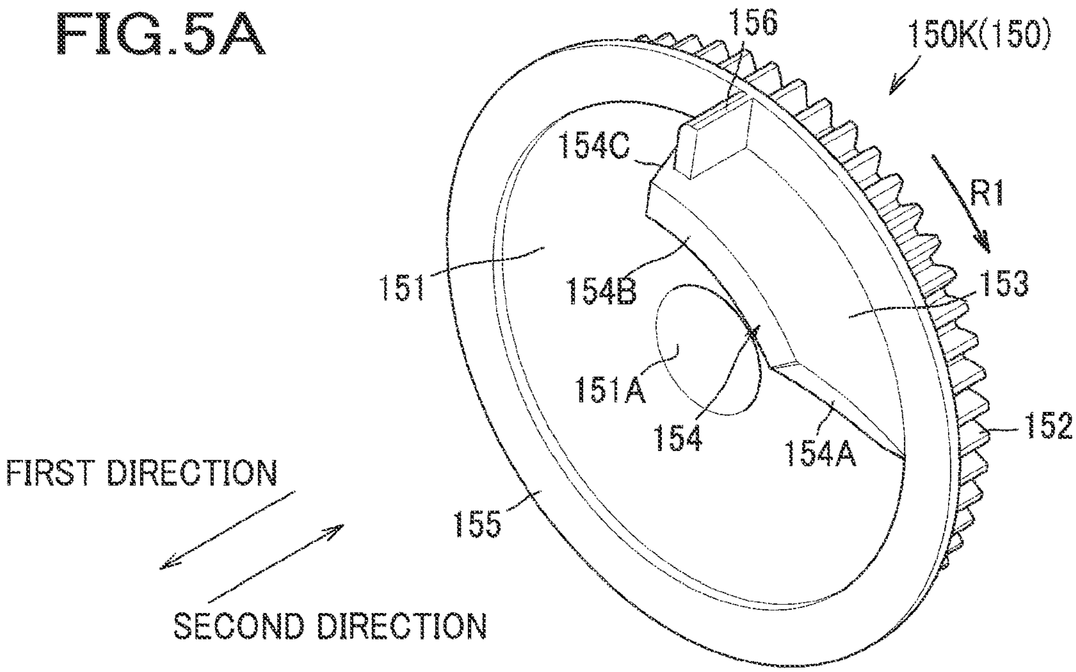
FIG. 5A is a perspective view of a first cam, showing a side thereof on which a switching protrusion is provided.
Figure 5B:
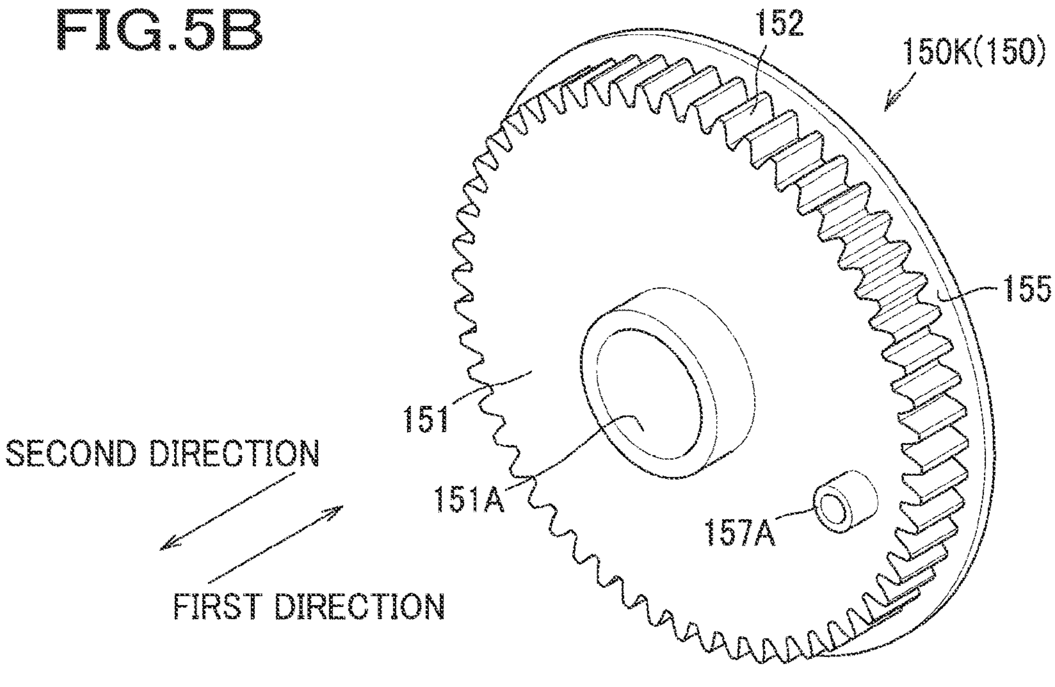
FIG. 5B is a perspective view of the first cam, showing another side thereof on which a first protrusion is provided, that is an opposite side of the first cam opposite to the side on which the switching protrusion is provided as shown in FIG. 5A.

The cam portion 153 protrudes from a side surface of the disk portion 151 in a direction parallel to the rotation axis AX. The cam portion 153 has a cam surface 154 configured to cause the cam follower 170 to move between the push position and the non-push position to thereby cause the development cartridge 60 to move between the separate position and the contact position. The cam surface 154 of each cam 150 (the first cam 150K, the second cam 150Y, the third cam 150M, and the fourth cam 150C) includes a first guide surface 154A, a retaining surface 154B, and a second guide surface 154C, as shown in FIG. 5A which illustrates the first cam 150K as a typified example.

The first guide surface 154A is configured to cause the corresponding cam follower 170 to move from the no-push position to the push position when the cam 150 rotates in a first rotation direction R1. For example, the first guide surface 154A of the first cam 150K rotating in the first rotation direction R1 causes the first cam follower 170K to move from the no-push position to the push position. The first guide surface 154A is inclined with respect to the circumference of the disk portion 151 extending in the first rotation direction R1 of the cam 150. The first guide surface 154A slopes gradually away from the disk portion 151 with distance from its downstream end toward its upstream end.

The retaining surface 154B is configured to retain the corresponding cam follower 170 in the push position. For example, the retaining surface 154B of the first cam 150K rotating in the first rotation direction R1 retains the first cam follower 170K in the push position (see FIGS. 7A and 7B). The retaining surface 154B is approximately parallel to the circumference of the disk portion 151 extending in the first rotation direction R1 of the cam 150. Note that the retaining surface 154B depicted in the drawing figures such as FIG. 6B which will be referenced later is shown with a dot hatch pattern.

The second guide surface 154C is configured to cause the corresponding cam follower 170 to move from the push position to the no-push position when the cam 150 rotates in the first rotation direction R1. For example, the second guide surface 154C of the first cam 150K rotating in the first rotation direction R1 causes the first cam follower 170K to move from the push position to the non-push position. The second guide surface 154C is inclined with respect to the circumference of the disk portion 151 extending in the first rotation direction R1 of the cam 150. The second guide surface 154C slopes gradually closer to the disk portion 151 with distance from its downstream end toward its upstream end.

Figure 5C:
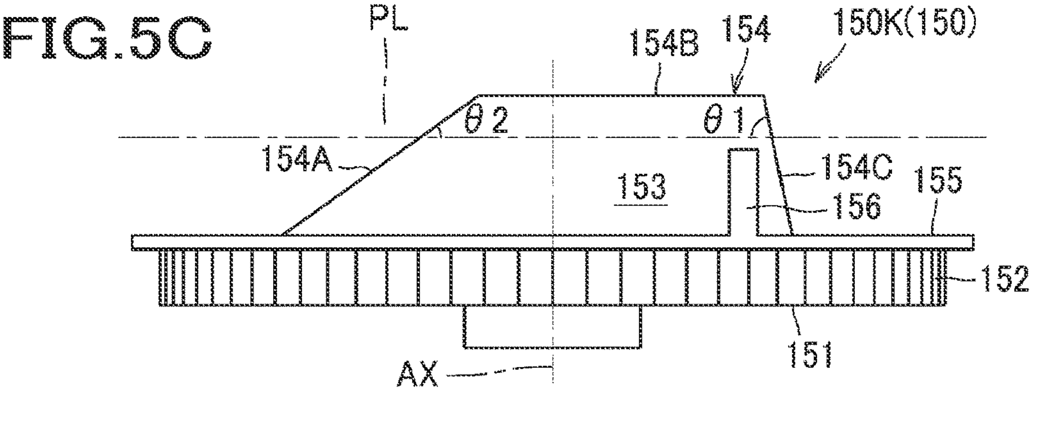
FIG. 5C is a side elevational view of the first cam.

As shown in FIG. 5C, an angle θ2 of the second guide surface 154C with respect to a plane PL perpendicular to the rotation axis AX is greater than an angle θ1 of the first guide surface 154A with respect to the plane PL perpendicular to the rotation axis AX. In other words, the second guide surface 154C is inclined steeper than the first guide surface 154A.

To move the first development cartridge 60K between the contact position and the separate position, the controller 2 causes the first cam 150K to rotate in the first rotation direction R1. To move the second development cartridge 60Y, the third development cartridge 60M, and the fourth development cartridge 60C between the respective contact positions and the respective separate positions, the controller 2 causes the second cam 150Y, the third cam 150M, and the fourth cam 150C to rotate in the first rotation direction R1 (see FIG. 3).

Figure 6A:
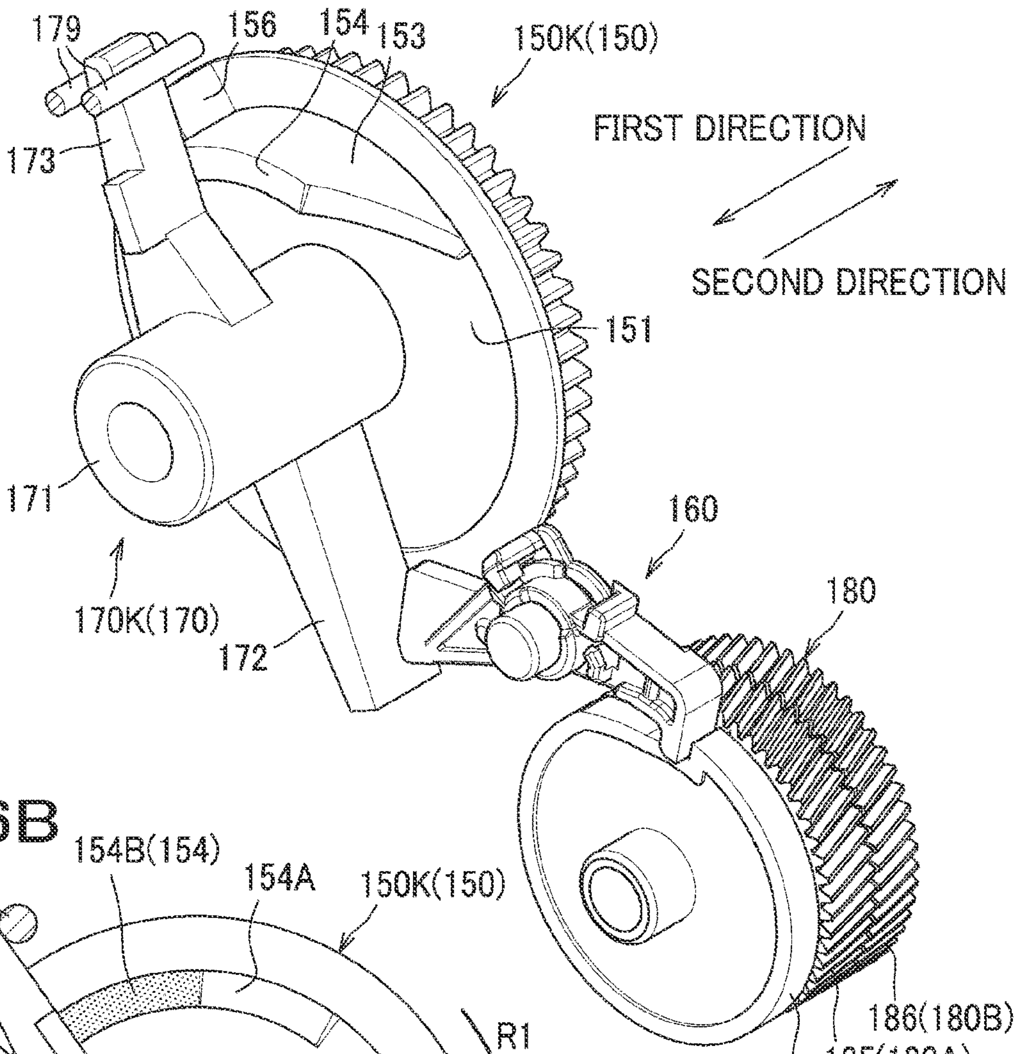
FIG. 6A is a perspective view showing a first cam, a first cam follower, a switching lever and a planetary gear train, as illustrated when the first development cartridge is positioned in the contact position.
Figure 6B:
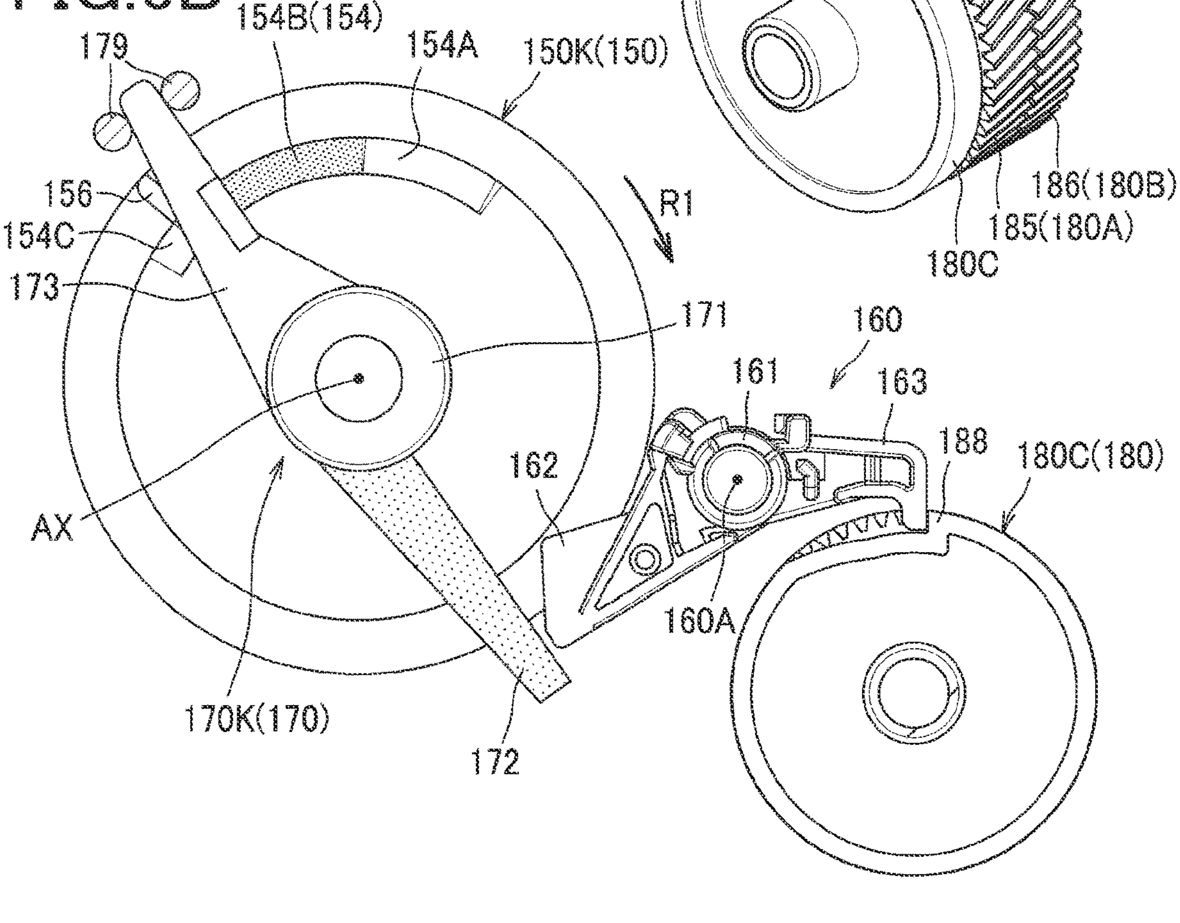
FIG. 6B is a side elevational view showing the first cam, the first cam follower, the switching lever and the planetary gear train, as illustrated when the first development cartridge is positioned in the contact position.

As shown in FIGS. 6A and 6B, the cam follower 170 (the first cam follower 170K, the second cam follower 170Y, the third cam follower 170M, and the fourth cam follower 170C) includes a first shaft 171, a contact arm 172, and a restraint arm 173.

The first shaft 171 is supported slidably in directions parallel to the rotation axis AX. Specifically, the first shaft 171 has a cylindrical shape. The first shaft 171 is engaged with the second shaft 159 (see FIG. 3) oriented parallel to the rotation axis AX, and is slidable along the second shaft 159, i.e., in directions parallel to the rotation axis AX. Accordingly, the cam follower 170 is rendered slidable in the directions parallel to the rotation axis AX between the push position shown in FIGS. 6A and 6B and the no-push position shown in FIGS. 7A and 7B. The cam follower 170 is biased by a spring (not shown) toward the no-push position.

Figure 7A:
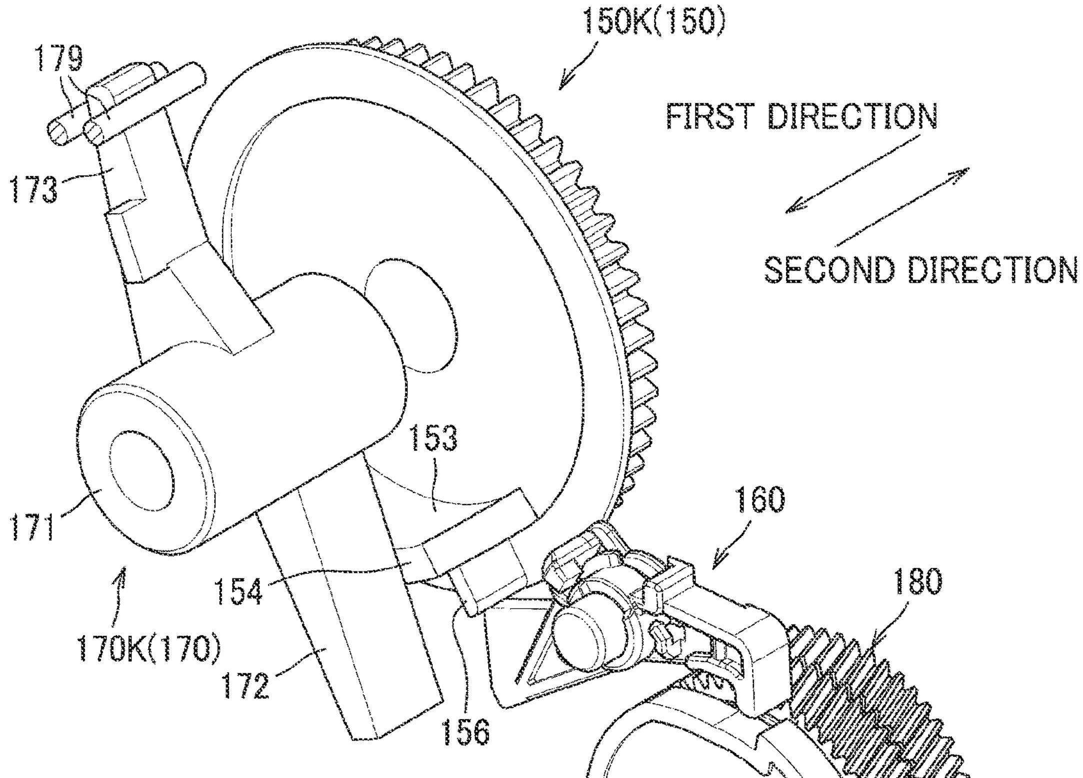
FIG. 7A is a perspective view showing the first cam, the first cam follower, the switching lever and the planetary gear train, as illustrated when the first development cartridge is positioned in the separate position.
Figure 7B:
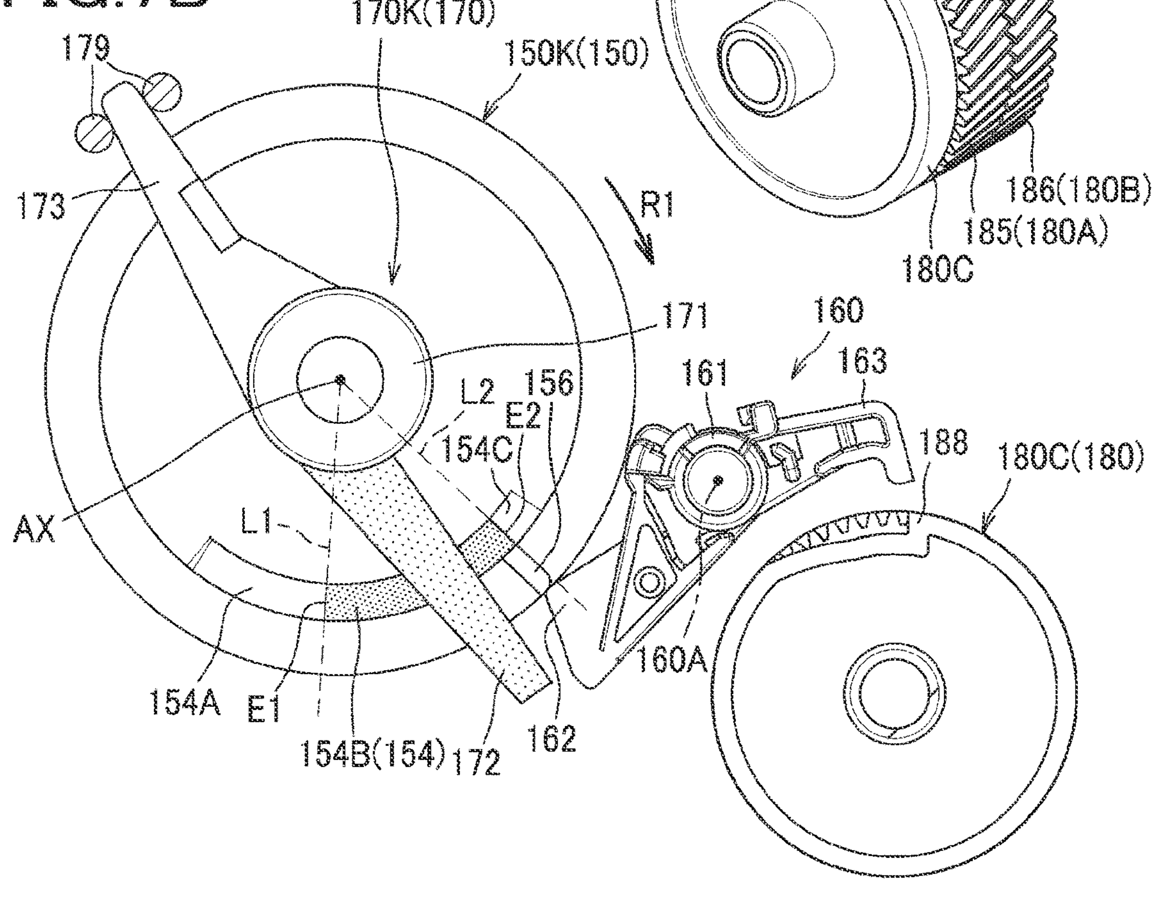
FIG. 7B is a side elevational view showing the first cam, the first cam follower, the switching lever and the planetary gear train, as illustrated when the first development cartridge is positioned in the separate position.

As shown in FIGS. 7A and 7B, the contact arm 172 is a portion that contacts the cam surface 154 of the corresponding cam 150 (the first cam 150K, the second cam 150Y, the third cam 150M, or the fourth cam 150C). The contact arm 172 extends from the first shaft 171 outward in a radial direction of the first shaft 171 (i.e., a direction perpendicular to the rotation axis AX). In FIG. 7B and other drawings, the contact arm 172 is illustrated with a dot hatch pattern. When the contact arm 172 shown with the dot hatch pattern overlap with the retaining surface 154B as shown in FIG. 7B, the cam follower 170 is positioned in the push position and the corresponding development cartridge 60 is positioned in the separate position.

The restraint arm 173 is an arm provided independently of the contact arm 172. The restraint arm 173 extends from the first shaft 171 outward in a radial direction of the first shaft 171 (i.e., a direction perpendicular to the rotation axis AX). When viewed in a direction parallel to the rotation axis AX as in FIG. 7B, the direction in which the restraint arm 173 extends is substantially opposite to the direction in which the contact arm 172 extends. As shown in FIG. 6A, the restraint arm 173 is located in a position shifted in the direction parallel to the rotation axis AX from a position in which the contact arm 172 is located, so as not to contact the cam portion 153 (cam surface 154). To be more specific, the restraint arm 173 of the cam follower 172 positioned in the no-push position is in a location out of a path traveled by the cam portion 153, i.e., distanced from the disk portion 151 farther than the cam surface 154 in the direction parallel to the rotation axis AX. Accordingly, when the cam 150 rotates, the cam portion 153 thereof passes through a space between the disk portion 151 and the restraint arm 173, without contacting the restraint arm 173.

The image forming apparatus 1 further comprises stoppers 179 by which the first cam followers 170 (the first cam follower 170K, the second cam follower 170Y, the third cam follower 170M, and the fourth cam follower 170C) are restrained from rotating on the rotation axis AX (about the second shafts 159 with which the first shafts 171 are engaged). Each stopper 179 consists of a pair of bars, and is provided for the corresponding cam follower 170 (see FIG. 3). The stoppers 179 are provided in the housing 10. The two bars of the stopper 179 are arranged side by side around the circumference of the cam 150, in positions equidistant from the first shaft 171, on both sides of the restraint arm 173 to hold the restraint arm 173. With this arrangement, the cam follower 170 (the first cam follower 170K, the second cam follower 170Y, the third cam follower 170M, and the fourth cam follower 170C) is restrained from rotating about the second shaft 159 (on the rotation axis AX).

As shown in FIG. 2, the first shaft 171 of each of the cam followers is disposed inside a contour of the corresponding cam 150 as viewed from a direction parallel to the rotation axis AX, i.e., a projection of the first shaft 171 of each of the cam followers onto the corresponding cam 150, in a direction parallel to the rotation axis AX, is positioned inside a contour of the corresponding cam 150. Specifically, the projection of the first shaft 171 of the first cam follower 170K onto the first cam 150K in a direction parallel to the rotation axis AX is positioned inside a contour of the first cam 150K. The projection of the first shaft 171 of the second cam follower 170Y onto the second cam 150Y in the direction parallel to the rotation axis AX is positioned inside a contour of the second cam 150Y. The projection of the first shaft 171 of the third cam follower 170M onto the third cam 150M in the direction parallel to the rotation axis AX is positioned inside a contour of the third cam 150M. The projection of the first shaft 171 of the fourth cam follower 170C onto the fourth cam 150C in the direction parallel to the rotation axis AX is positioned inside a contour of the fourth cam 150C.

When the image forming apparatus 1 is in a standby state before executing a printing process, all the development cartridges 60 are located in the separate positions. In this situation, as shown in FIG. 7, each cam follower 170 is located in the push position and each contact arm 172 is in contact with the retaining surface 154B of the corresponding cam 150.

When a printing process is executed, the controller 2 switches the first electromagnetic clutch 141A and/or the second electromagnetic clutch 141B into a transmissible state, selectively in accordance with colors of toner to be used for the printing process, to allow the driving force to be transmitted to the cam(s) 150 which is in turn caused to rotate in the first rotation direction R1. Accordingly, the relevant cam follower(s) 170 is guided by the retaining surface(s) 154B and the second guide surface(s) 154C, which slide on the contact arm(s) 172 in this sequence, until the cam surface(s) 154 gets out of contact with the contact arm(s) 172, whereby the cam follower(s) 170 slides along the second shaft(s) 159 from the push position to the no-push position as shown in FIGS. 6A and 6B by the action (biasing force) of the spring(s) (not shown), so that the corresponding development cartridge(s) 60 is caused to move from the separate position to the contact position. When the development cartridge(s) 60 moves to the contact position, the controller 2 switches the first electromagnetic clutch 141 and/or the second electromagnetic clutch 141B into a disconnecting state so that the cam(s) 150 is caused to stop rotating.

When a development process by the development roller(s) 61 finishes, the controller 2 switches the first electromagnetic clutch 141A and/or the second electromagnetic clutch 141B into a transmissible state again, to cause the cam(s) 150 to rotate in the first rotation direction R1. Accordingly, the first guide surface(s) 154A of the cam surface(s) 154 comes in contact with the contact arm(s) 172 of the cam follower(s) 170, and slides on the contact arm(s) 172 of the cam follower(s) 170 until the retaining surface(s) 154B of the cam surface(s) 154 comes in contact with the contact arm(s) 172. Accordingly, the cam follower(s) slides along the second shaft(s) 159 from the no-push position to the push position as shown in FIGS. 7A and 7B, so that the corresponding development cartridge(s) 60 is caused to move from the contact position to the separate position. When the development cartridge(s) 60 moves to the separate position, the controller 2 switches the first electromagnetic clutch 141 and/or the second electromagnetic clutch 142 into the disconnecting state so that the cam(s) 150 is caused to stop rotating.

Figure 8:
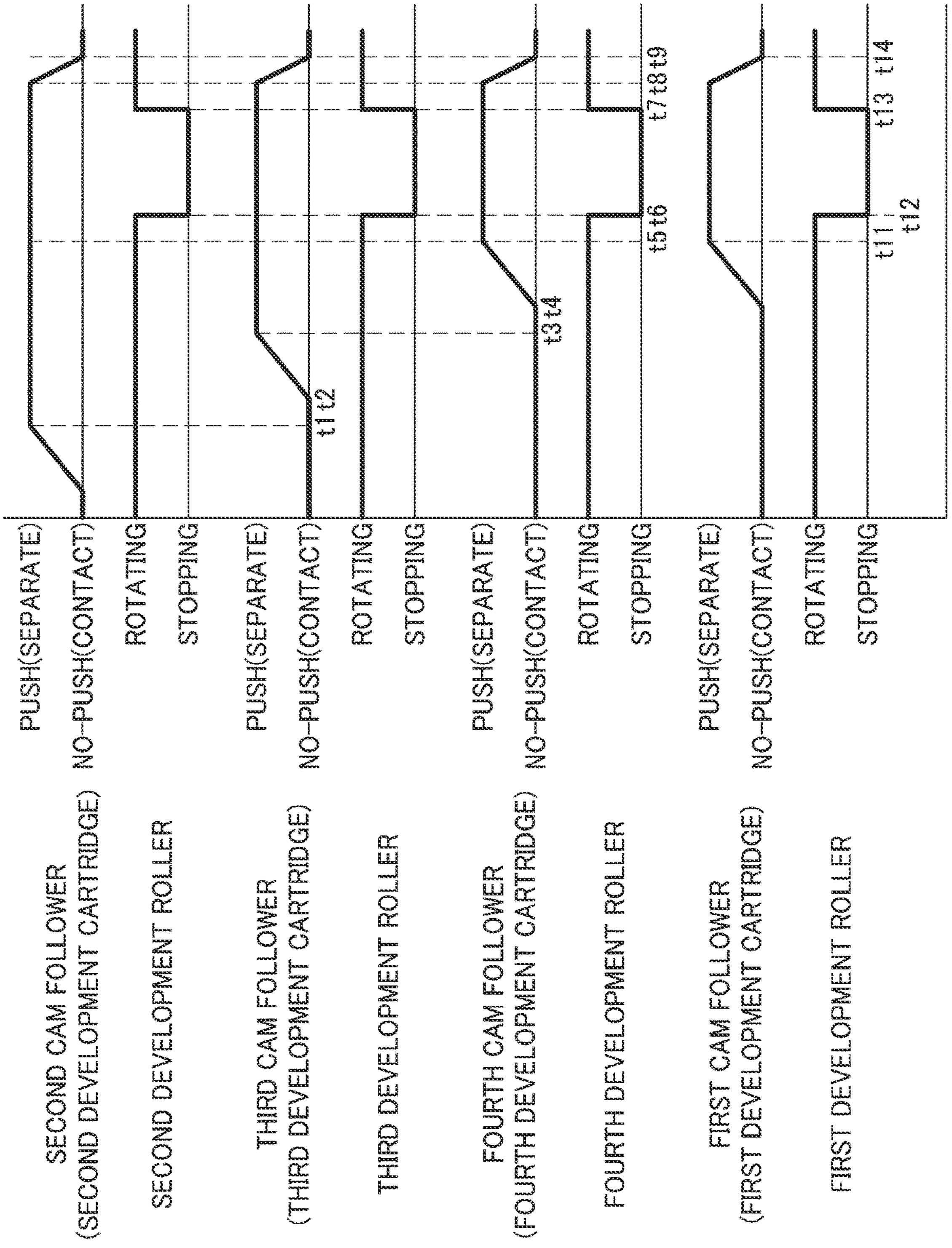
FIG. 8 is a time chart for explaining the positions of the cam followers (i.e., the positions of the development cartridges) relative to the states of operation of the development rollers.

As shown in FIG. 8, the cam surface 154 of the second cam 150Y, the cam surface 154 of the third cam 150M, and the cam surface 154 of the fourth cam 150C are configured such that the third cam follower 170M is caused to start moving from the no-push position to the push position at a time t2 after a time t1 of completion of movement of the second cam follower 170Y to the push position. The cam surface 154 of the second cam 150Y, the cam surface 154 of the third cam 150M, and the cam surface 154 of the fourth cam 150C are configured such that the fourth cam follower 170C is caused to start moving from the no-push position to the push position at a time t4 after a time t3 of completion of movement of the third cam follower 170M to the push position.

Further, the cam surface 154 of the second cam 150Y, the cam surface 154 of the third cam 150M, and the cam surface 154 of the fourth cam 150C are configured such that there is a point in time (herein, times for a period of time t5 to t8) at which the second cam follower 170Y, the third cam follower 170M and the fourth cam follower 170C are positioned in the respective push positions thereof concurrently.

Further, the cam surface 154 of the second cam 150Y, the cam surface 154 of the third cam 150M, and the cam surface 154 of the fourth cam 150C are configured such that motion of the second cam follower 170Y from the push position to the no-push position, motion of the third cam follower 170M from the push position to the no-push position and motion of the fourth cam follower 170C from the push position to the no-push position overlap in time (a period of time t8 to t9).

Figure 9:
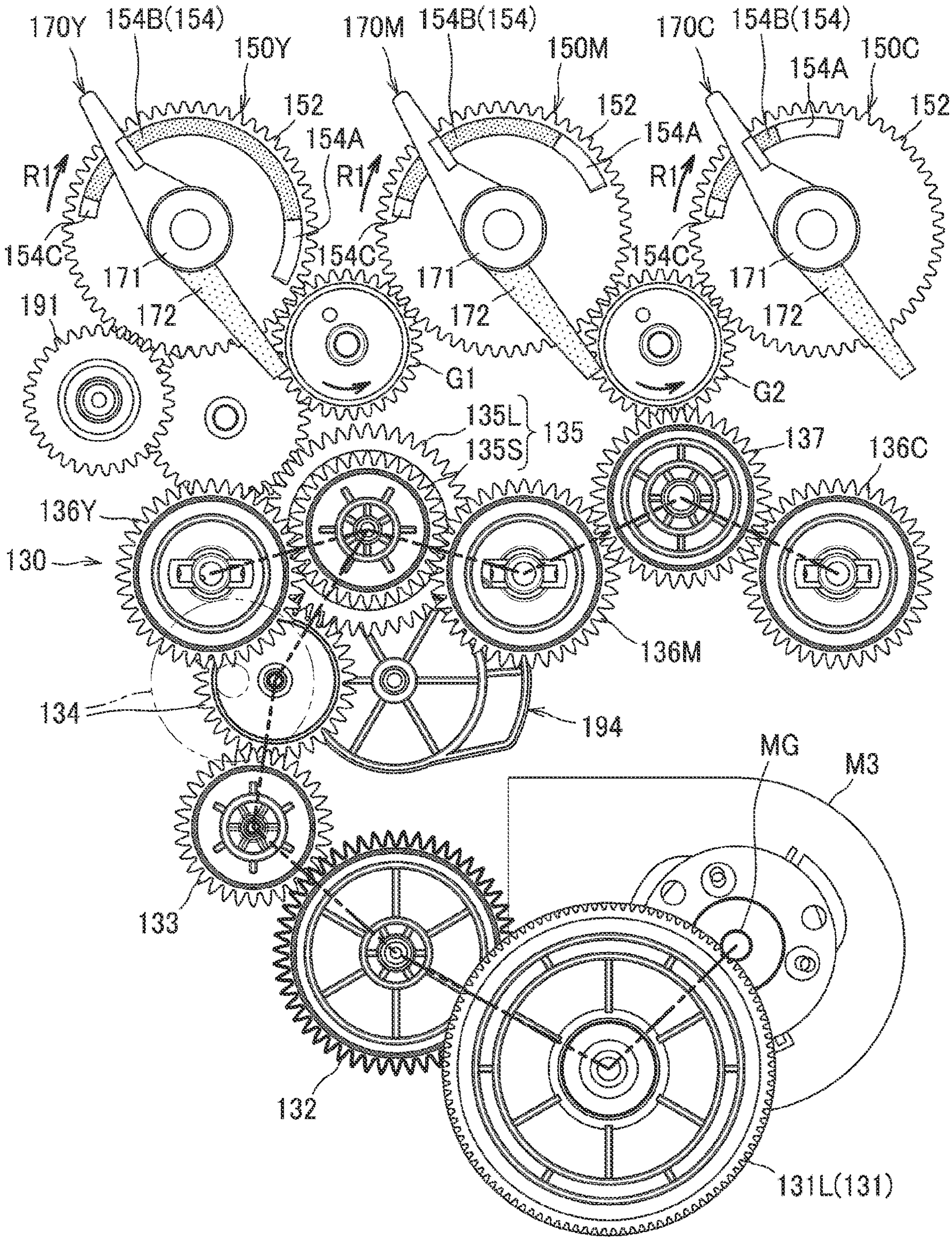
FIG. 9 is a side elevational view showing a second cam, a third cam, a fourth cam, and a second development roller driving gear train as illustrated when a movable gear is in a second transmission position.

Specifically, as shown in FIG. 9, the third cam 150M is configured to rotate in synchronization with the second cam 150Y. The fourth cam 150C is configured to rotate in synchronization with the third cam 150M. More specifically, the image forming apparatus 1 comprises idle gears G1 and G2. The idle gear G1 engages with the gear portion 152 of the second cam 150Y and the gear portion 152 of the third cam 150M. The idle gear G2 engages with the gear portion 152 of the third cam 150M and the gear portion 152 of the fourth cam 150C. Accordingly, when a driving force from the second motor M2 (see FIG. 2) is transmitted to the second cam 150Y, the cams 150Y, 150M, 150C rotate concurrently in synchronization with one another.

The length of the retaining surface 154B of the second cam 150Y in a direction of rotation of the second cam 150Y is longer than the length of the retaining surface 154B of the third cam 150M in a direction of rotation of the third cam 150M, and the length of the retaining surface 154B of the third cam 150M in the direction of rotation of the third cam 150M is longer than the length of the retaining surface 154B of the fourth cam 150C in a direction of rotation of the fourth cam 150C. The cams 150Y, 150M and 150C are configured such that the phases of the second guide surfaces 154C thereof coincide substantially with one another, and the phases of the first guide surfaces 154A thereof are shifted from one another. To be more specific, the first guide surface 154A of the third cam 150M is located upstream of the first guide surface 154A of the fourth cam 150C in the first rotation direction R1, and the first guide surface 154A of the second cam 150Y is located upstream of the first guide surface 154A of the third cam 150M in the first rotation direction R1.

Therefore, rotation of the cams 150Y, 150M and 150C in the first rotation direction R1, made when the cam followers 170Y, 170M and 170C are located in the no-push position as shown in FIG. 9, first causes the second cam follower 170Y to move from the no-push position to the push position to thereby cause the second development cartridge 60Y to move from the contact position to the separate position, and then causes the third cam follower 170M to move from the no-push position to the push position to thereby cause the third development cartridge 60M to move from the contact position to the separate position, and finally causes the fourth cam follower 170C to move from the no-push position to the push position to thereby cause the fourth development cartridge 60C to move from the contact position to the separate position.

Figure 10:
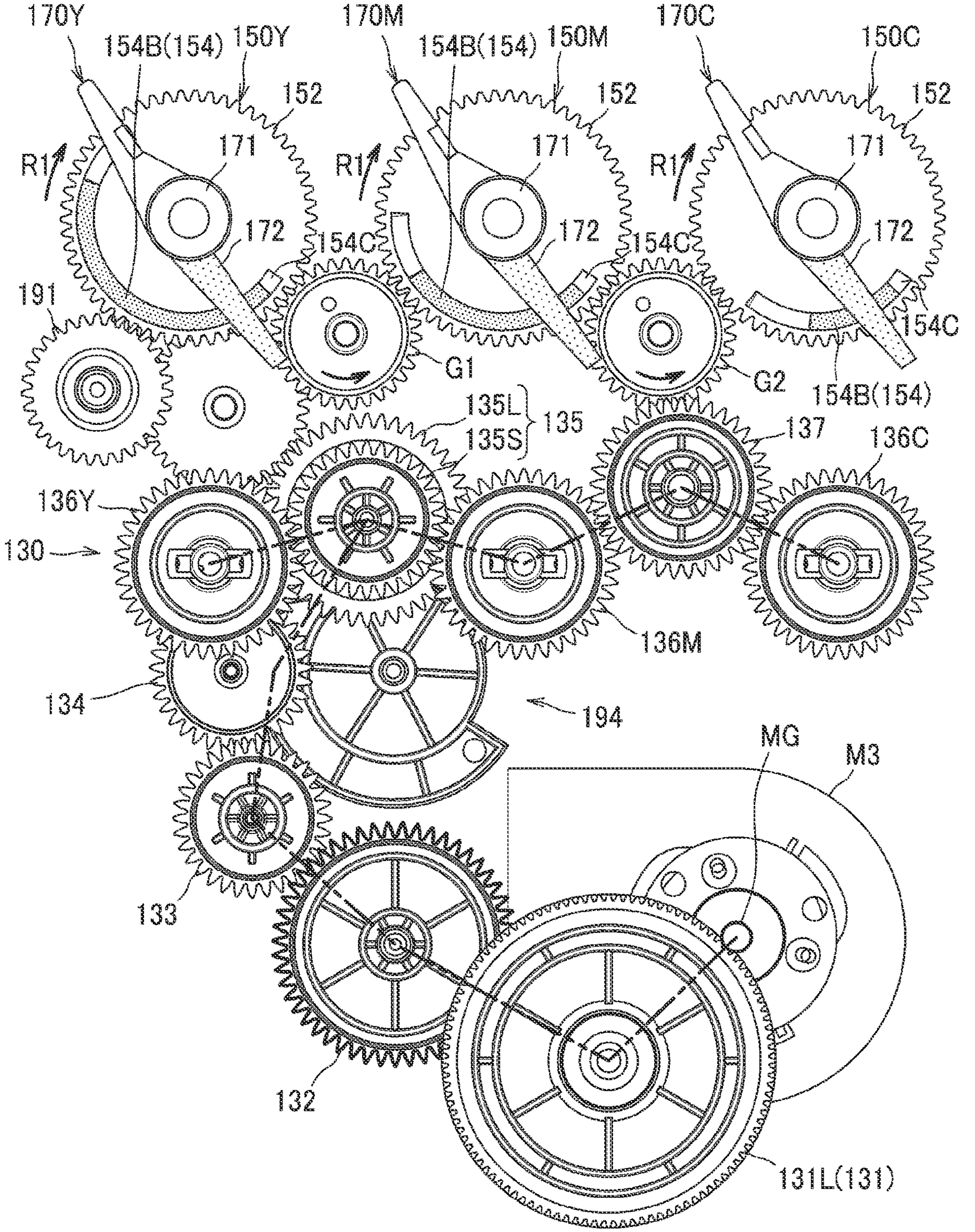
FIG. 10 is a side elevational view showing the second cam, the third cam, the fourth cam, and the second development roller driving gear train as illustrated when the movable gear is in a second disconnection position.

Rotation of the cams 150Y, 150M and 150C in the first rotation direction R1, made when the cam followers 170Y, 170M and 170C are located in the push positions as shown in FIG. 10, causes the cam followers 170Y, 170M and 170C to move substantially concurrently from the push positions to the no-push positions, to thereby cause the development cartridges 60Y, 60M and 60C to move substantially concurrently from the separate position to the contact position.

Next, a description will be given of a mechanism for switching between transmission of a driving force to the first development roller 61K and disconnection of the transmission.

As shown in FIG. 2, the first development roller driving gear train 120 comprises a planetary gear train 180, an idle gear 122, and a first coupling gear 126K.

Figure 11A:
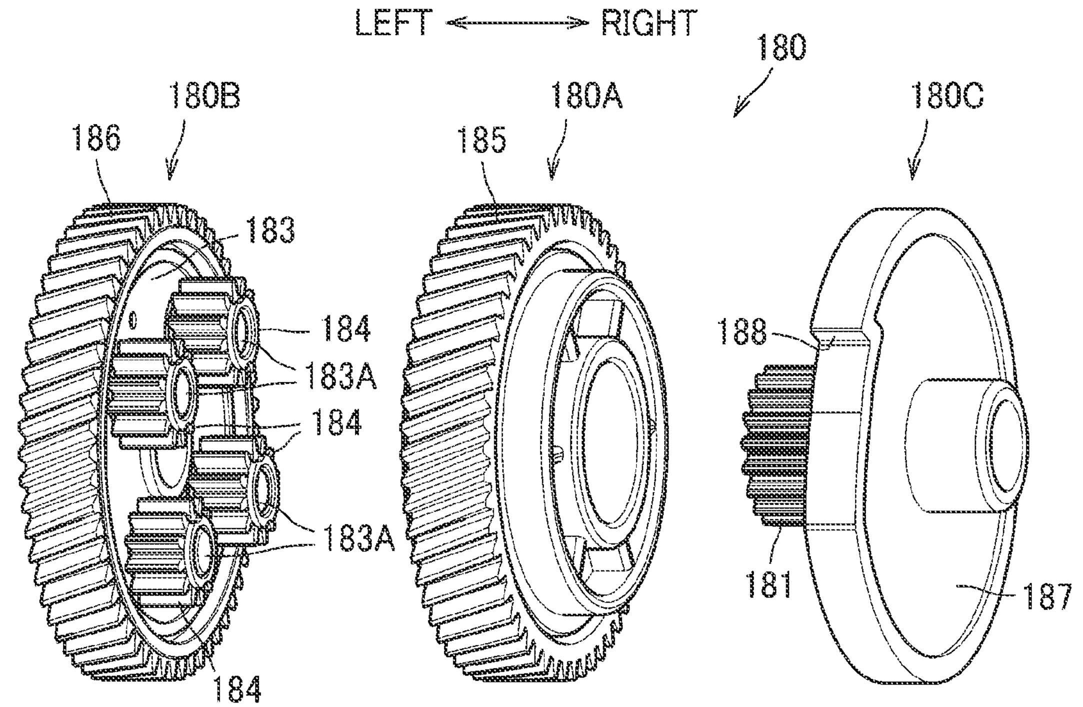
FIG. 11A is an exploded perspective view of the planetary gear train as disassembled, showing transmission-element sides of the respective elements.
Figure 11B:
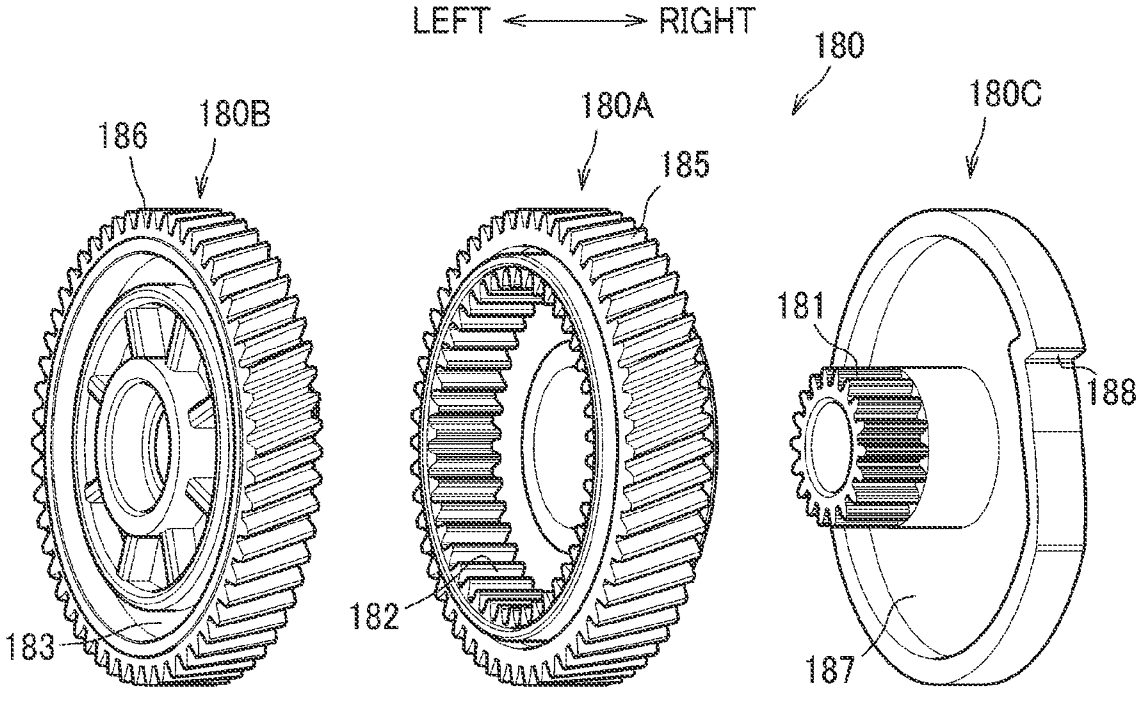
FIG. 11B is an exploded perspective view of the planetary gear train as disassembled, showing output-element sides of the respective elements.

As shown in FIGS. 11A and 11B, the planetary gear train 180 comprises an input element 180A, an output element 180B, and a transmission element 180C. The input element 180A, the output element 180B and the transmission element 180C are coaxially rotatable.

To elaborate, the planetary gear train 180 comprises a sun gear 181, a ring gear 182, a carrier 183, and four planet gears 184. In the planetary gear train 180, one of the input element 180A, the output element 180B and the transmission element 180C includes the sun gear 181; another of the input element 180A, the output element 180B and the transmission element 180C (e.g., an element selected among elements other than the element including the sun gear 181) includes the ring gear 182; and a remaining one of the input element 180A, the output element 180B and the transmission element 180C (e.g., an element other than the element including the sun gear 181 and the element including the ring gear 182) includes the carrier 183. In the illustrated embodiment, the transmission element 180C includes the sun gear 181, the input gear 180A includes the ring gear 182, and the output gear 180B includes the carrier 183.

The input element 180A is an element that receives a driving force derived from the first motor M1 (see FIG. 2). The input element 180A includes the aforementioned ring gear 182, and a first outer peripheral gear 185 formed on the outer periphery of the ring gear 182. The input element 180A receives a driving force derived from the first motor M. Specifically, the first outer peripheral gear 185 of the input element 180A serves to receive the driving force derived from the first motor M.

The output element 180B is an element that outputs a driving force for the first development roller 61K. The output element 180B includes the aforementioned carrier 183 and a second outer peripheral gear 186 formed on the outer periphery of the ring gear 182. The output element also includes four shaft portions 183A by which the planet gears 184 are rotatably supported.

The transmission element 180C is an element configured to be allowed to transmit the driving force from the input element 180A to the output element 180B when a rotation of the transmission element 180C is restricted, and prevented from transmitting the driving force from the input element 180A to the output element 180B when the rotation of the transmission element 180C is not restricted. The transmission element 180C includes the aforementioned sun gear 181, a rotary plate 187, and a pawl portion 188. The rotary plate 187 rotates together with the sun gear 181. The pawl portion 188 is formed on the outer periphery of the rotary plate 187.

The planet gears 184 are rotatably supported on the shaft portions 183A of the carrier 183. The planet gears 184 engage with the sun gear 181, and engage with the ring gear182.

The planetary gear train 180 of which the transmission element 180C is caused to stop rotating is in a transmissible state which allows the driving force received by the first outer peripheral gear 185 to be transmitted to the second outer peripheral gear 186. On the other hand, the planetary gear train 180 of which the transmission element 180C is allowed to rotate is in a disconnecting state which prevents the driving force received by the first outer peripheral gear 185 from being transmitted to the second outer peripheral gear 186. In the planetary gear train 180 in the disconnecting state with the second outer peripheral gear 186 under load conditions, the driving force received by the first outer peripheral gear 185 fails to cause the output element 180 to rotate, and thus let the transmission element 180C idle (rotate under no load conditions).

Referring back to FIG. 2, the idle gear 122 is a two-stage gear including a large-diameter gear 122L and a small-diameter gear 122S having gear teeth less than those of the large-diameter gear 111L. The large-diameter gear 122L engages with the second outer peripheral gear 186 of the planetary gear train 180.

The first coupling gear 126K is a gear that transmits the driving force derived from the first motor M1, to the first development cartridge 60K (to the first development roller 61K). The first coupling gear 126K engages with the small-diameter gear 122S of the idle gear 122.

As shown in FIG. 5A, the first cam 150K further comprises a flange portion 155 and a switching protrusion 156.

The flange portion 155 is formed on a circumference of the disk portion 151. The flange portion 155, in this embodiment, is located on a side of the gear portion 152 facing in a first direction parallel to the rotation axis AX. As viewed from a direction parallel to the rotation axis AX, the flange portion 155 overlaps the gear portion 152. The flange portion 155 extends outward in radial directions of the disk portion 151 (i.e., directions perpendicular to the rotation axis AX) beyond an addendum circle of the gear portion 152.

The switching protrusion 156 is contactable with the switching lever 160 (see FIGS. 7A and 7B) to cause the switching lever 160 to move between a first transmission position and a first disconnection position, which will be described later. The switching protrusion 156 is located on the flange portion 155. To be more specific, the switching protrusion 156 protrudes from the flange portion 155 in the first direction parallel to the rotation axis AX. The switching protrusion 156 is located on a side of the first cam 150K (the flange portion 155 thereof) facing in the first direction parallel to the rotation axis AX. In the first embodiment, the cam surface 154 (the cam portion 153) is located on the same side of the first cam 150K as that on which switching protrusion 156 is located, i.e., on the side of the first cam 150K facing in the first direction parallel to the rotation axis AX.

As shown in FIG. 7B, as viewed from a direction parallel to the rotation axis AX, the retaining surface 154B extends along a segment of a circle of which a center coincides with the rotation axis AX and has two ends E1 and E2 (an end E1 connected to the first guide surface 154A and an end E2 connected to the second guide surface 154C) located apart from each other in a direction of rotation of the first cam 150K, and the switching protrusion 156 is located at least partially within bounds confined by two straight lines L1 and L2 of a sector which are drawn from the rotation axis AX through the two ends E1 and E2 of the retaining surface 154B. To be more specific, the switching protrusion 156 is aligned with the end E2 that is an upstream end of the retaining surface 154B in the first rotation direction R1. The switching protrusion 156 extends from the cam portion 153 outward in a radial direction of the first cam 150K (i.e., a direction perpendicular to the rotation axis AX).

As shown in FIG. 5A, the length of protrusion of the switching protrusion 156 protruding in the first direction parallel to the rotation axis AX is shorter than the distance from the flange portion 155 to the retaining surface 154B in the first direction parallel to the rotation axis AX. In other words, the switching protrusion 156 is provided at a location nearer to the disk portion 150, than the retaining surface 154B, as viewed from a direction perpendicular to the rotation axis AX. The switching protrusion 156 is located in a position retreated from the retaining surface 154B in a second direction (opposite to the first direction) parallel to the rotation axis AX.

As shown in FIG. 6B, the switching lever 160 is rotatable, and is caused to move by the first cam 150K as the first cam 150K rotates, between a first transmission position in which a driving force from the first motor M1 is transmittable to the first development roller 61K, and a first disconnection position in which the driving force from the first motor M1 is not transmitted to the first development roller 61K. The switching lever 160 comprises a rotation support portion 161, a first arm 162, and a second arm 163. The first arm 162 extends from the rotation support portion 161. The second arm 163 extends from the rotation support portion 161 in a direction different from a direction in which the first arm 162 extends.

The rotation support portion 161 is rotatably supported by a shaft (not shown) provided in the housing 10. Accordingly, the switching lever 160 is swingable on a pivot 160A between the first transmission position shown in FIGS. 6A and 6B and the first disconnection position shown in FIGS. 7A and 7B. The switching lever 160 is biased by a spring (not shown) toward the first transmission position.

An end of the second arm 163 extends toward the outer periphery of the transmission element 180C. As shown in FIGS. 6A and 6B, when the switching lever 160 is positioned in the first transmission position, the end of the second arm 163 engages with the pawl portion 188 of the transmission element 180C, and restricts the rotation of the transmission element 180C. Accordingly, the driving force received from the first motor M1 by the planetary gear train 180 is transmitted via the idle gear 122 and the first coupling gear 126K to the first development cartridge 60K, so that the first development roller 61K is caused to rotate.

On the other hand, as shown in FIGS. 7A and 7B, when the switching lever 160 is positioned in the first disconnection position, the end of the second arm 163 is disengaged from the pawl portion 188, and does not restrict the rotation of the transmission element 180C. Accordingly, the driving force received from the first motor M1 by the planetary gear train 180 is not transmitted to the first development cartridge 60K, and the first development roller 61K is not caused to rotate.

The first arm 162 is contactable with the switching protrusion 156 of the first cam 150K. As shown in FIGS. 6A and 6B, when the first arm 162 gets out of contact with the switching protrusion 156, the switching lever 160 is caused to swing to the first transmission position by the action (biasing force) of the spring (not shown). As shown in FIGS. 7A and 7B, when the first arm 162 comes in contact with the switching protrusion 156, the switching lever 160 is caused to swing to the first disconnection position against the biasing force of the spring (not shown).

When the first development cartridge 60K is positioned in the contact position, the switching protrusion 156 serves to cause the switching lever 160 to be positioned in the first transmission position. When the first development cartridge 60K is in the separate position, the switching protrusion 156 serves to cause the switching lever 160 to be positioned in the first disconnection position. Accordingly, when the first development roller 61K is in contact with the first photosensitive drum 50K, the first development roller 61K is caused to rotate, and when the first development roller 61K is separate from (out of contact with) the first photosensitive drum 50K, the first development roller 61K is caused to stop rotating.

The switching protrusion 156 in the first cam 150K serves to cause the switching lever 160 to move to the first disconnection position at a time t12 after a time t11 of completion of movement of the first development cartridge 60K to the separate position, and thereby causes the first development roller 61K to stop rotating. The switching protrusion 156 in the first cam 150K also serves to cause the switching lever 160 to move to the first transmission position at a time t13 before a time t14 of completion of movement of the first development cartridge 60K to the contact position, and thereby causes the first development roller 61K to rotate.

Figure 12A:
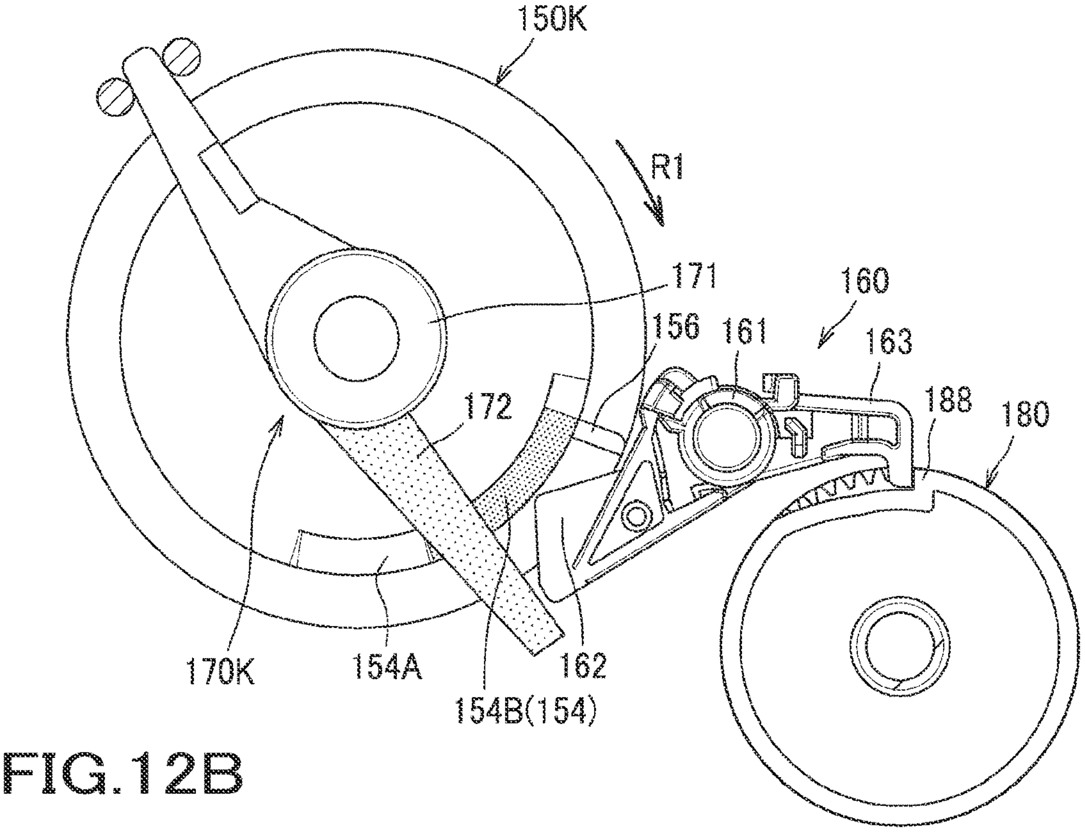
FIG. 12A is a side elevational view showing a state of arrangement of the first cam, the switching lever and the planetary gear train, at a time after the first development cartridge moves to the separate position before the development roller stops rotating.
Figure 12B:
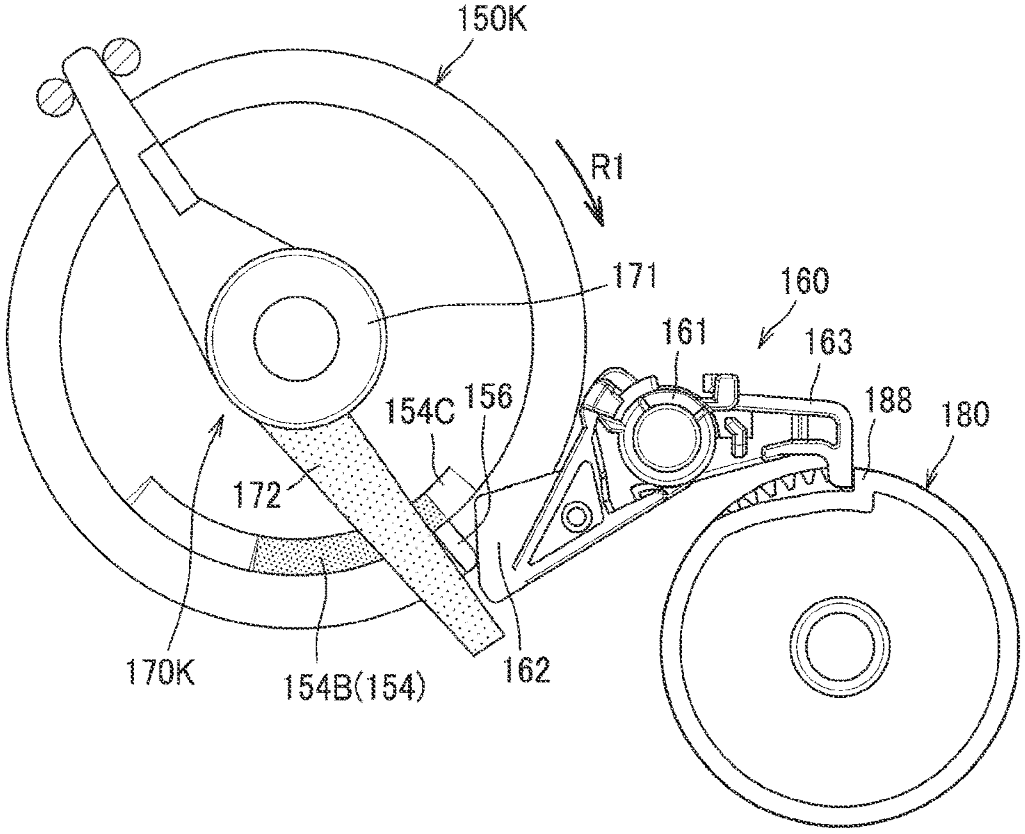
FIG. 12B is a side elevational view showing a state of arrangement of the first cam, the switching lever and the planetary gear train, at a time when the first development roller starts rotating before the first cartridge moves to contact position.

Specifically, after the contact arm 172 of the first cam follower 170K guided from the first guide surface 154 to the retaining surface 154B has got retained on the retaining surface 154B as shown in FIG. 12A, the switching protrusion 156 comes in contact with the first arm 162 and causes the switching lever 160 to swing from the first transmission position to the first disconnection position as shown in FIG. 7B. Before the contact arm 172 of the first cam follower 170K is guided from the retaining surface 154B to the second guide surface 154C, the switching protrusion 156 gets out of contact with the first arm 162 and causes the switching lever 160 to swing from the first disconnection position to the first transmission position as shown in FIG. 12B.

Next, a description will be given of a mechanism for switching between transmission of a driving force and disconnection of the transmission, to selectively transmit and stop transmitting the driving force to the second development roller 61Y, the third development roller 61Y and the fourth development roller 61C.

As shown in FIG. 9, the second development driving gear train 130 comprises idle gears 131, 132, an input gear 133, a movable gear 134, an output gear 135, a second coupling gear 136Y, a third coupling gear 136M, an idle gear 137, and a fourth coupling gear 136C.

Figure 13:
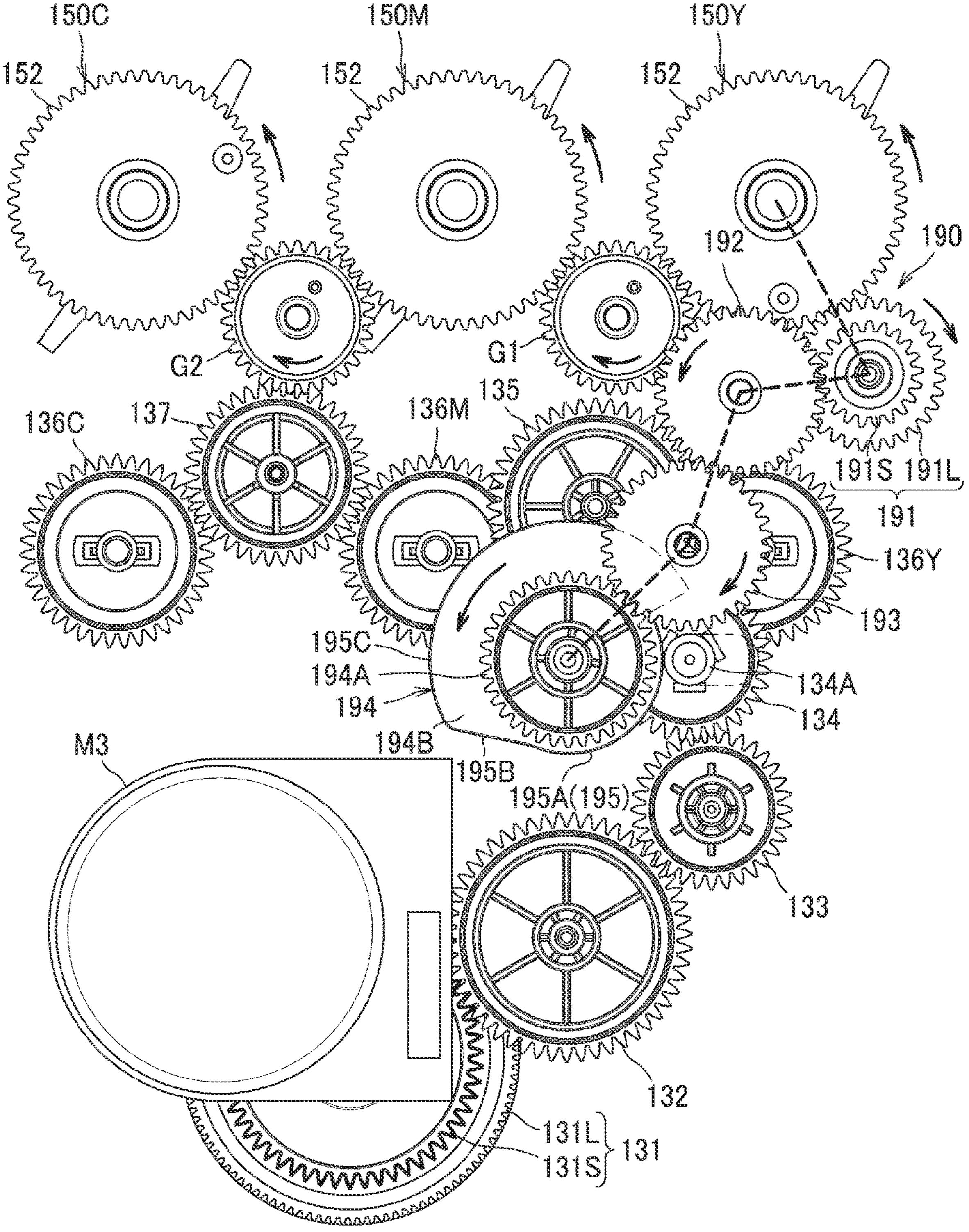
FIG. 13 is a side elevational view showing the second cam, the third cam, the fourth cam, and a switching gear train as illustrated when the movable gear is in a second transmission position.

The idle gear 131 is a two-stage gear including a large-diameter gear 131L and a small-diameter gear 131S having gear teeth less than those of the large-diameter gear 131L (see FIG. 13). The large-diameter gear 131L engages with a gear MG provided on the output shaft of the third motor M3.

The idle gear 132 engages with the small-diameter gear 131S of the idle gear 131.

The input gear 133 engages with the idle gear 132. The input gear 133 receives a driving force from the third motor M3 via the idle gears 131, 132.

The movable gear 134 engages with the input gear 133. The movable gear 134 is movable between a second transmission position as a transmission position indicated by a solid line and a second disconnection position as a disconnection position indicated by a chain double-dashed line. To be more specific, the movable gear 134 is rotatably supported by a bearing 134A (see FIG. 13), and the bearing 134A is supported swingably on the input gear 133, by the housing 10. Accordingly, the movable gear 134 is rendered swingable on the input gear 133 between the second transmission position and the second disconnection position. The movable gear 134 in the second transmission position engages with the large-diameter gear 135L of the output gear 135. The movable gear in the second disconnection position does not engage with the large-diameter gear 135L of the output gear 135.

The output gear 135 is a gear that outputs a driving force for the second development roller 61Y, the third development roller 61M and the fourth development roller 61C. The output gear 135 is a two-stage gear including a large-diameter gear 135L and a small-diameter gear 135S having gear teeth less than those of the large-diameter gear 135L. The large-diameter gear 135L is engageable with the movable gear 134.

The second coupling gear 136Y is a gear that transmits a driving force derived from the third motor M3, to the second development cartridge 60Y (the second development roller 61Y). The second coupling gear 136Y engages with the small-diameter gear 135S of the output gear 135.

The third coupling gear 136M is a gear that transmits a driving force derived from the third motor M3, to the third development cartridge 60M (the third development roller 61M). The third coupling gear 136M engages with the small-diameter gear 135S of the output gear 135.

The idle gear 137 engages with the third coupling gear 136M.

The fourth coupling gear 136C is a gear that transmits a driving force derived from the third motor M3, to the fourth development cartridge 60C (the fourth development roller 61C). The fourth coupling gear 136C engages with the idle gear 137.

As shown in FIG. 13, the image forming apparatus 1 further comprises a switching gear train 190.

The switching gear train 190 causes the movable gear 134 to move between the second transmission position and the second disconnection position. The switching gear train 190 comprises idle gears 191, 192, 193, and a switching cam 194.

The idle gear 191 is a two-stage gear including a large-diameter gear 191L and a small-diameter gear 191S having gear teeth less than those of the large-diameter gear 191L. The large-diameter gear 191L engages with the gear portion 152 of the second cam 150Y. The idle gear 192 engages with the small-diameter gear 191S of the idle gear 191. The idle gear 193 engages with the idle gear 192.

The switching cam 194 is a plate cam that rotates to thereby cause the movable gear 134 to move between the second transmission position and the second disconnection position. The switching cam 194 includes a gear portion 194A and a cam portion 194B.

The gear portion 194A engages with the idle gear 193. Accordingly, the switching cam 194 rotates in synchronization with the second cam 150Y.

The cam portion 194B has a cam surface 195 formed on the outer periphery thereof. The cam surface 195 includes a first retaining surface 195A, a switching surface 195B, and a second retaining surface 195C.

The first retaining surface 195A serves to cause the movable gear 134 to be positioned in the second transmission position. When the movable gear 134 is positioned in the second transmission position, the first retaining surface 195A may either be in contact with the bearing 134A or separate from the bearing 134A.

Figure 14:
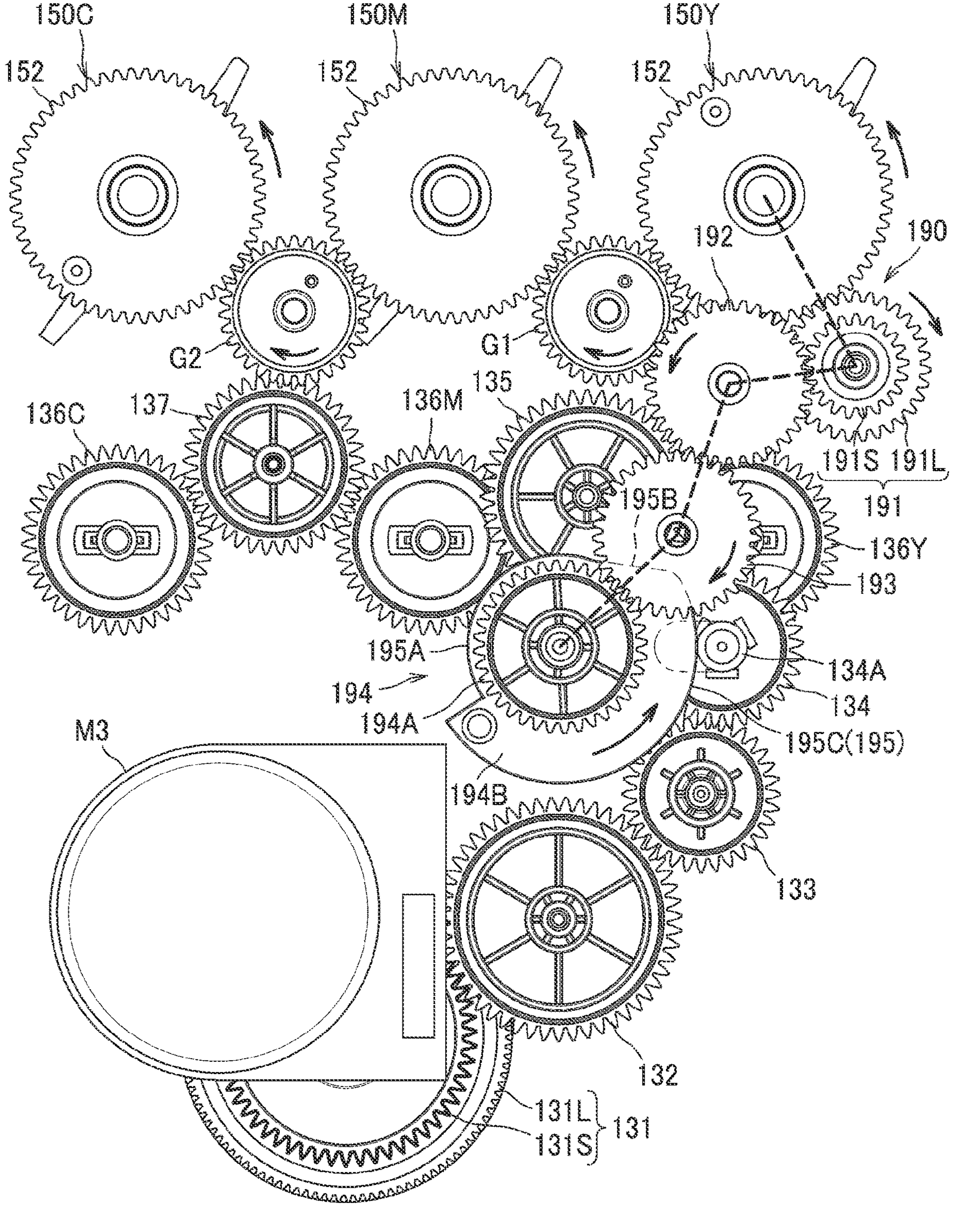
FIG. 14 is a side elevational view showing the second cam, the third cam, the fourth cam, and the switching gear train as illustrated when the movable gear is in the second disconnection position.

The second retaining surface 195C serves to cause the movable gear 134 to be retained in the second disconnection position (see FIG. 14). Each of the first retaining surface 195A and the second retaining surface 195C has a shape of a circular arc of which a center of curvature coincides with a rotation axis of the switching cam 194. A distance from the rotation axis of the switching cam 194 to the second retaining surface 195C is longer than a distance from the rotation axis of the switching cam 194 to the first retaining surface 195A.

The switching surface 195B serves to cause the movable gear 134 to move from the second transmission position to the second disconnection position. The switching surface 195B is a flat surface that connects the first retaining surface 195A and the second retaining surface 195C. Specifically, the switching surface 195 has two ends located apart from each other, of which a downstream end is connected to an upstream end of the first retaining surface 195A and an upstream end is connected to a downstream end of the second retaining surface 195C in the direction of rotation of the movable gear 134 (see an arrow in FIGS. 13 and 14).

The switching cam 194 rotates in synchronization with the cams 150Y, 150M, 150C. When the movable gear 134 is positioned in the second transmission position as shown in FIG. 13, rotation of the switching cam 194 in the counterclockwise direction of FIG. 13 brings the switching surface 195B into contact with the bearing 134A, whereby the movable gear 134 is caused to move to the right (from the position shown in FIG. 13 to the position shown in FIG. 14) by the switching surface 195B. When the second retaining surface 195*C comes* in contact with the bearing 134A, the movable gear 134 reaches the second disconnection position. While the second retaining surface 195C is in contact with the second retaining surface 195C, the movable gear 134 remains in the second disconnection position as shown in FIG. 14.

On the other hand, when the movable gear 134 is positioned in the second disconnection position as shown in FIG. 14, further rotation of the switching cam 194 in the counterclockwise direction of FIG. 14 causes the second retaining surface 195C to get out of contact with the bearing 134A, and causes the first retaining surface 195A to face the bearing 134A with the result that the movable gear 134 is caused to move from the second disconnection position to the second transmission position by the force received from the rotating input gear 133. It is to be understood that an optional element, such as a spring for biasing the movable gear 134 toward the second transmission position, may be provided to cause the movable gear 134 to move from the second disconnection position to the second transmission position.

The switching cam 194 causes the movable gear 134 to be positioned in the second transmission position when the development cartridges 60Y, 60M and 60C are positioned in the respective contact positions, and to be position in the second disconnection position when the development cartridges 60Y, 60M and 60C are positioned in the respective separate positions. Accordingly, the development rollers 61Y, 61M and 61C in contact with the corresponding photosensitive drums 50Y, 50M and 50C are caused to rotate, while the development rollers 61Y, 61M and 61C separate from the corresponding photosensitive drums 50Y, 50M and 50C are caused to stop rotating.

The switching cam 194 is configured, as shown in FIG. 8, such that the movable gear 134 is caused to move to the disconnection position to cause the development rollers 61Y, 61M and 61C to stop rotating, at a time t6 after a time t5 of completion of movement of the fourth development cartridge 60C to the separate position. Further, the switching cam 194 is configured such that the movable gear 134 is caused to move to the transmission position to cause the development rollers 61Y, 61M and 61C to rotate, at a time t7 before a time t9 completion of movement of the second development cartridge 60Y to the contact position.

Next, a description will be given of a mechanism for forcefully causing the cam followers 170 to move to the respective no-push positions to cause the development cartridges 60 to move to the respective contact positions by operation of opening the cover 11 as an example of a second cover.

Figure 15:
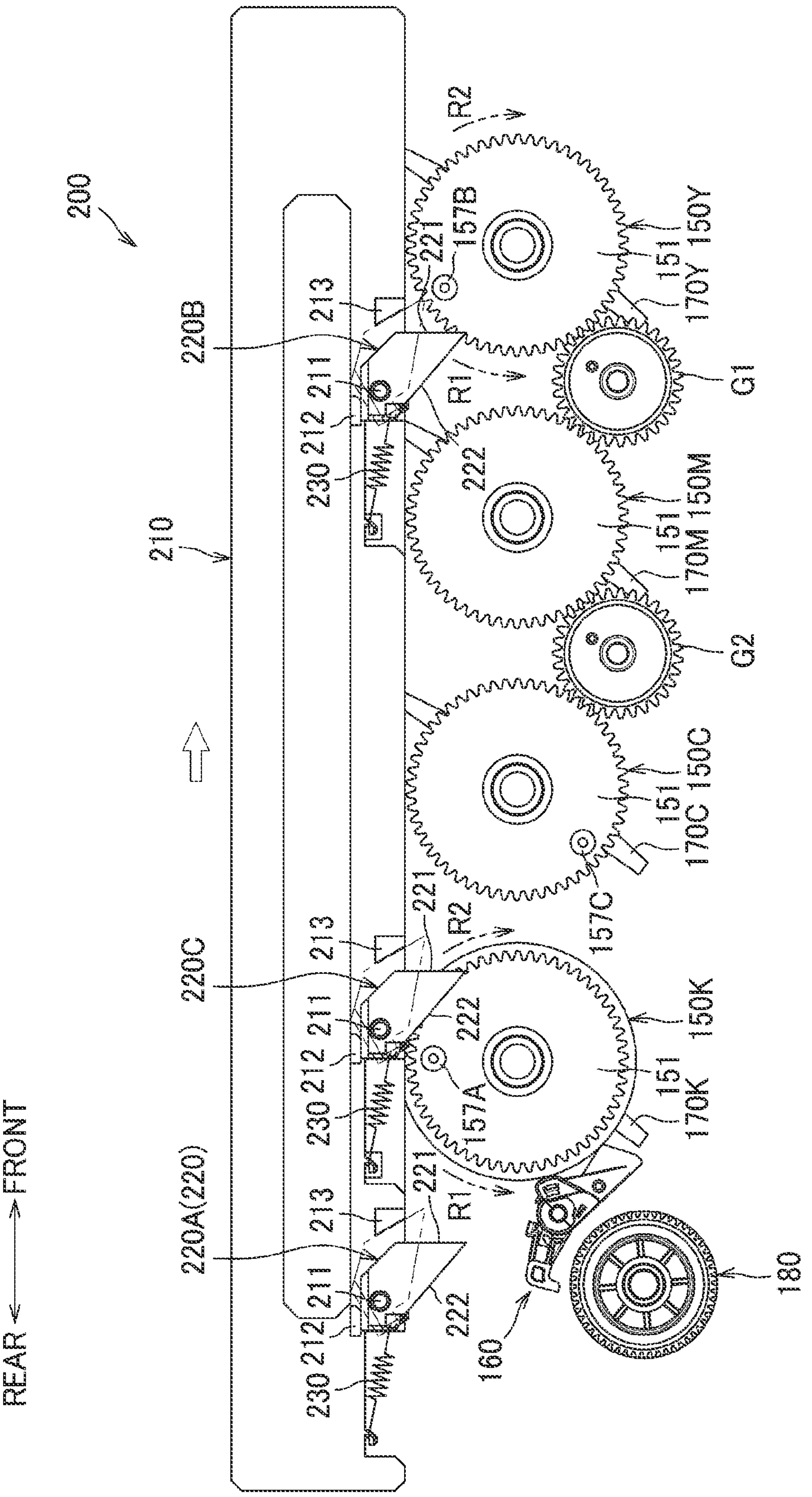
FIG. 15 is a side elevational view of the cams and a translation plate.

As shown in FIG. 15, the image forming apparatus 1 further comprises a translation plate 200. The cam 150 includes a protrusion 157A, 157B or 157C. Specifically, the first cam 150K includes a first protrusion 157A, the second cam 150Y includes a second protrusion 157B, and the fourth cam 150C includes a third protrusion 157C.

The translation plate 200 makes a translational motion synchronized with the cover 11's motion (see FIG. 1) between the closing position and the open position, in a direction perpendicular to the rotation axis AX and is thereby caused to move between a first position in which the translation plate 200 is located when the cover 11 is in the closing position and a second position (see FIG. 20B) in which the translation plate 200 is located when the cover is in the open position. Specifically, the translation plate 200 makes a translational motion between the first position and the second position, in opposite directions, frontward and rearward, that is parallel to a direction of arrangement of the photosensitive drums 50, in synchronization with a user's operations of opening and closing the cover 11. The second position is frontward of the first position. The translation plate 200 is caused to move from the first position to the second position by a user's operation of opening the cover 11, and to move from the second position to the first position by a user's operation of closing the cover 11.

When the first cam follower 170K is positioned in the push position and the translation plate 200 moves from the first position to the second position, the translation plate 200 comes in contact with the first cam 150K and causes the first cam 150K to rotate and thereby causes the first cam follower 170K to be moved and positioned in the no-push position. When at least one of the second cam follower 170Y, the third cam follower 170M and the fourth cam follower 170C is positioned in the push position and the translation plate 200 moves from the first position to the second position, the translation plate 200 causes the second cam 150Y, the third cam 150M and the fourth cam 150C to rotate and thereby causes the second cam follower 170Y, the third cam follower 170M and the fourth cam follower 170C to be positioned in the respective no-push positions thereof.

In the first embodiment, the translational motion of the translation plate 200 from the first position to the second position, made when the first cam follower 170K is positioned in the push position, causes the first cam 150K to rotate in a second rotation direction R2 opposite to the first rotation direction R1 and thereby causes the first cam follower 170K to be moved and positioned in the no-push position. The translational motion of the translation plate 200 from the first position to the second position, made when at least the second cam follower 170Y is positioned in the push position, causes the second cam 150Y, the third cam 150M and the fourth cam 150C to rotate in the second rotation direction R2 opposite to the first rotation direction R1 and thereby causes the second cam follower 170Y, the third cam follower 170M and the fourth cam follower 170C to be positioned in the respective no-push positions thereof.

The first protrusion 157A is contactable with the translation plate 200. When the translation plate 200 moving from the first position to the second position comes in contact with the first protrusion 157A, the first cam 150K is caused to rotate. The first protrusion 157A protrudes from a side surface of the disk portion 151 of the first cam 150K in the second direction parallel to the rotation axis AX. To be more specific, the second direction in which the first protrusion 157A protrudes from the disk portion 151 is an opposite direction opposite to the first direction in which the cam portion 153 and the switching protrusion 156 protrudes (see FIG. 5A). The first protrusion 157A is located on an opposite side of the first cam 150K (facing in the second direction parallel to the rotation axis AX) opposite to the side on which the cam portion 153 and the switching protrusion 156 are located. The first protrusion 157A has a cylindrical shape. In other words, the first protrusion 157A has a cylindrical surface contactable with a first swingable piece 220A, which will be described later, of the translation plate 200.

The second protrusion 157B is contactable with the translation plate 200. When the translation plate 200 moving from the first position to the second position comes in contact with the second protrusion 157B, the second cam 150Y, the third cam 150M, and the fourth cam 150C are caused to rotate. The second protrusion 157B protrudes from the side surface of the disk portion 151 of the second cam 150Y in the second direction parallel to the rotation axis AX. The second protrusion 157B is located on the opposite side of the second cam 150Y (facing in the second direction parallel to the rotation axis AX) opposite to the side on which the cam portion 153 is located. The second protrusion 157B has a cylindrical shape. In other words, the second protrusion 157B has a cylindrical surface contactable with a second swingable piece 220B, which will be described later, of the translation plate 200.

The third protrusion 157C is contactable with the translation plate 200. When the translation plate 200 moving from the first position to the second position comes in contact with the third protrusion 157C, the second cam 150Y, the third cam 150M, and the fourth cam 150C are caused to rotate. The third protrusion 157C protrudes from the side surface of the disk portion 151 of the fourth cam 150C in the second direction parallel to the rotation axis AX. The third protrusion 157C is located on the opposite side of the fourth cam 150C (facing in the second direction parallel to the rotation axis AX) opposite to the side on which the cam portion 153 is located. The third protrusion 157C has a cylindrical shape. In other words, the third protrusion 157C has a cylindrical surface contactable with a third swingable piece 220C, which will be described later, of the translation plate 200.

For instance, in the first embodiment, as viewed in a direction parallel to the rotation axis AX (see FIG. 17A), the first protrusion 157A is located on an end of the first cam 150K opposite to an end on which the cam surface 154 is located, across the rotation axis AX of the first cam 150K. Similarly, as viewed in the direction parallel to the rotation axis AX, the second protrusion 157B is located on an end of the second cam 150Y opposite to an end on which the cam surface 154 is located, across the rotation axis AX of the second cam 150Y On the other hand, as viewed in the direction parallel to the rotation axis AX, the third protrusion 157C is located in such a position as to overlap the upstream end of the retaining surface 154B of the fourth cam 150C in the first rotation direction R1.

As shown in FIG. 15, the translation plate 200 includes a translation plate body 210, swingable pieces 220 as an example of a contact piece, and three springs 230 as examples of a second spring.

The translation plate body 210 is supported by the housing 10 in such a manner that the translation plate body 210 can move frontward and rearward in synchronization with the opening/closing motion of the cover 11. The translation plate body 210 is connected to the cover via a link (not shown).

The swingable pieces 220 are supported by the translation plate body 210 and move frontward and rearward together with the translation plate body 210. In the first embodiment, the swingable pieces 220 include a first swingable piece 220A as an example of a first contact piece and a third contact piece, a second swingable piece 220B as an example of a second contact piece, and a third swingable piece 220C. In the first embodiment, the first swingable piece 220A doubles as the first contact piece and the third contact piece.

Each of the swingable pieces 220 is contactable with the corresponding protrusion(s) (157A, 157B, 157C) when the corresponding cam follower(s) 170 is in the push position and the translation plate 200 moves between the first position and the second position.

When the first cam follower 170K is positioned in the push position, the first swingable piece 220A is caused to contact the first protrusion 157A of the first cam 150K by the translational motion of the translation plate 200 from the first position to the second position. When the translational motion of the translation plate 200 from the first position to the second position causes the first swingable piece 220A to contact the first protrusion 157A, the first swingable piece 220A causes the first cam 150K to rotate, to thereby cause the first cam follower 170K to be moved and positioned in the no-push position.

The first swingable piece 220A is contactable with the third protrusion 157C of the fourth cam 150C when the translation plate 200 moves from the first position to the second position. When the translational motion of the translation plate 200 from the first position to the second position causes the first swingable piece 220A to contact the third protrusion 157C, the first swingable piece 220A causes the second cam 150Y, the third cam 150M, and the fourth cam 150C to rotate, to thereby cause the second cam follower 170Y, the third cam follower 170M, and the fourth cam follower 170C to be positioned in the no-push position.

When the second cam follower 170Y corresponding to the second cam 150Y including the second protrusion 157B is positioned in the push position, the second swingable piece 220B is contactable with the second protrusion 157B of the second cam 150Y during the translational motion of the translation plate 200 from the first position to the second position. When the translational motion of the translation plate 200 from the first position to the second position causes the second swingable piece 220B to contact the second protrusion 157B, the second swingable piece 220B causes the second cam 150Y, the third cam 150M, and the fourth cam 150C to rotate.

In the first embodiment, when the translation plate 200 moves from the first position to the second position, the first swingable piece 220A is caused to contact the third protrusion 157C, at a time after the second swingable piece 220B is caused to contact the second protrusion 157B. To be more specific, when the translation plate 200 moves from the first position to the second position, the first swingable piece 220A is caused to contact the third protrusion 157C, at a time after the second swingable piece 220B is caused to separate from the second protrusion 157B.

The third swingable piece 220C is contactable with the third protrusion 157C of the fourth cam 150C when the translation plate 200 moves from the first position to the second position. When the translational motion of the translation plate 200 from the first position to the second position causes the third swingable piece 220C to contact the third protrusion 157C, the third swingable piece 220C causes the second cam 150Y, the third cam 150M, and the fourth cam 150C to rotate, to thereby cause the second cam follower 170Y to be positioned in the no-push position.

The swingable pieces 220 are swingably supported by the translation plate 210. To be more specific, each of the swingable pieces 220 is supported swingably on a pivot shaft 211 provided in the translation plate body 210. Each swingable piece 220 is swingable between an acting position indicated by a solid line and a retreat position indicated by a chain double-dashed line. The translation plate body 210 includes a first swinging motion restriction portion 212 and a second swinging motion restriction portion 213 for each swingable piece 220. The first swinging motion restriction portion 212 and the second swinging motion restriction portion 213 serve to restrict a range (limits) of swinging motion of the corresponding swingable piece 220. The swingable piece 220 in the acting position is in contact with the first swinging motion restriction portion 212. The swingable piece 220 in the retreating position is in contact with the second swinging motion restriction portion 213. Each of the swingable pieces 220 is biased by a corresponding spring 230 toward the acting position.

Each of the swingable pieces 220 (the first swingable piece 220A, the second swingable piece 220B, and the third swingable piece 220C) has a first contact surface 221 and a second contact surface 222. The first contact surface 221 in the acting position of the swingable piece 220 faces frontward in a direction approximately perpendicular to a direction of the translational motion of the translation plate 200. The second contact surface 222 in the acting position of the swingable piece 220 faces in an obliquely-rearward-and-downward direction that is a direction inclined with respect to the direction of the translational motion of the translation plate 200.

The first contact surface 221 of the first swingable piece 220A contacts the first protrusion 157A of the first cam 150K when the first cam follower 170K is positioned in the push position and the translation plate 200 moves from the first position to the second position. The first contact surface 221 of the first swingable piece 220A is contactable with the third protrusion 157C of the fourth cam 150C when the translation plate 200 moves from the first position to the second position. The first contact surface 221 of the second swingable piece 220B is contactable with the second protrusion 157B of the second cam 150Y when the translation plate 200 moves from the first position to the second position. The first contact surface 221 of the third swingable piece 220C is contactable with the third protrusion 157C of the fourth cam 150C when the translation plate 200 moves from the first position to the second position.

Figure 16A:
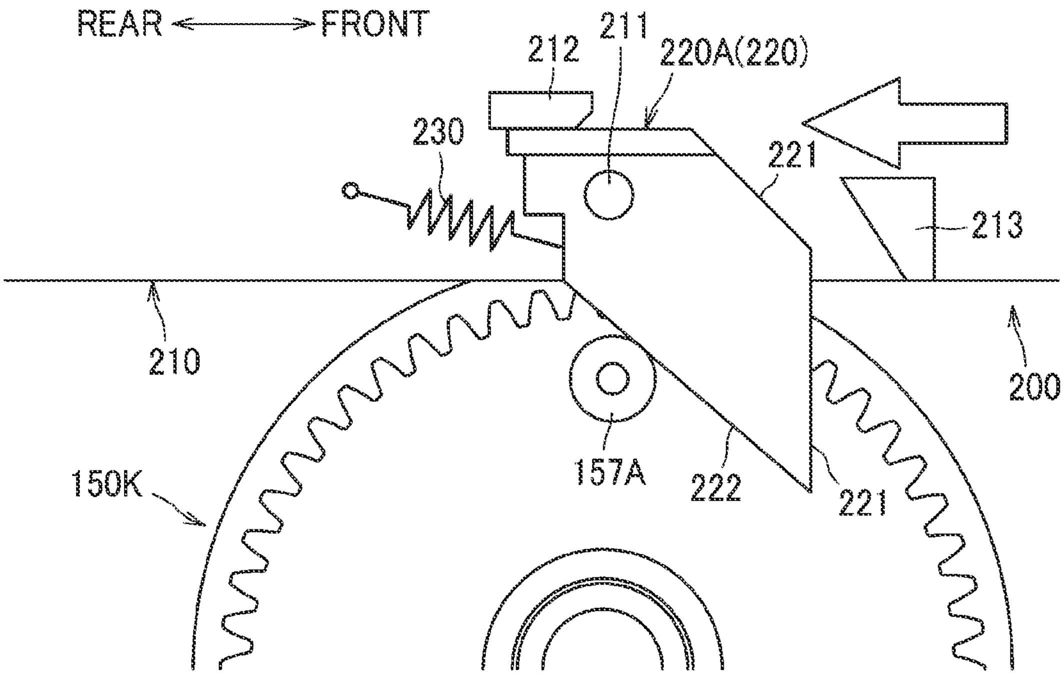
FIGS. 16A and 16B are diagrams for explaining motion of a contact piece as observed when and after a translational motion of the translation plate from a second position to a first position causes the contact piece to contact a protrusion of the cam.
Figure 16B:
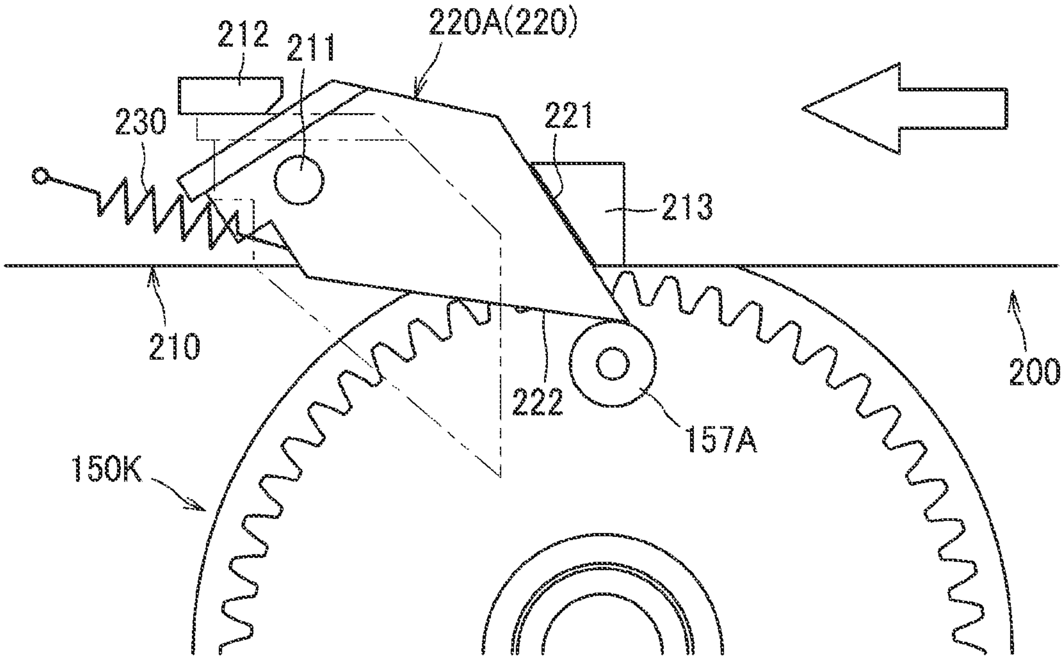

The second contact surfaces 222 are contactable with the first protrusion 157A, the second protrusion 157B and the third protrusion 157C when the translation plate 200 moves from the second position to the first position, that is, when the cover 11 is closed. As shown in FIG. 16A, for example, when the translational motion of the translation plate 200 from the second position rearward to the first position causes the second contact surface 222 of the first swingable piece 220A to contact the first protrusion 157A, the first swingable piece 220A is caused to retreat from the acting position to the retreating position as shown in FIG. 16B, whereby the first cam 150K is prevented from rotating.

Similarly, when the second contact surface 222 of the first swingable piece 220A is caused to contact the second protrusion 157B of the second cam 150Y, the second cam 150Y is not caused to rotate; and when the second contact surface 222 of the first swingable piece 220A is caused to contact the third protrusion 157C of the fourth cam 150C, the fourth cam 150C is not caused to rotate. Also, when the second contact surface 222 of the third swingable piece 220C is caused to contact the second protrusion 157B of the second cam 150Y, the second cam 150Y is not caused to rotate; and when the second contact surface 222 of the third swingable piece 220C is caused to contact the third protrusion 157C of the fourth cam 150C, the fourth cam 150C is not caused to rotate. Furthermore, when the second contact surface 222 of the second swingable piece 220B is caused to contact the second protrusion 157B of the second cam 150Y, the second cam 150Y is not caused to rotate.

The spring 230 is provided for each swingable piece 220. The spring 230 biases and causes the corresponding swingable piece 220 to move from the retreating position indicated by a solid line to an acting position indicated by a chain double-dashed line as shown in FIG. 16B. The spring 230 is, for example, an extension coil spring.

Next, a description will be given of an operation of the translation plate 200.

Figure 17A:
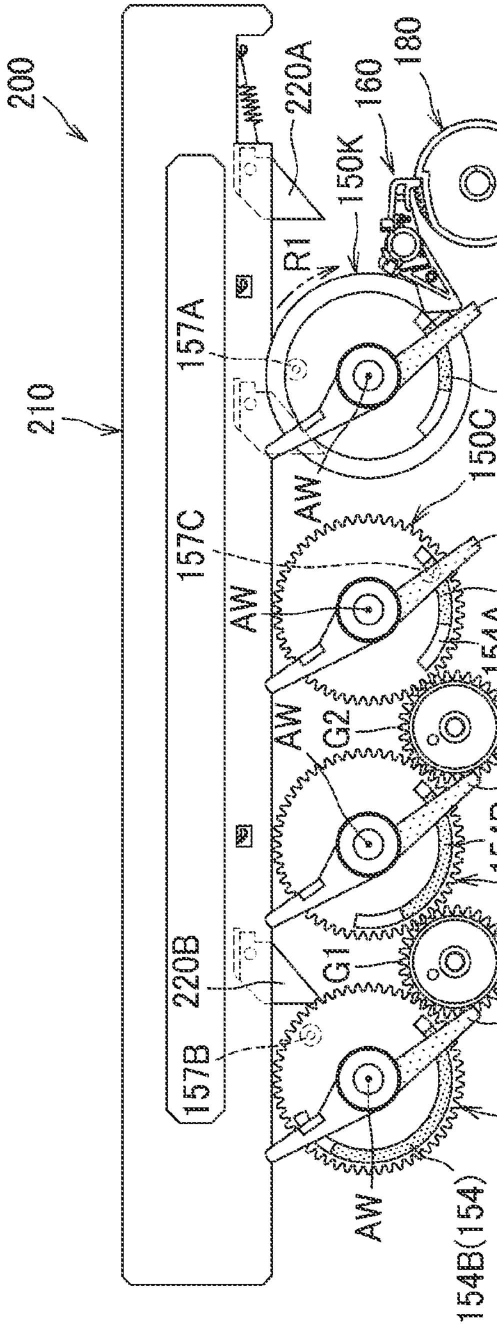
FIGS. 17A, 17B, 18A, 18B, 19A, 19B, 20A and 20B are diagrams for explaining a process of operation of the translation plate according to the first embodiment.

When the image forming apparatus 1 is in a standby state before executing a printing process or after normal completion of the printing process, all the development cartridges 60 are located in the separate positions. In this state, as shown in FIG. 17A, each cam follower 170 is located in the push position and each contact arm 172 is in contact with the retaining surface 154B of the corresponding cam 150. The contact arm 172 is in contact with the upstream end of the retaining surface 154B in the first rotation direction R1. In this situation, the first swingable piece 220A of the translation plate positioned in the first position is contactable with the first protrusion 157A of the first cam 150K, and the second swingable piece 220B is contactable with the second protrusion 157B of the second cam 150Y.

Figure 17B:
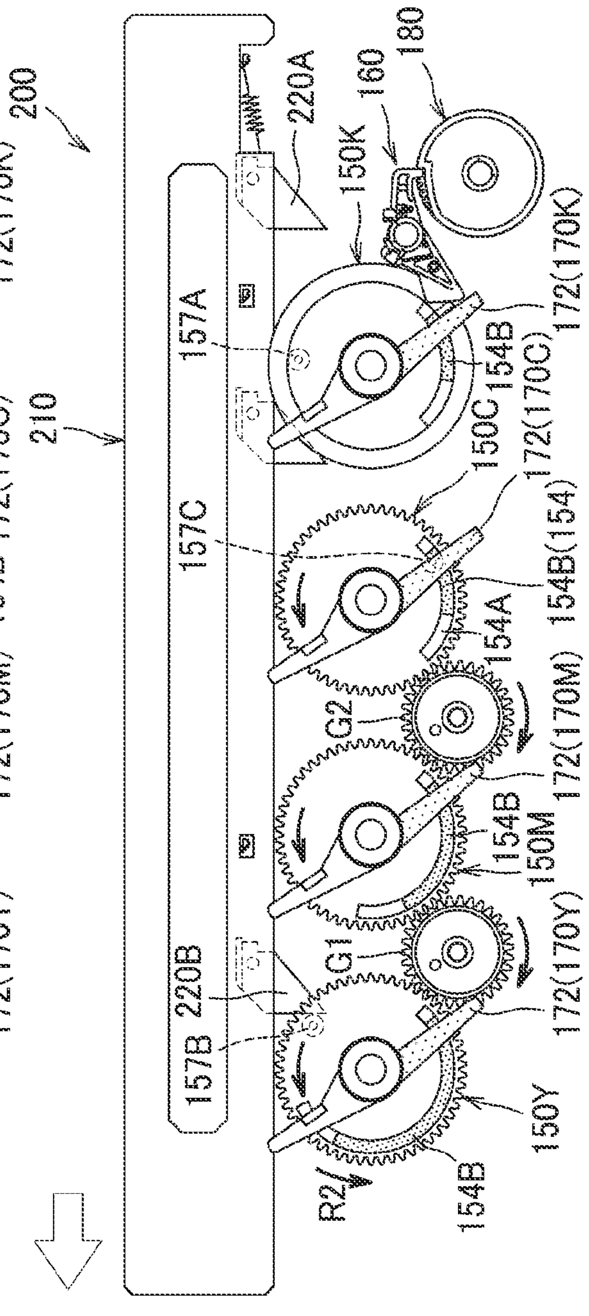

When the cover 11 is swung from the closing position toward the open position, the translation plate 200 moves frontward as shown in FIG. 17B from the first position toward the second position, in synchronization with the cover 11's swinging (opening) motion. In this operation, first, the second swingable piece 220B of the translation plate 200 comes in contact with the second protrusion 157B of the second cam 150Y. Then, as the translation plate 200 moves further frontward, the second protrusion 157B is pushed by the second swingable piece 220B, whereby the second cam 150Y, the third cam 150M, and the fourth cam 150C are caused to rotate in the second rotation direction R2 that is opposite to the first rotation direction R1, in synchronization with the second swingable piece 220B's swinging motion.

Accordingly, the contact arms 172 of the cam followers 170Y, 170M and 170C slide on the retaining surfaces 154B of the corresponding cams 150Y, 150M and 150C toward the first guide surfaces 154A thereof. Then, the contact arm 172 of the fourth cam follower 170C guided on the retaining surface 154B of the corresponding fourth cam 150C, first, moves onto the first guide surface 154A of the fourth cam 150C, and slides on the first guide surface 154A until the contact arm 172 gets out of contact with the cam surface 154. In this way, the fourth cam follower 170C slides from the push position to the no-push position, and the fourth development cartridge 60C moves from the separate position to the contact position.

Figure 18A:
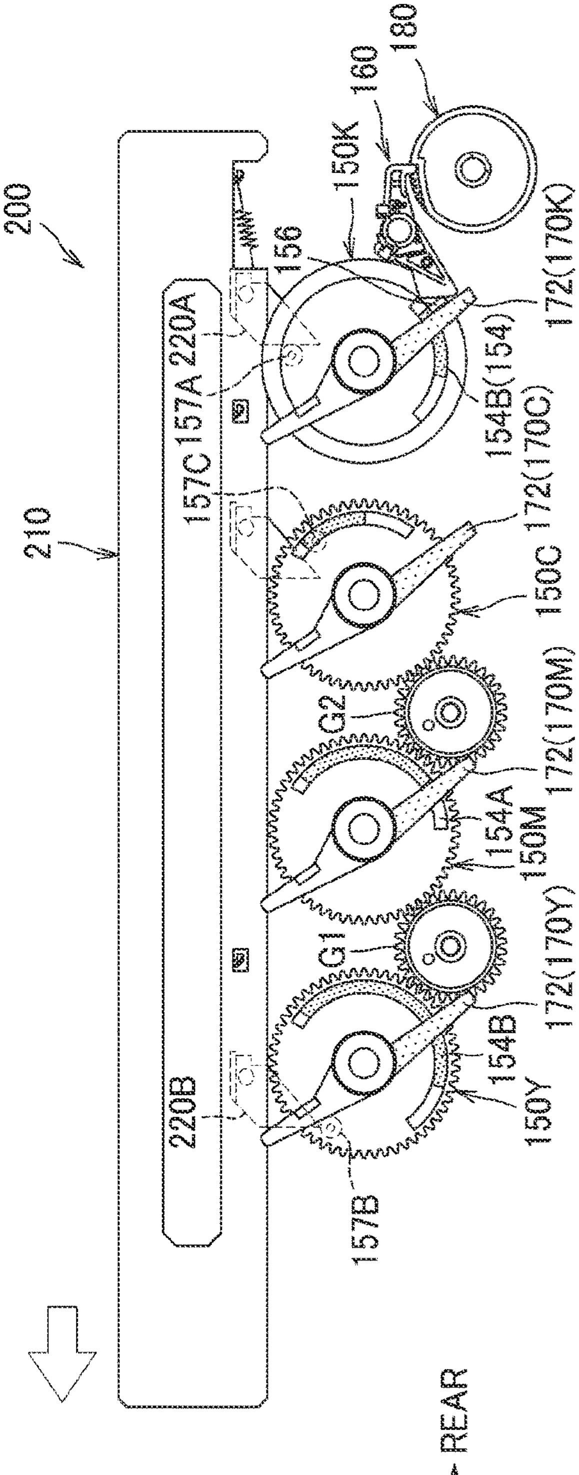

As shown in FIG. 18A, after the translational motion of the translation plate 200 and the associated rotational motions of the cams 150Y, 150M and 150C cause the second protrusion 157B to get out of contact with, and no longer pushed by, the second swingable piece 220B, the cams 150Y, 150M and 150C are caused to stop rotating. In this situation, the fourth cam follower 170C is positioned in the no-push position, the third cam follower 170M have its contact arm 172 positioned on the first guide surface 154A of the third cam 150M, and the second cam follower 170Y with its contact arm 172 positioned on the retaining surface 154 is still positioned in the push position.

Figure 18B:
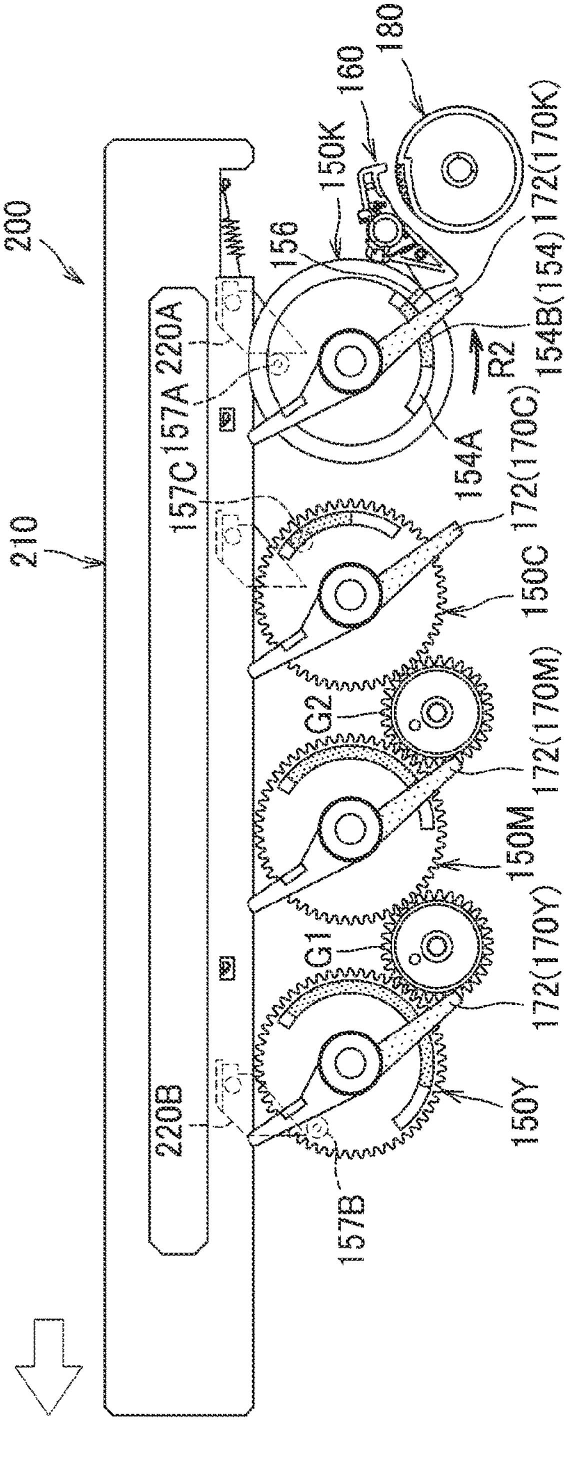

After the second protrusion 157B gets out of contact with, and no longer pushed by, the second swingable piece 220B, the first swingable piece 220A of the translation plate 200 moving frontward toward the second position comes in contact with the first protrusion 157A of the first cam 150K. As shown in FIG. 18B, further translational motion of the translation plate 200 frontward toward the second position causes the first protrusion 157A to be pushed by the first swingable piece 220A whereby the first cam 150K is caused to rotate in the second rotation direction R2 that is opposite to the first rotation direction R1.

Figure 19A:
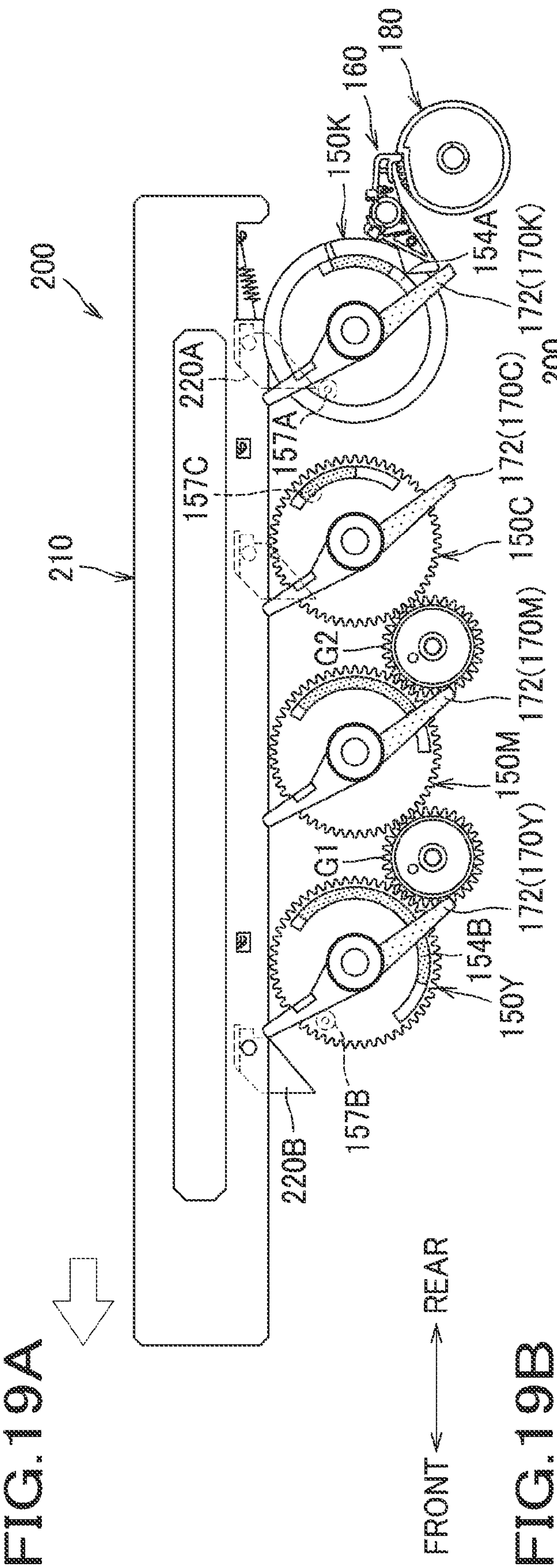

Accordingly, the contact arm 172 of the first cam follower 170K is caused to slide on the retaining surface 154B of the first cam 150K toward the first guide surface 154A. The contact arm 172 of the first cam follower 170K thus guided and caused to slide from the retaining surface 154B to the first guide surface 154A of the first cam 150K is caused to slide on the first guide surface 154A as shown in FIG. 19A. In this way, the first cam follower 170K is caused to slide from the push position to the no-push position whereby the first development cartridge 60K is caused to move from the separate position to the contact position.

After the translational motion of the translation plate 200 and the associated rotational motion of the first cam 150K cause the first protrusion 157A to get out of contact with, and no longer pushed by, the first swingable piece 220A, the first cam 150K is caused to stop rotating. In this situation, the second swingable piece 220B is separate from the second protrusion 157B of the second cam 150Y.

Figure 19B:
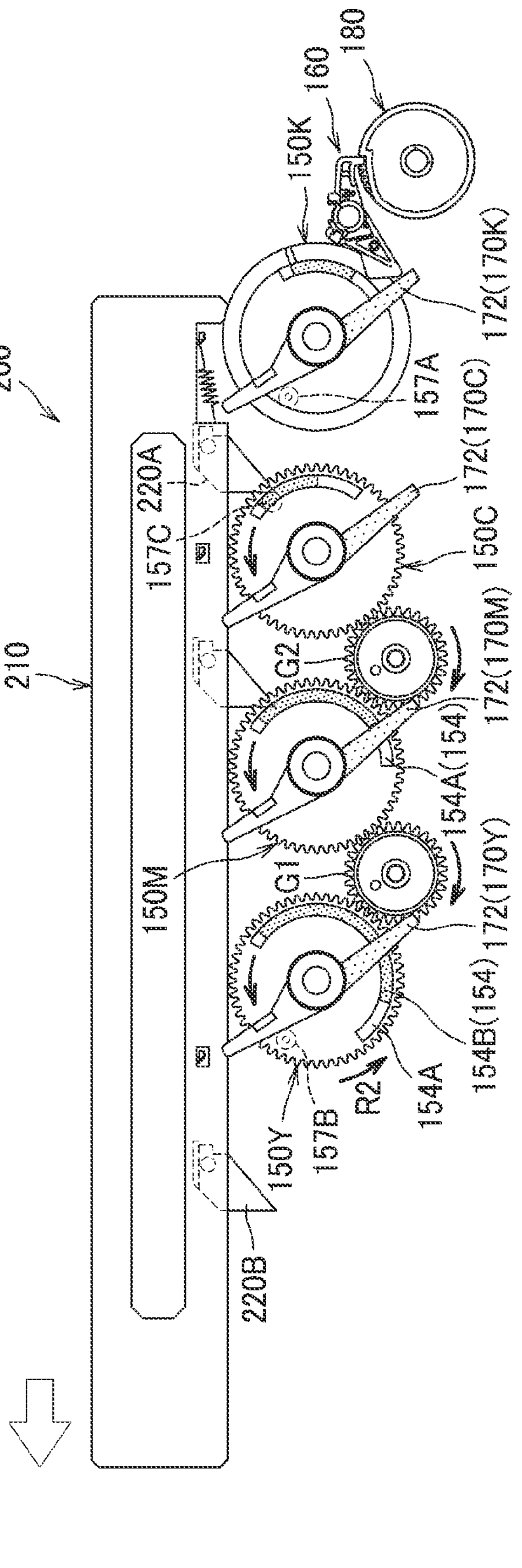

As shown in FIG. 19B, further translational motion of the translation plate 200 frontward toward the second position causes first swingable piece 220A to comes in contact with the third protrusion 157C of the fourth cam 150C. Further translation motion of the translation plate 200 frontward toward the second position causes the third protrusion 157C to be pushed by the first swingable piece 220A whereby the cams 150Y, 150M and 150C are caused to rotate again in the second rotation direction R2.

Figure 20A:
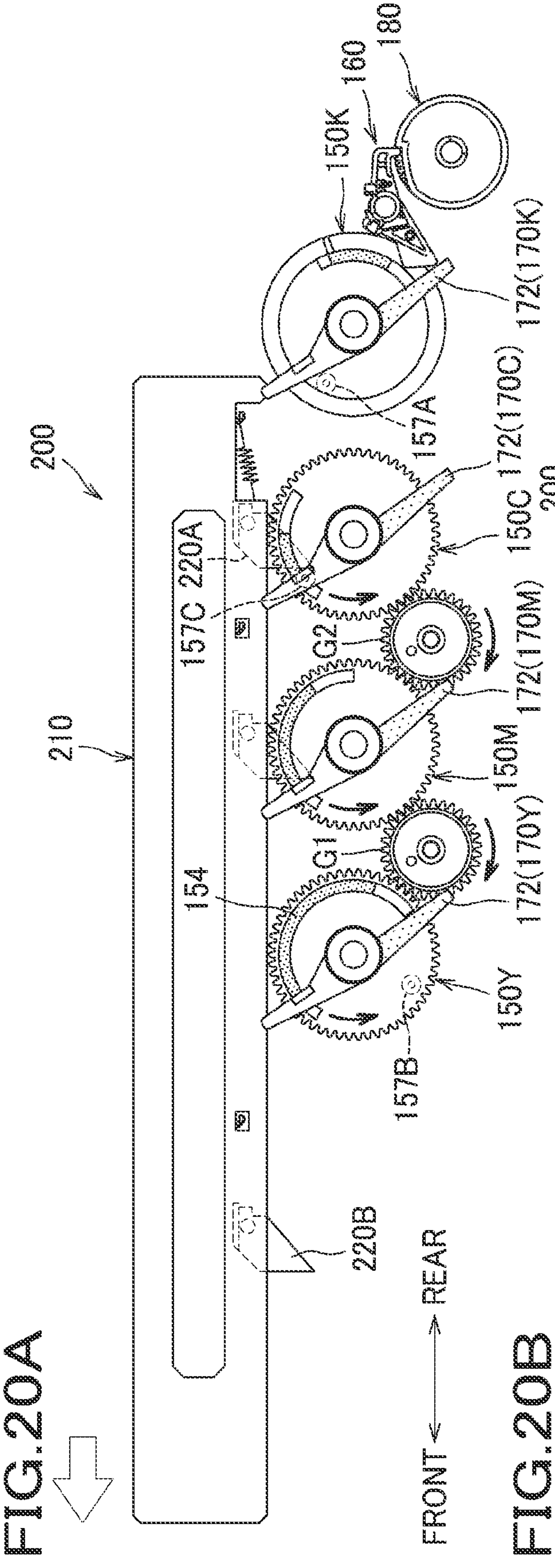

Accordingly, first, the contact arm 172 of the third cam follower 170M slides on the first guide surface 154A and gets out of contact with the cam surface 154. Thus, the third cam follower 170M is caused to slide form the push position to the no-push position, and the third development cartridge 60M is caused to move from the separate position to the contact position. Thereafter, the contact arm 172 of the second cam follower 170Y is guided from the retaining surface 154B to the first guide surface 154A of the second cam 150Y, sliding on the first guide surface 154A, and gets out of the cam surface 154, as shown in FIG. 20A. In this way, the second cam follower 170Y is caused to slide from the push position to the no-push position, and the second development cartridge 60Y is caused to move from the separate position to the contact position.

Figure 20B:
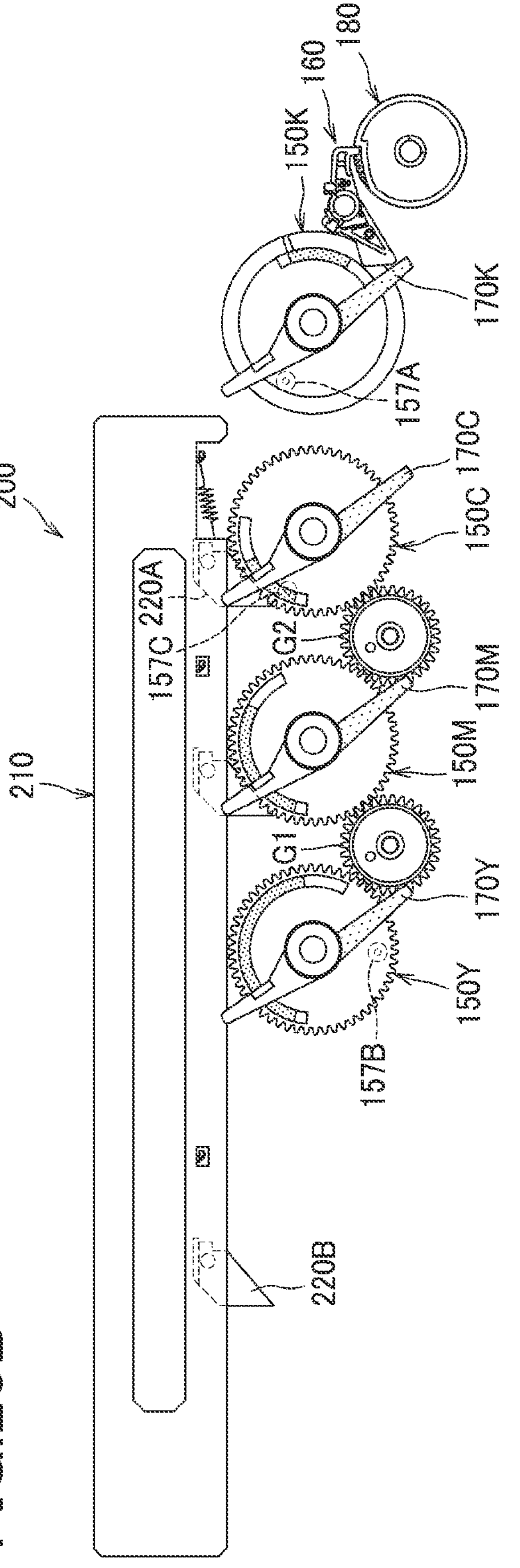

As shown in FIG. 20B, when the cover 11 is swung open and positioned in the open position, the translation plate 200 is positioned in the second position. In this state, all the cam followers 170 are positioned in the no-push positions thereof, and all the development cartridges 60 are positioned in the contact positions thereof.

Figure 21:
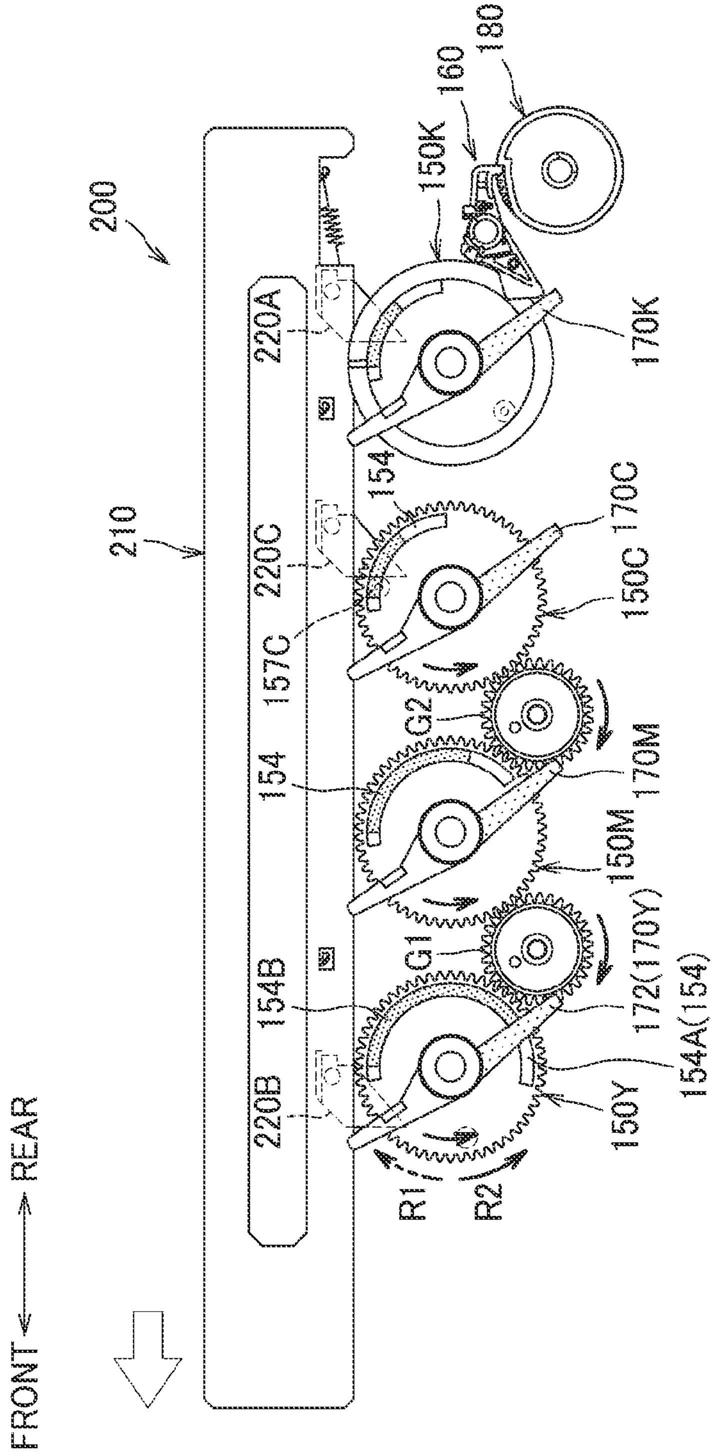
FIG. 21 is a diagram for explaining a process of operation of the translation plate to be acted on cam followers, from a state of cams in specific phases as observed immediately after a second cam follower has moved to a no-push position.

As shown in FIG. 21, the phases of the cams 150Y, 150M and 150C which have stopped immediately after the second cam follower 170Y has slid to the no-push position, because of halfway suspension of a printing process in the image forming apparatus 1 or other reasons, render the third swingable piece 220C of the translation plate 200 positioned in the first position contactable with the third protrusion 157C of the first cam 150C.

In this state, the operation of opening the cover 11 causes the translation plate 200 to move from the first position frontward toward the second position, and causes the third swingable piece 220C to come in contact with the third protrusion 157C; the third protrusion 157C is thus pushed by the third swingable piece 220C, to thereby cause the cams 150Y, 150M and 150C to rotate in the second rotation direction R2. Accordingly, the contact arm 172 of the second cam follower 170Y slides on the retaining surface 154A of the second cam 150Y and is guided to the first guide surface 154A, and then slides on the first guide surface 154A and gets out of contact with the cam surface 154. Thus, the second cam follower 170Y is caused to slide from the push position to the no-push position.

Next, advantageous effects of the image forming apparatus 1 configured as described above in accordance with the first embodiment will be described.

Since the first shaft 171 of the first cam follower 170K is disposed inside the contour of the first cam 150K as viewed from a direction parallel to the rotation axis AX, the first cam 150K and the first cam follower 170K can be arranged compactly as viewed from the direction parallel to the rotation axis AX.

Since the first shaft 171 of the second cam follower 170Y is disposed inside the contour of the second cam 150Y as viewed from a direction parallel to the rotation axis AX, the second cam 150Y and the second cam follower 170Y can be arranged compactly as viewed from the direction parallel to the rotation axis AX. Since the first shaft 171 of the third cam follower 170M is disposed inside the contour of the third cam 150M as viewed from a direction parallel to the rotation axis AX, the third cam 150M and the third cam follower 170M can be arranged compactly as viewed from the direction parallel to the rotation axis AX. Since the first shaft 171 of the fourth cam follower 170C is disposed inside the contour of the third cam 150C as viewed from a direction parallel to the rotation axis AX, the third cam 150C and the third cam follower 170C can be arranged compactly as viewed from the direction parallel to the rotation axis AX.

Accordingly, for the configuration in which a plurality of cams 150 and a plurality of cam followers 170 are provided, the cams 150 and the cam followers 170 can be arranged compactly as viewed from the direction parallel to the rotation axis AX.

Since the first shaft 171 of the cam follower 170 is engaged slidably with the second shaft 159 by which cam 150 is rotatably supported, the cam 150 and the cam follower 170 including the contact arm 172 and the restriction arm 173 both of which extend from the first shaft 171 can be arranged more compactly as viewed from the direction parallel to the rotation axis AX.

Since the cam follower 170 is restrained from rotating about the rotation axis AX of the cam 150 (or the second shaft 159 with which the first shaft 171 is engaged), the rotational motion of the cam 150 can be converted into the linear motion of the cam follower 170 efficiently.

Since the stopper 179 in which the restraint arm 179 is held is provided, the rotation of the cam follower 170 about the rotation axis AX of the cam 150 (or the second shaft 159 with which the first shaft 171 is engaged) can be restricted reliably.

Since the first cam follower 170K can be moved and positioned in the no-push position by operation of opening the cover 11 (by the translational motion of the translation motion synchronized with the cover 11's opening motion), the first cam follower 170K can be restrained from causing an obstruction in the way of the first development cartridge 60K being installed into or removed from the housing 10 through the opening 10A.

Since the second cam follower 170Y, the third cam follower 170M and the fourth cam follower 170C can be positioned in the no-push position by the operation of opening the cover 11 (by the translational motion of the translation motion synchronized with the cover 11's opening motion), the cam followers 170Y, 170M and 170C can be restrained from causing an obstruction in the way of the second development cartridge 60Y, the third development cartridge 60M and the fourth development cartridge 60C being installed into or removed from the housing 10 through the opening 10A.

Since the translation plate 200 includes swingable pieces 220 such that when the swingable pieces 220 of the translation plate 200 moving from the first position to the second position contact the corresponding protrusions 157A, 157B and 157C, the cams 150 are caused to rotate, the linear motion of the translation plate 200 can be converted into the rotational motions of the cams 150.

Since each swingable piece 220 has a first contact surface 221, the swingable pieces 220 of the translation plate 200 moving from the first position to the second position can be caused to contact the corresponding protrusions 157A, 157B and 157C of the cams 150 each positioned within a predetermined phase range, without fail.

When the translation plate 200 moves from the second position to the first position, an undesirable shift in the positions of the cam followers 170 from the positions before the operation of closing the cover 11 can be restrained. To be more specific, if the swingable pieces 220 are caused to contact the corresponding protrusions 157A, 157B and 157C by the translational motion of the translation plate 200 made when the cover 11 is closed, the swingable pieces 220 retreat to prevent the cams 150 from rotating; therefore the cam followers 170 can be restrained from being shifted in positions from the positions before the operation of closing the cover 11.

Since each of the protrusions 157A, 157B and 157C has a cylindrical surface contactable with the corresponding swingable pieces 220, the swingable pieces 220 can be kept continuously in contact with the corresponding protrusions 157A, 157B and 157C in such a manner that their contact states remain unvaried even when the cams 150 rotate. Accordingly, the linear motion of the translation plate 200 can be converted into the rotational motions of the cams 150 efficiently.

Since the angle θ2 of the second guide surface 154C with respect to a plane PL perpendicular to the rotation axis AX is greater than the angle θ1 of the first guide surface 154A with respect to the plane PL perpendicular to the rotation axis AX, the length of the cam surface 154 in the direction of rotation of the cam 150 can be made shorter in comparison with an alternative configuration in which the angel of the second guide surface is substantially the same as the angle of the first guide surface. Accordingly, an angle of rotation of the cam 150 as required to move (slide) the corresponding cam follower 170 between the no-push position and the push position can be made smaller. In addition, the cam 150 can be made smaller in size.

Since the times at which the cam followers 170Y, 170M and 170C are caused to move from the respective no-push positions to the respective push positions are shifted so as not to coincide with each other, the times at which force is applied to the cam followers 170Y, 170M an 170C can be shifted so as not to coincide with each other. Accordingly, an undesirable increase of driving force for rotating the cams 150Y, 150M and 150C can be restrained. To elaborate, when the cam follower 170 is caused to move from the no-push position to the push position in which to push the corresponding development cartridge 60, a reacting force is applied to the cam follower 170, and thus renders the cam follower 170 hard to slide, and the corresponding cam 150 hard to rotate. If the times at which the cam followers 170Y, 170M an 170C are caused to move from the respective no-push positions to the respective push positions overlap or coincide with each other, a greater driving force is required for rotating the cams 150Y, 150M and 150C; in contrast, with the configurations described above in the first embodiment, the driving force for rotating the cams 150Y, 150M and 150C can be restrained from increasing.

When the translation plate 200 moves from the first position to the second position, the second swingable piece 220B causes the cams 150Y, 150M and 150C to rotate and thereafter the first swingable piece 220A further causes the cams 150Y, 150M and 150C to rotate; therefore, the second cam 150Y, of which the length of the cam surface 154 in the direction of rotation of the second cam 150Y is longer, can be caused to rotate reliably, so that the second cam follower 170Y can be caused to move from the push position to the no-push position without fail.

When the translation plate 200 moves from the first position to the second position, the swingable piece 220A is caused to contact the third protrusion 157C at a time after the second swingable piece 220B is caused to separate from the second protrusion 157B of the second cam 150Y; therefore, the translation plate 200 and the cams 150Y, 150M and 150C can be caused to move smoothly. To elaborate, if the first swingable piece 220A comes in contact with the third protrusion while the second swingable piece 220B is in contact with the second protrusion, the friction produced by contact between the swingable piece 220 and the protrusion of the cam would increase, and possibly prevent the operations of the translation plate 200 and the cams 150Y, 150M and 150C; in contrast, with the configurations described above in the first embodiment, such increase in friction can be restrained, so that the translation plate 200 and the cams 150Y, 150M and 150C can be caused to move smoothly.

Since the cams 150 are caused to rotate, by the translational motion of the translation plate 200 from the first position to the second position, in the second rotation direction R2 that is opposite to the first rotation direction in which the cams 150 are caused to rotate under normal control, the load acted on the moving translation plate 200 can be made smaller. To elaborate, especially, if the cams 150 in such a specific phase as observed immediately after the second cam follower 170Y (see FIG. 21) has been caused to slide and moved to a no-push position were caused to rotate in the first rotation direction R1 by the translational motion of the translation plate 200 from the first position to the second position, the second cam followers 170M and 170C would inevitably be caused to move temporarily from the no-push position to the push position by the cam surfaces 154 before the second cam follower 170Y is caused to move to the no-push position, with the result that the load acted on the moving translation plate 200 would become large. In contrast, with the configurations as implemented in the first embodiment, such temporary motion of the cam followers 170M and 170C from the no-push position to the push position is not necessitated, so that the load acted on the moving translation plate 200 can be made smaller. Accordingly, the load counteracting a user's operation of opening the cover 11 can be made smaller.

Since the motions of the cam followers 170Y, 170M and 170C from the respective push positions to the respective no-push positions overlap in time, the length of each of the cam surfaces 154 in the direction of rotation of the cams 150Y, 150M and 150C can be made shorter. Accordingly, the angle of rotation of each of the cams 150Y, 150M and 150C as deemed necessary to move the corresponding cam followers between the respective no-push positions and the respective push positions can be made smaller. In addition, the cams 150Y, 150M and 150C can be made smaller in size.

With the features of the movable gear 134 and the switching cam 194, the development rollers 61Y, 61M and 61C can be caused to rotate when the development cartridges 60Y, 60M and 60C are in the respective contact positions, and to stop rotating when the development cartridges 60Y, 60M and 60C are in the respective separate positions. Accordingly the development rollers 61Y, 61M and 61C can be restrained from rotating more than necessary. This can serve to slow down deterioration, for example, of the development rollers 61Y, 61M and 61C and of toner, etc.

Since the first cam 150K with the cam surface 154 is configured to comprise the switching protrusion 156 located on a side of the first cam 150K facing in the first direction parallel to the rotation axis AX and the first protrusion 157A located on an opposite side of the first cam 150K opposite to the side on which the switching protrusion 156 is located, upsizing of the first cam 150K can be restricted. Moreover, the first cam 150K can be configured to serve to cause the first cam follower 170K to slide between the push position and the no-push position, to cause the switching lever 160 to move, and to cause the first cam follower 170K to be positioned in the no-push position by the translation plate 200. This obviates the necessity to configure the first cam follower 170K provided with a portion for contact with the translation plate 200, to provide sufficient space for causing this portion to rotate as a matter of course. Accordingly, while the function of causing the first cam follower 170K to be positioned in the no-push position can be achieved, the first cam 150K and the first cam follower 170K can be arranged compactly.

Since the cam surface 154 of the first cam 150K is provided on the side of the first cam 150K facing in the first direction parallel to the rotation axis AX, the first protrusion 157 located on the side of the first cam facing in the second direction parallel to the rotation axis AX, i.e., the opposite side on which the cam surface 154 is provided can be arranged in a desired position with increased flexibility. Accordingly the upsizing of the first cam 150K can be restrained, and the first cam 150K and the translation plate 200 can be arranged compactly.

Since the switching protrusion 156 is located at least partially within bounds confined by two straight lines L1 and L2 of a sector which are drawn from the rotation axis AX through the two ends E1 and E2 of the retaining surface 154B, the first cam 150K and the first cam follower 170K can be given structural compactness. To elaborate, if no part of the switching protrusion is located within bounds confined by two straight lines L1 and L2 of the sector which are drawn from the rotation axis AX through the two ends E1 and E2 of the retaining surface 154B, the switching protrusion and the contact arm of the first cam follower 170K should be located in positions shifted from each other in directions parallel to the rotation axis AX so that no interference would occur between the switching protrusion and the contact arm of the first cam follower 170K located in the no-push position. In the first embodiment, the switching protrusion 256 and the contact arm 172 do not have to be located in positions shifted from each other in directions parallel to the rotation axis AX; therefore, the first cam 150K and the first cam follower 170K can be given structural compactness. Accordingly, the first cam 150K and the first cam follower 170K can be arranged more compactly.

Since the switching protrusion 156 is located on the flange portion 155, the cam surface 154 can be located near the circumference of the disk portion 151. Accordingly, the first cam 150K can be restrained from upsizing, while a sufficient length of the cam surface 154 in the direction of rotation of the first cam 150K can be allocated on the first cam 150K.

Since the first motor M1 and the second motor M2 are provided separately, the first motor M1 and the second motor M2 can be controlled individually so that the first development roller 61K to which a driving force is transmitted from the first motor M1 and the first cam 150K to which a driving force is transmitted from the second motor M2 can be independently caused to rotate or stop rotating. Furthermore, since the third motor M3 is provided separately from the second motor M2, the third motor M3 can be controlled individually so that the development rollers 61Y, 61M and 61C to which a driving force is transmitted from the third motor M3 and the cams 150Y, 150M and 150C to which a driving force is transmitted from the second motor M2 can be independently caused to rotate or stop rotating.

Since the switching protrusion 156 is provided to cause the switching lever 160 to move to the first transmission position at a time before completion of movement of the first development cartridge 60K to the contact position, the first development roller 61K can be caused to rotate before the first development roller 61K is caused to contact the first photosensitive drum 50K. Further, since the switching protrusion 156 is provided to cause the switching lever 160 to move to the first disconnection position at a time after completion of movement of the first development cartridge 60K to the separate position, the first development roller 61K can be caused to stop rotating after the first development roller 61K is caused to separate from the first photosensitive drum 50K.

Since the switching cam 194 is provided to cause the movable gear 134 to move to the second transmission position at a time before completion of movement of the second development cartridge 60Y to the contact position, the development rollers 61Y, 61M and 61C can be caused to rotate before the second development roller 61Y is caused to contact the second photosensitive drum 50Y. Further, since the switching cam 194 is provided to cause the movable gear 134 to move to the disconnection position at a time after completion of movement of the fourth development cartridge 60C to the separate position, the development rollers 61Y, 61M and 61C can be caused to stop rotating after the second development roller 61Y is caused to separate from the second photosensitive drum 50Y.

Accordingly, undesirable constraint, which would otherwise become a concern, such that the development roller 61 and the photosensitive drum 50 should be caused to rotate simultaneously after the development roller 61 is caused to contact the photosensitive drum 50, and the development roller 61 should be caused to separate from the photosensitive drum 50 after the development roller 61 and the photosensitive drum 50 is caused to stop rotating simultaneously can be eliminated. Furthermore, the times at which the photosensitive drums 50 are to be caused to rotate and to stop rotating can be set as desired irrespective of the times at which the development rollers 61 are caused to contact or to separate from the corresponding photosensitive drums 50.

Next, a second embodiment will be described below with reference mainly to FIGS. 22A, 22B, 23A, 23B, 24A, 24B, 25A, 25B, 25C, 26A, and 26B. The following discussion focuses on aspects different from those described above in connection with the first embodiment. For the same or substantially the same aspects, the corresponding elements will be designated by the same reference characters as used in describing the first embodiment, and a duplicate description thereof will be omitted where appropriate.

Figure 22A:
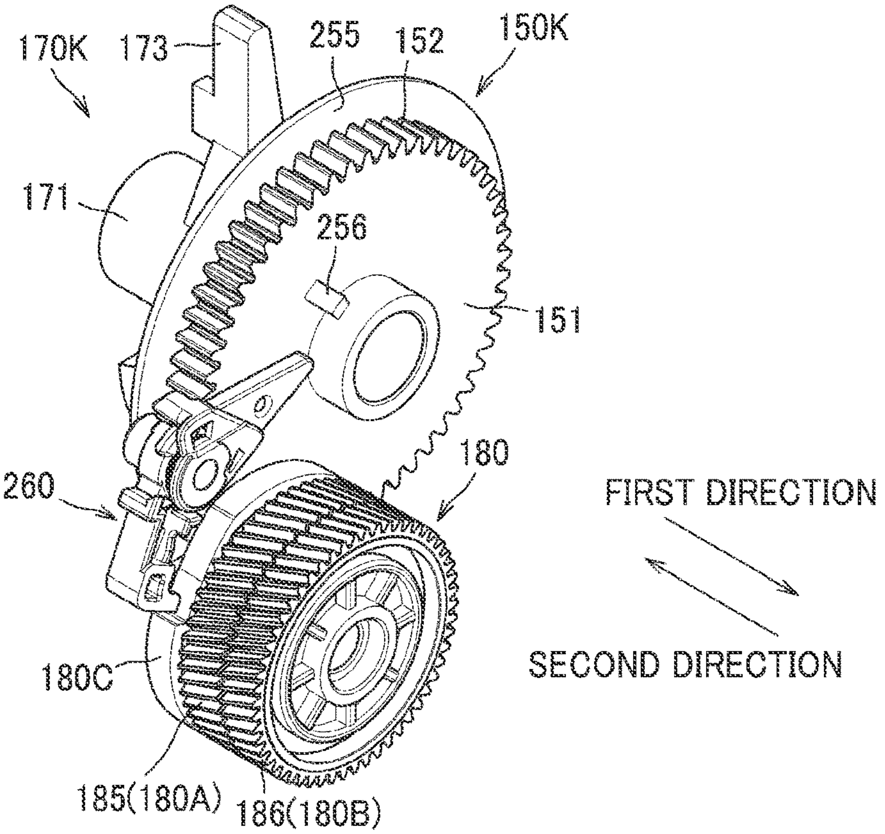
FIG. 22A is a perspective view showing a first cam, a first cam follower, a switching lever and a planetary gear train, as illustrated to show a side of the first cam on which a switching protrusion is provided.
Figure 22B:
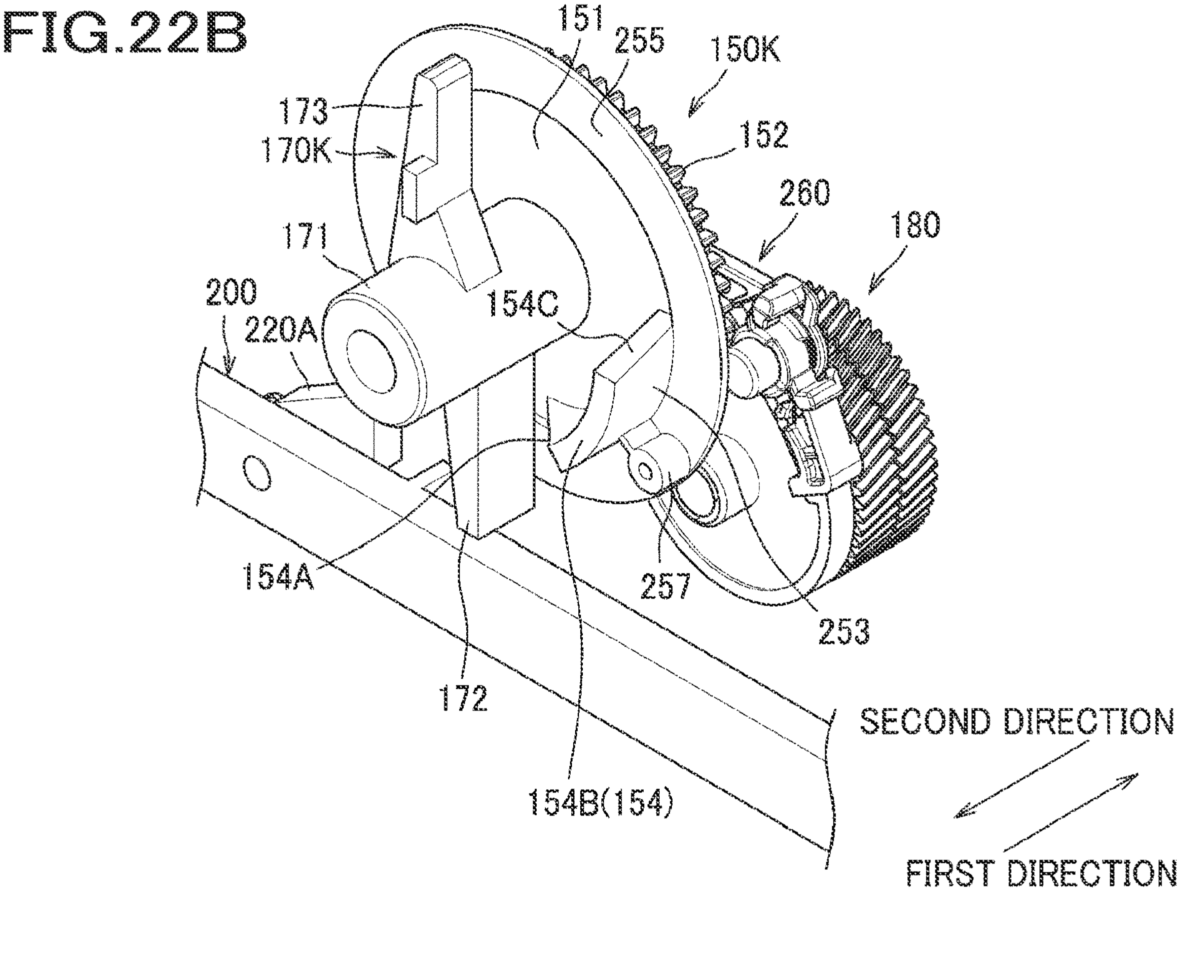
FIG. 22B is a perspective view showing the first cam, the first cam follower, the switching lever and the planetary gear train, as illustrated to show an opposite side of the first cam on which a first protrusion is provided, that is an opposite side of the first cam opposite to the side on which the switching protrusion is provided as shown in FIG. 22B.

As shown in FIGS. 22A and 22B, the first cam 150K in the second embodiment comprises a disk portion 151, a gear portion 152, a cam portion 253, a flange portion 255, a switching protrusion 256, and a first protrusion 257.

Figure 23A:
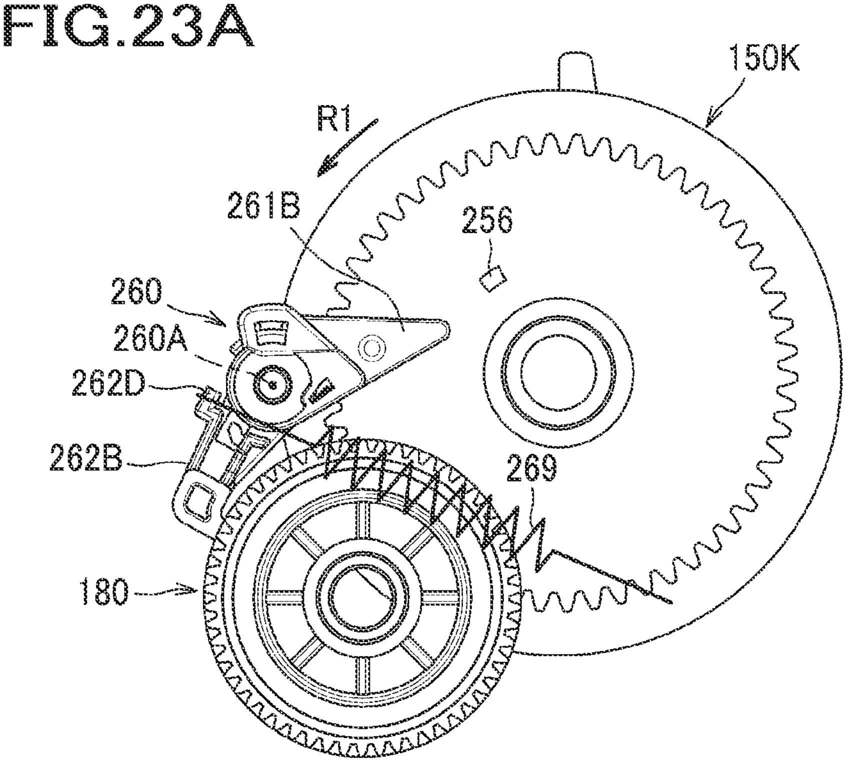
FIG. 23A is a side elevational view showing the side of the first cam on which the switching protrusion is provided, as well as the first cam follower, the switching lever and the planetary gear train, as illustrated when the first development cartridge is positioned in the contact position.
Figure 23B:
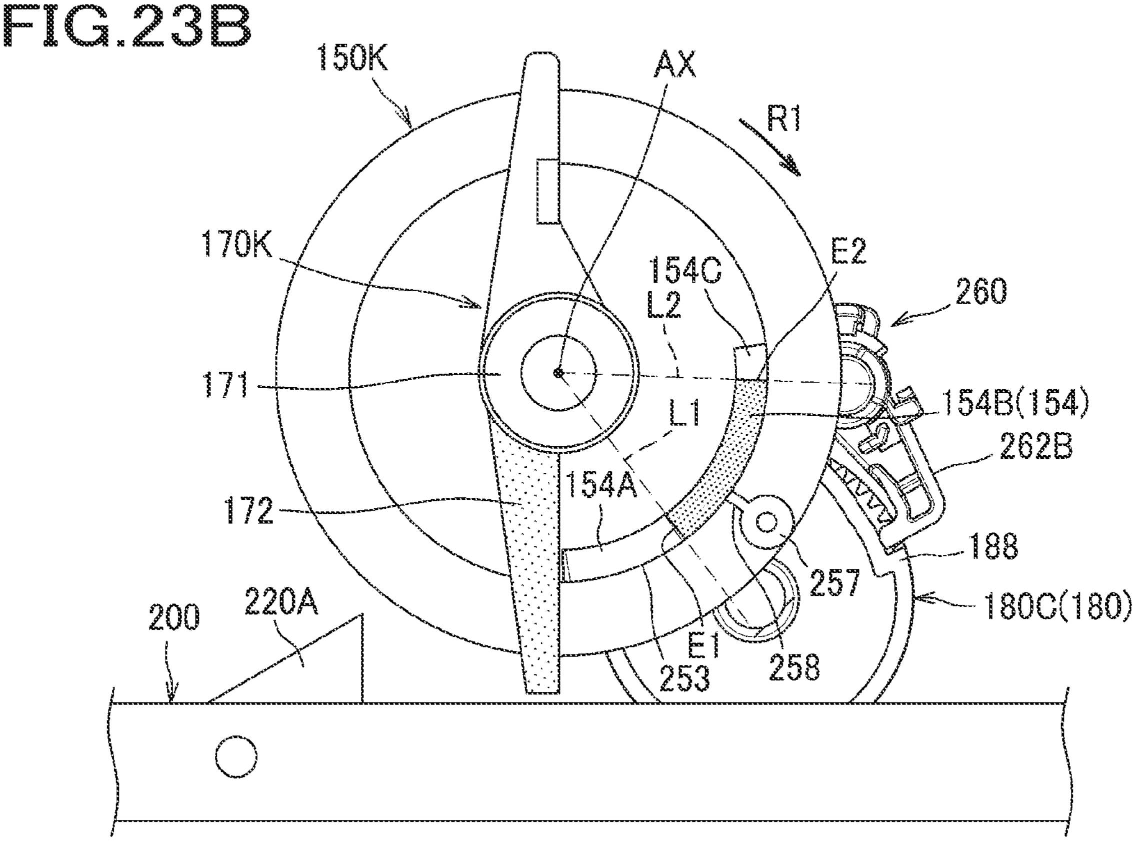
FIG. 23B is a side elevational view showing the side of the first cam on which the first protrusion is provided, as well as the first cam follower, the switching lever and the planetary gear train, as illustrated when the first development cartridge is positioned in the contact position.
Figure 24A:
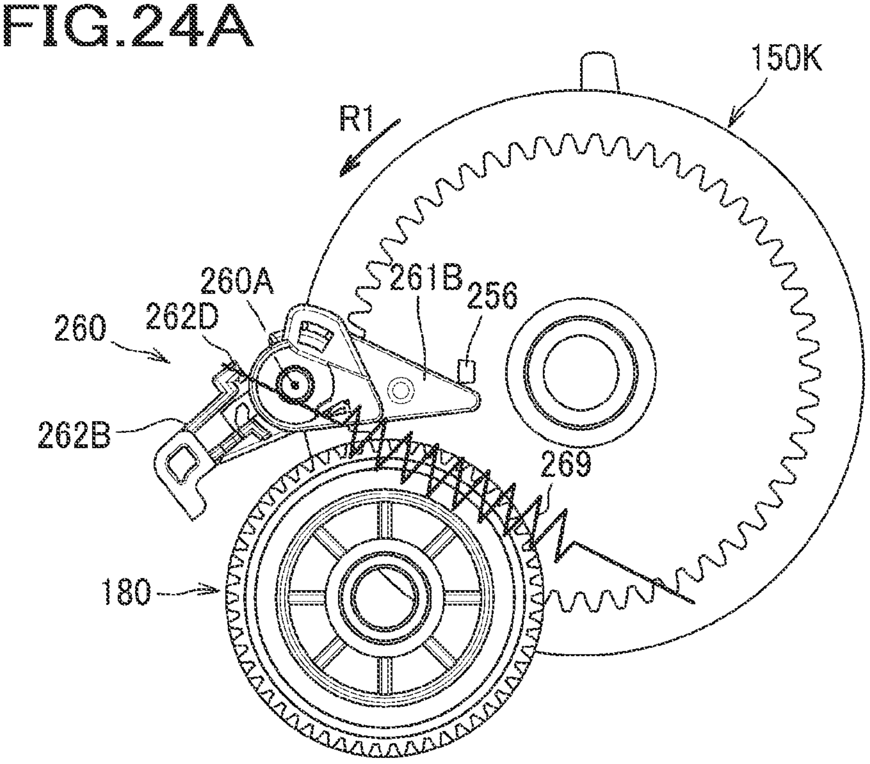
FIG. 24A is a side elevational view showing the side of the first cam on which the switching protrusion is provided, as well as the first cam follower, the switching lever and the planetary gear train, as illustrated when the first development cartridge is positioned in the separate position.
Figure 24B:
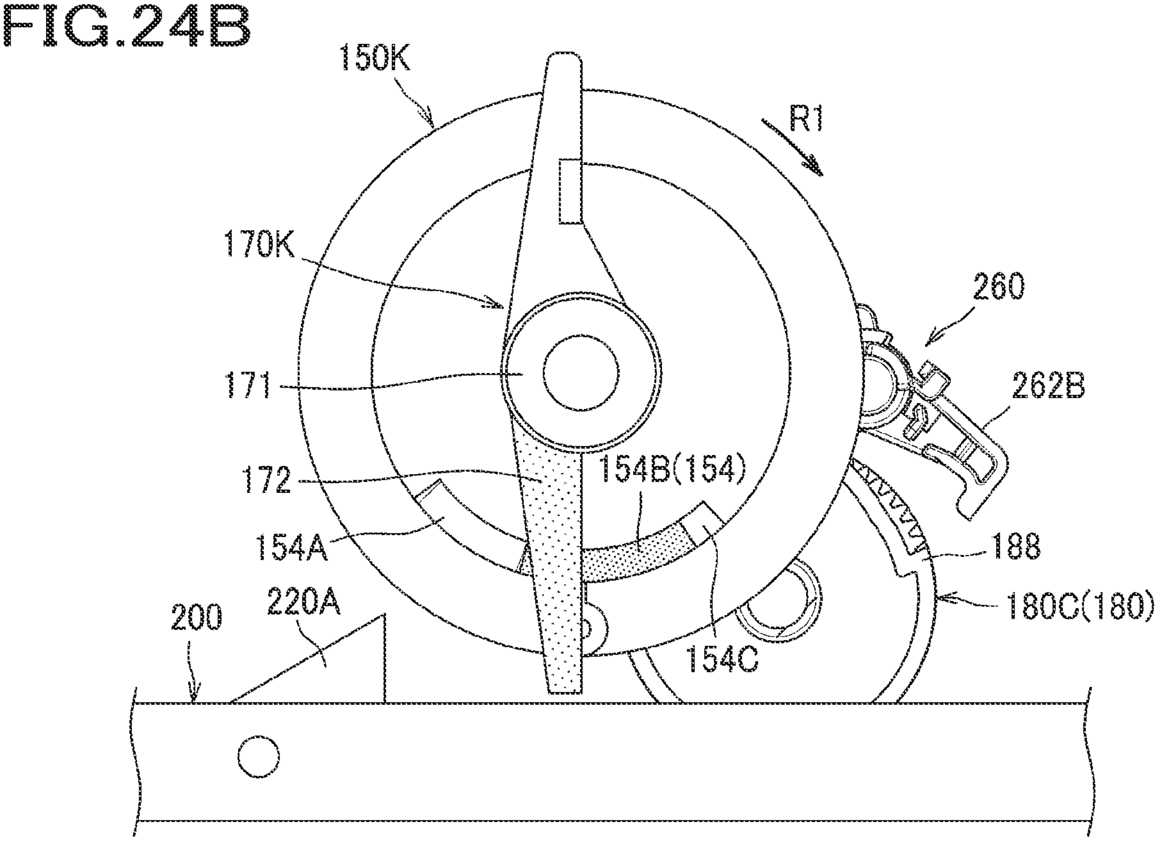
FIG. 24B is a side elevational view showing the side of the first cam on which the first protrusion is provided, as well as the first cam follower, the switching lever and the planetary gear train, as illustrated when the first development cartridge is positioned in the separate position.

The switching protrusion 256 is contactable with the switching lever 260 to cause the switching lever 260 to move between the first transmission position (see FIGS. 23A and 23B) and the first disconnection position (see FIGS. 24A and 24B). The switching protrusion 256 protrudes from the disk portion 151 in the first direction parallel to the rotation axis AX. The switching protrusion 256 is located on a side of the first cam 150K (the disk portion 151 thereof) facing in the first direction parallel to the rotation axis AX.

The flange portion 255 is formed on the circumference of the disk portion 151. The flange portion 255, in this embodiment, is located on a side of the gear portion 152 facing in the second direction parallel to the rotation axis AX. As viewed from a direction parallel to the rotation axis AX, the flange portion 255 overlaps the gear portion 152. The flange portion 255 extends outward in radial directions of the disk portion 151 (i.e., directions perpendicular to the rotation axis AX) beyond an addendum circle of the gear portion 152.

The first protrusion 257 is contactable with the translation plate 200. When the translation plate 200 moving from the first position to the second position comes in contact with the first protrusion 257, the first cam 150K is caused to rotate. The first protrusion 257 is located on the flange portion 255. The first protrusion 257 protrudes from a side surface of the flange portion 255 of the first cam 150K in the second direction parallel to the rotation axis AX. To be more specific, the second direction in which the first protrusion 257 protrudes from the flange portion 255 is an opposite direction opposite to the first direction in which the switching protrusion 256 protrudes (see FIG. 22A). The first protrusion 257 is located on an opposite side of the first cam 150K (facing in the second direction parallel to the rotation axis AX) opposite to the side on which the switching protrusion 256 is located.

The cam portion 253 protrudes from the disk portion 151 in the second direction parallel to the rotation axis AX. The cam portion 253 has a cam surface 154. In the second embodiment, the cam surface 154 is located on the opposite side of the first cam 150K (facing in the second direction parallel to the rotation axis AX) opposite to the side on which the switching protrusion 256 is located. In the second embodiment, the cam surface 154 is located on the same side as the side on which the first protrusion 257 is located. As shown in FIG. 23B, as viewed from a direction parallel to the rotation axis AX, the retaining surface 154B extends along a segment of a circle of which a center coincides with the rotation axis AX and has two ends E1, E2 (an end E1 connected to the first guide surface 154A and an end E2 connected to the second guide surface 154C) located apart from each other in a direction of rotation of the first cam 150K, and the first protrusion 257 is located at least partially within bounds confined by two straight lines L1 and L2 of a sector which are drawn from the rotation axis AX through the two ends E1 and E2 of the retaining surface 154B. A rib 258 is provided on the flange portion 255 between the first protrusion 257 and the cam portion 253. The rib 258 extends from the cam portion 253 outward in a radial direction of the first cam 150K (i.e., a direction perpendicular to the rotation axis AX) to the first protrusion 257, and connects the first cam 150K and the first protrusion 257.

Figure 25A:
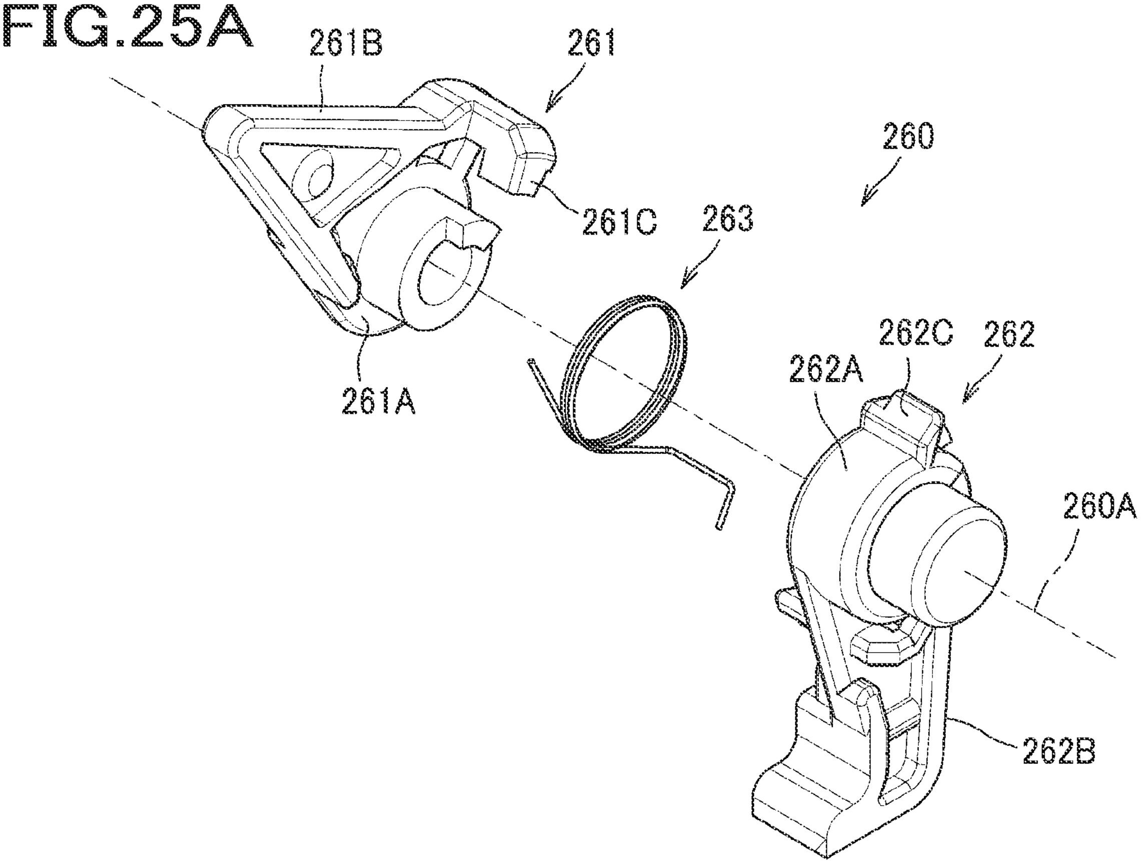
FIG. 25A is an exploded perspective view of the switching lever according to a second embodiment.

The switching lever 260 is swingable on a pivot 260A between a first transmission position as shown in FIGS. 23A and 23B in which the switching lever 260 engages with the pawl portion 188 of the transmission element 180C to make a driving force from the first motor M1 transmittable to the first development roller 61K, and a first disconnection position as shown in FIGS. 24A and 24B in which the switching lever 260 is disengaged from the pawl portion 188 to make the driving force from the first motor non-transmittable to the first development roller 61K. As shown in FIG. 25A, the switching lever 260 comprises a first lever 261, a second lever 262, and a first spring 263.

Figure 25B:
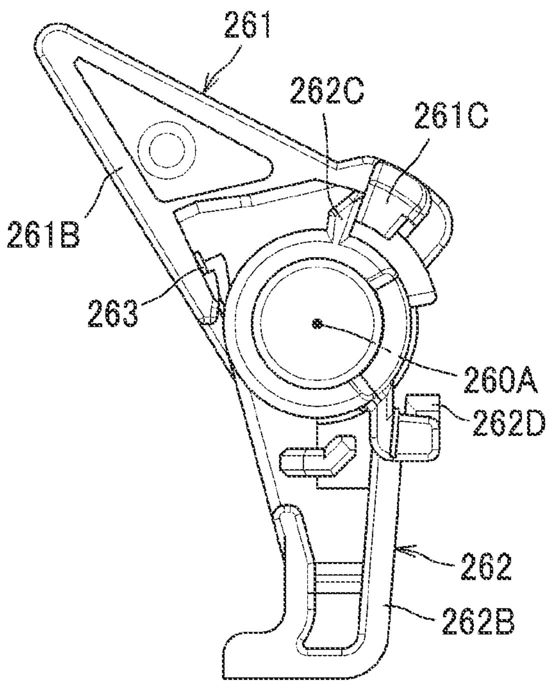
FIG. 25B is a side elevational view of the switching lever, showing a state in which a first lever is restrained from rotating by a rotation restriction portion according to the second embodiment.
Figure 25C:
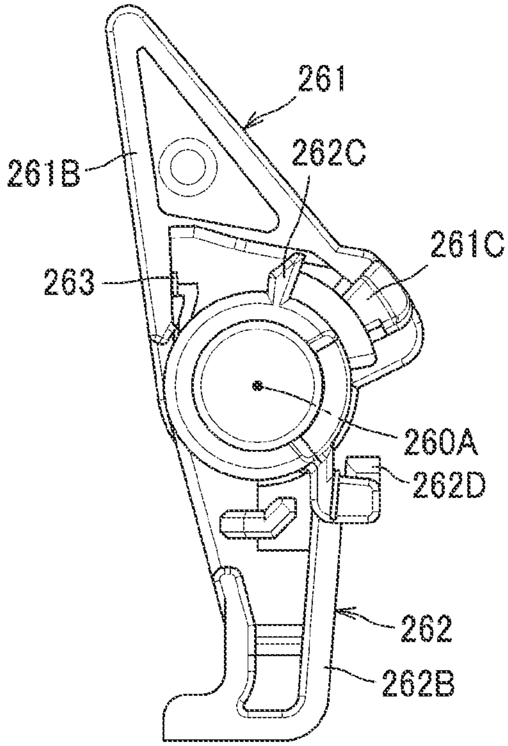
FIG. 25C is a side elevational view of the switching lever, showing a state in which the first lever has been swung relative to a second lever.

The first lever 261 is swingable on the pivot 260A and contactable with the switching protrusion 256 of the first cam 150K. The first lever 261 includes a first support portion 261A, a first arm 261B, and a lever protrusion 261C. The first support portion 261A is supported, swingably on the pivot 260A, by the housing 10. The first arm 261B extends from the first support portion 261A. The lever protrusion 261C protrudes in a direction parallel to the pivot 260A (or the first direction parallel to the rotation axis AX). As shown in FIGS. 25B and 25C, the first lever 261 is swingable on the pivot 260A relative to the second lever 262.

The second lever 262 is swingable on the pivot 260A and engageable with the transmission element 180C of the planetary gear train 180. The second lever 262 includes a second support portion 262A, a second arm 262B, a rotation restriction portion 262C, and a spring hook portion 262D. The second support portion 262A is supported, swingably on the pivot 260A, by the housing 10. The second arm 262B extends from the second support portion 262A. An end of the second arm 262B extends toward the outer periphery of the transmission element 180C. When the end of the second arm 262B of the switching lever 260 engages with the pawl portion 188 of the transmission element 180C, the switching lever 260 restricts the rotation of the transmission element 180C. The rotation restriction portion 262C protrudes from the second support portion 262A in a direction opposite to the direction in which the second arm 262B protrudes. When the first lever 261 rotates (or swings) on the pivot 260A in one direction (counterclockwise from the state shown in FIG. 25C to the state shown in FIG. 25B), the lever protrusion 261C of the first lever 261 comes in contact with the rotation restriction portion 262C of the second lever 262 as shown in FIG. 25B, whereby rotation (swinging motion) of the first lever 261 in this one direction relative to the second lever 262 is restricted.

The first spring 263 biases the first lever 261 to prevent rotation of the first lever 261 relative to the second lever 262 when the rotation restriction portion 262C provided on the second lever 262 comes in contact with the lever protrusion 261C of the first lever 261. The first spring 263 is, for example, a torsion spring.

As shown in FIG. 23A, the image forming apparatus 1 further comprises a second spring 269. The second spring 269 biases the switching lever 260 in such a direction as to cause the switching lever 260 to swing from the first disconnection position to the first transmission position. Specifically, the second spring 269 is configured to bias the second lever 262 to cause the second lever 262 to swing toward the transmission element 180C. The second spring 269 is an extension coil spring of which one end is hooked on the spring hook portion 262D provided on the second lever 262 and the other end is hooked on another spring hook portion (not shown) provided in the housing 10, in a position rearward of the spring hook portion 262D. Accordingly, the second spring 269 biases the second lever 262 in the counterclockwise direction of FIG. 23A.

As shown in FIGS. 23A and 23B, when the first development cartridge 60K is positioned in the contact position, the first cam follower 170K is positioned in the no-push position with its contact arm 172 located out of the cam surface 154. In this state, the switching protrusion 256 of the first cam 150K is separate from the first arm 261B of the switching lever 260, and the switching lever 260 is located in the transmission position with its second arm 262 engaged with the pawl portion 188 of the transmission element 180C.

When the controller 2 causes the first cam 150K to rotate in the first rotation direction R1 from the state shown in FIGS. 23A and 23B, the contact arm 172 comes in contact with the first guide surface 154A of the cam surface 154, slides on the first guide surface 154A, and comes in contact with retaining surface 154B. In this way, the first cam follower 170K is caused to move from the no-push position to the push position, whereby the first development cartridge 60K is caused to move from the contact position to the separate position.

When the first cam follower 170K is caused to move to the push position, the switching protrusion 256 of the first cam 150K comes in contact with the first arm 261B, and the switching lever 260 is pushed and caused to move by the switching protrusion 256 to thereby swing from the first transmission position to the first disconnection position. Accordingly, the second arm 262B is disengaged from the pawl portion 188 of the transmission element 180C. When the first development cartridge 60K moves to the separate position, the controller 2 causes the first cam 150K to stop rotating.

When the controller 2 causes the first cam 150K in the first rotation direction R1 from the state shown in FIGS. 24A and 24B, the contact arm 172 of the first cam follower 170K is guided from the retaining surface 154B to the second guide surface 154C, slides on the second guide surface 154C, and gets out of contact with the cam surface 154. Accordingly, the first cam follower 170K is caused to move from the push position to the no-push position, whereby the first development cartridge 60K is caused to move from the separate position to the contact position.

When the first cam follower 170K is caused to move to the no-push position, the switching protrusion 256 of the first cam 154K is separated from the first arm 261B, and the switching lever 260 is caused to swing from the first disconnection position to the first transmission position by the action (biasing force) of the second spring 269. Accordingly, the second arm 262B is caused to engage with the pawl portion 188 of the transmission element 180C. When the development cartridge 60 is caused to move to the contact position, the controller 2 causes the first cam 150K to stop rotating.

Figure 26A:
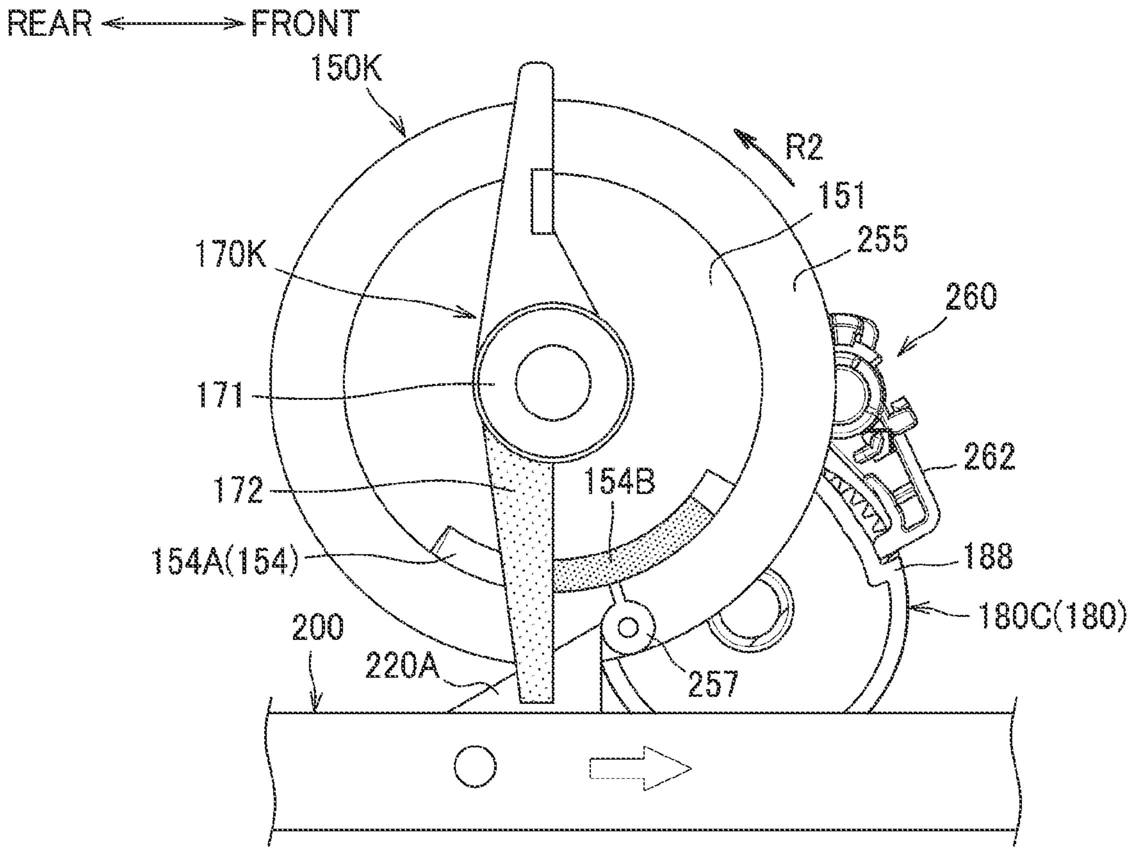
FIGS. 26A and 26B are diagrams for explaining an operation of the switching lever according to the second embodiment.

As shown in FIG. 26A, the translational motion of the translation plate 200 from the first position to the second position, made when the first cam follower 170K is positioned in the push position, causes the first cam 150K to rotate in the second rotation direction R2 opposite to the first rotation direction R1, to thereby cause the first cam follower 170K to be positioned in the no-push position.

To be more specific, the translational motion of the translation plate 200 from the first position to the second position, made when the contact arm 172 is in contact with the retaining surface 154B, causes the first swingable piece 220A to come in contact with the first protrusion 257. Then, the first protrusion 257 is pushed by the first swingable piece 220A, and the first cam 150K is thereby caused to rotate in the second rotation direction R2 opposite to the first rotation direction R1. Accordingly, the contact arm 172 is guided form the retaining surface 154B to the first guide surface 154A, slides on the first guide surface 154A, and gets out of contact with the cam surface 154, whereby the first cam follower 170K is caused to slide from the push position to the no-push position.

Figure 26B:
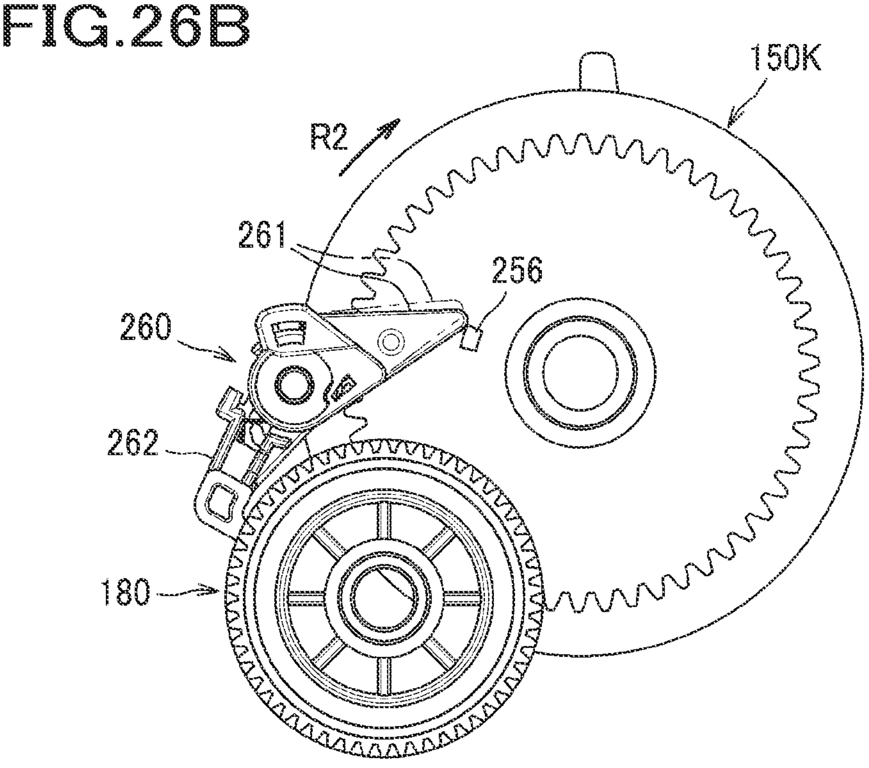

When the second lever 262 of the switching lever 260 is engaged with the pawl portion 188 of the transmission element 180C and the first cam 150K rotates in the second rotation direction R2, the switching protrusion 256 comes in contact with the first lever 261, and the first lever 261 is pushed by the switching protrusion 256, as shown in FIG. 26B. Accordingly, the first lever 261 is caused to swing relative to the second lever 262 against the biasing force of the first spring 263, as indicated by the chain double-dashed line. In this way, the switching lever 260 can escape getting overstressed when the first cam 150K is caused to rotate in the second rotation direction R2.

With the configurations described above in the second embodiment, the cam surface 154 of the first cam 150K is located on the opposite side of the first cam 150K opposite to the side on which the switching protrusion is located; therefore, the switching protrusion 256 located on the opposite side of the first cam 150K opposite to the side on which the cam surface 154 is located can be arranged in a desired position with increased flexibility. Accordingly, upsizing of the first cam 150K can be restrained, and the first cam 150K and the switching lever 260 can be arranged compactly.

Since the first protrusion 257 is located at least partially within bounds confined by two straight lines L1 and L2 of a sector which are drawn from the rotation axis AX through the two ends E1 and E2 of the retaining surface 154B, the first cam 150K and the first cam follower 170K can be given structural compactness. To elaborate, if no part of the first protrusion is located within bounds confined by two straight lines L1 and L2 of the sector which are drawn from the rotation axis AX through the two ends E1 and E2 of the retaining surface 154B, the first protrusion and the contact arm of the first cam follower 170K should be located in positions shifted from each other in directions parallel to the rotation axis AX so that no interference would occur between the first protrusion and the contact arm of the first cam follower 170K located in the no-push position. In the second embodiment, the first protrusion 257 and the contact arm 172 do not have to be located in positions shifted from each other in directions parallel to the rotation axis AX; therefore, the first cam 150K and the first cam follower 170K can be given structural compactness. Accordingly, the first cam 150K and the first cam follower 170K can be arranged more compactly.

Since the first protrusion 257 is located on the flange portion 255, the cam surface 154 can be located near the circumference of the disk portion 151. Accordingly, the first cam 150K can be restrained from upsizing, while a sufficient length of the cam surface 154 in the direction of rotation of the first cam 150K can be allocated on the first cam 150K.

Next, a third embodiment will be described below with reference mainly to FIGS. 27A, 27B, 27C, 28A, 28B, 29A and 29B. In describing the third embodiment, an explanation and illustration of a mechanism for switching between transmission of a driving force to the development rollers 61 and disconnection of the transmission will be omitted.

Figure 27A:
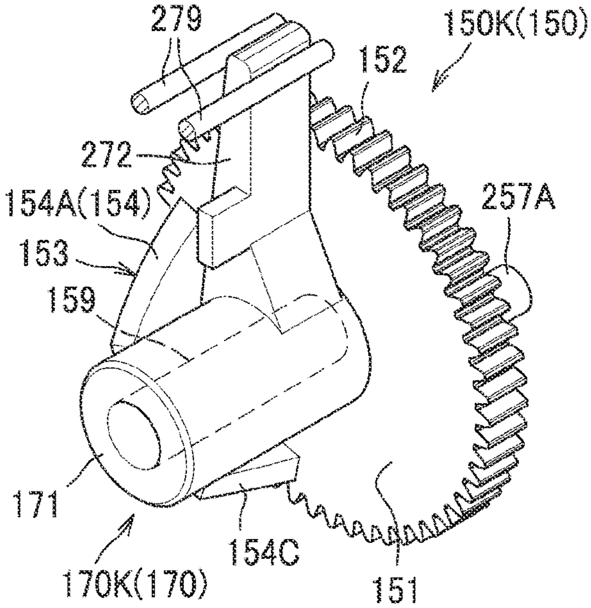
FIG. 27A is a perspective view showing a first cam and a first cam follower configured according to a third embodiment, in which the first cam follower is in a no-push position.
Figure 27C:
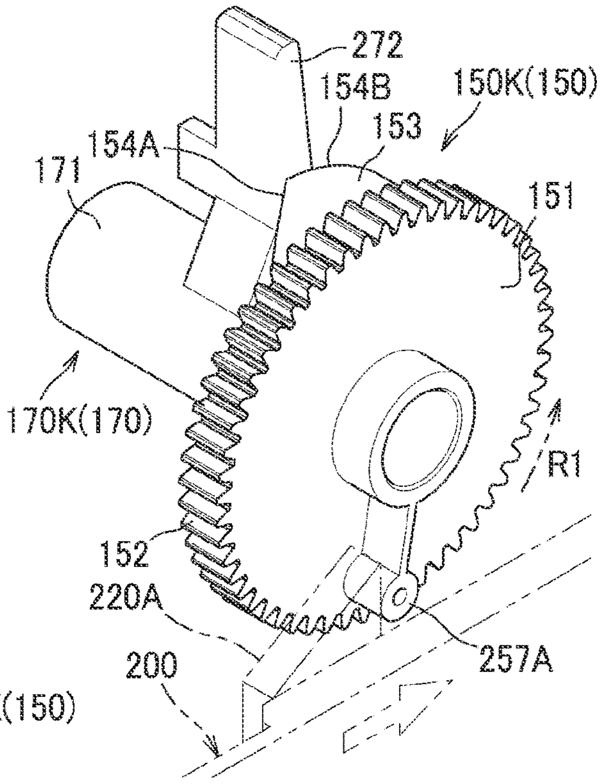
FIG. 27C is a perspective view showing a side of the first cam on which a first protrusion is provided, and the first cam follower.
Figure 27B:
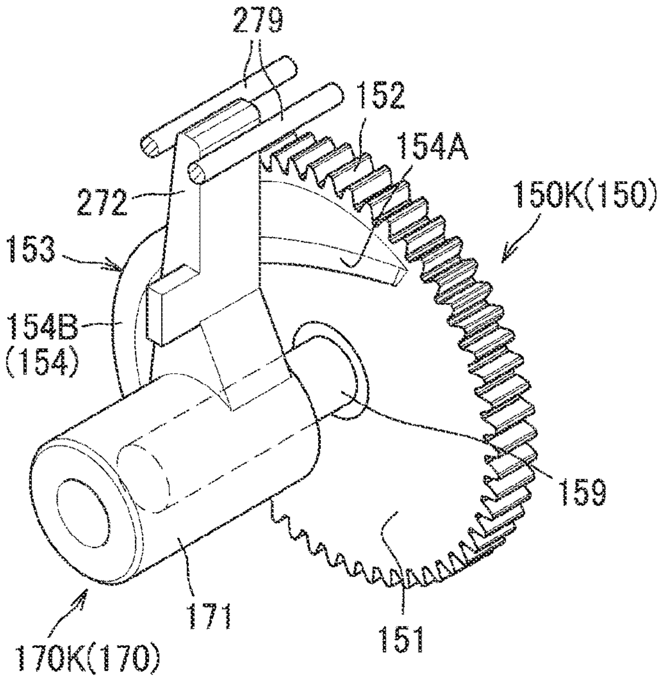
FIG. 27B is a perspective view showing the first cam and the first cam follower of the third embodiment, in which the first cam follower is in a push position.

As shown in FIGS. 27A and 27B, the cam 150 in the third embodiment comprises a disk portion 151, a gear portion 152, and a cam portion 153.

The cam follower 170 in the third embodiment includes a first shaft 171 and a contact arm 272. The cam follower 170 in the third embodiment does not include a restraint arm. The contact arm 272 is a portion that contacts the cam surface 154 of the cam 150. The contact arm 272 extends from the first shaft 171 in a radial direction of the first shaft 171 (i.e., a direction perpendicular to the rotation axis AX). Note that the retaining surface 154B and the contact arm 272 depicted in FIGS. 28A, 28B, 29A and 29B which will be referenced later are shown with dot hatch patterns.

The image forming apparatus 1 further comprises a stopper 279 by which the cam follower 170 is restrained from rotating on the rotation axis AX (about the second shaft 159 with which the first shaft 171 is engaged). The stopper 279 consists of a pair of bars. The stopper 279 is provided in the housing 10. The two bars of the stopper 279 are arranged side by side around the circumference of the cam 150, in positions equidistant from the first shaft 171, on both sides of the contact arm 272 of the cam follower 170 to hold the contact arm 272. With this arrangement, the cam follower 170 is restrained from rotating about the first shaft 171. In the third embodiment, with the stopper 279 holding the contact arm 272, the rotation of the cam follower 170 about the first shaft 171 (on the rotation axis AX) can be restricted reliably.

As shown in FIG. 27C, the first cam 150K includes a first protrusion 257A. The first protrusion 257A is contactable with the first swingable piece 220A of the translation plate 200. When the first swingable piece 220A of the translation plate moving from the first position to the second position contacts the first protrusion 257, the first cam 150K is caused to rotate. The first protrusion 257A protrudes form the side surface of the disk portion 151 of the first cam 150K in a direction (second direction) parallel to the rotation axis AX.

Figure 28A:
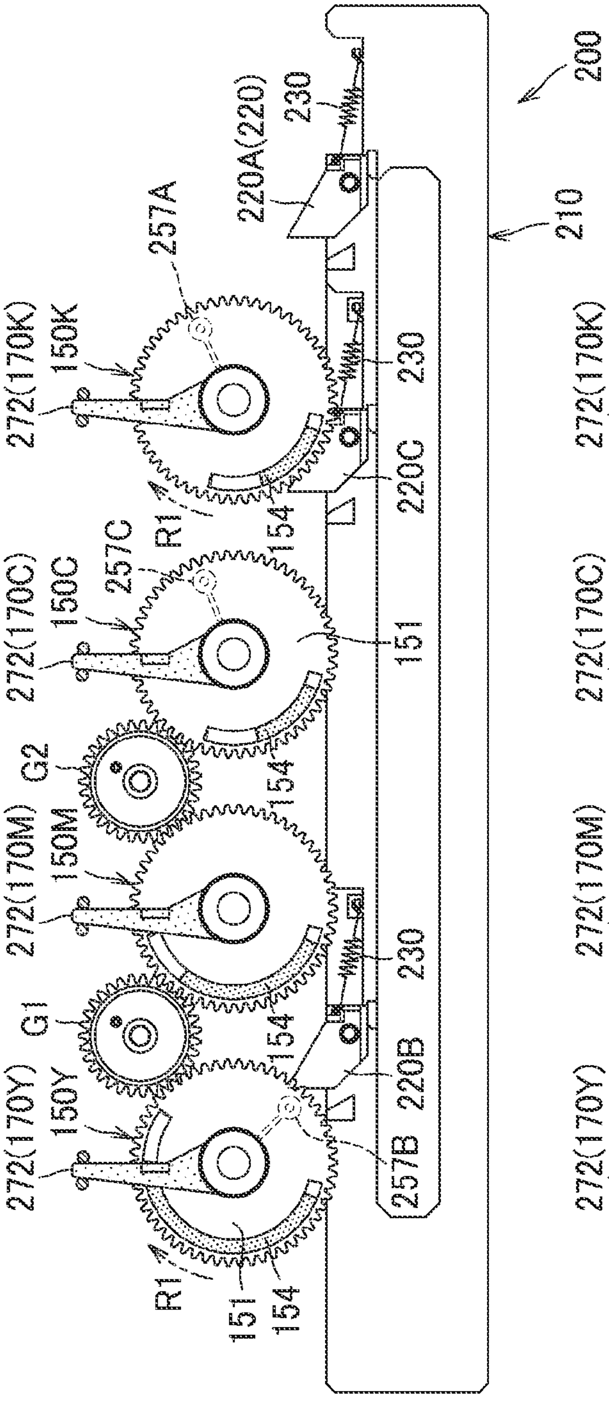
FIGS. 28A, 28B, 29A and 29B are diagrams for explaining a process of operation of a translation plate according to the third embodiment.

As shown in FIG. 28A, the second cam 150Y includes a second protrusion 257B. The second protrusion 257B is contactable with swingable piece 220B of the translation plate 200. When the swingable piece 220B of the translation plate 200 moving from the first position to the second position comes in contact with the second protrusion 257B, the cams 150Y, 150M and 150C are caused to rotate. The second protrusion 257B protrudes from the side surface of the disk portion 151 of the second cam 150Y in the direction (second direction) parallel to the rotation axis AX.

The fourth cam 150C includes a third protrusion 257C. The third protrusion 257C is contactable with the swingable piece 220C of the translation plate 200. When the swingable piece 220C of the translation plate 200 moving from the first position to the second position comes in contact with the third protrusion 257C, the cams 150Y, 150M and 150C are caused to rotate. The third protrusion 257C protrudes from the side surface of the disk portion 151 of the fourth cam 150C in the direction (second direction) parallel to the rotation axis AX.

For instance, in the third embodiment, as viewed in a direction (first direction) parallel to the rotation axis AX, the first protrusion 257A is located on an end of the first cam 150K opposite to an end on which the cam surface 154 is located, across the rotation axis AX of the first cam 150K. Similarly, as viewed in the direction (first direction) parallel to the rotation axis AX, the second protrusion 257B is located on an end of the second cam 150Y opposite to an end on which the cam surface 154 is located, across the rotation axis AX of the second cam 150Y. As viewed in the direction (first direction) parallel to the rotation axis AX, the third protrusion 257C is located on an end of the fourth cam 150C opposite to an end on which the cam surface 154 is located, across the rotation axis AX of the fourth cam 150C.

In the third embodiment, the translational motion of the translation plate 200 from the first position to the second position, made when the first cam follower 170K is positioned in the push position, causes the first cam 150K to rotate in the first rotation direction R1, to thereby cause the first cam follower 170K to be moved and positioned in the no-push position. Moreover, in the third embodiment, the translational motion of the translation plate 200 from the first position to the second position, made when at least the second cam follower 170Y is positioned in the push position, causes the cams 150Y, 150M and 150C to rotate in the first rotation direction R1, to thereby cause the cam followers 170Y, 170M and 170C to be positioned in the no-push position.

The translation plate 200 comprises a translation plate body 210, swingable pieces 220, and springs 230. In the third embodiment, the swingable pieces 220 include a first swingable piece 220A as an example of a first contact piece, a second swingable piece 220B as an example of a second contact piece, and a third swingable piece 220C as an example of a third contact piece.

The first swingable piece 220A is caused to contact the first protrusion 257A of the first cam 150K by the translational motion of the translation plate 200 from the first position to the second position, made when the first cam follower 170K is positioned in the push position. When the translational motion of the translation plate 200 from the first position to the second position causes the first swingable piece 220A to contact the first protrusion 257A, the first swingable piece 220A causes the first cam 150K to rotate in the first rotation direction R1, to thereby cause the first cam follower 170K to be moved and positioned in the no-push position.

The second swingable piece 220B is contactable with the second protrusion 257B of the second cam 150Y during the translational motion of the translation plate 200 from the first position to the second position, made when the second cam follower 170Y is positioned in the push position. When the translational motion of the translation plate 200 from the first position to the second position causes the second swingable piece 220B to contact the second protrusion 257B, the second swingable piece 220B causes the cams 150Y, 150M and 150C to rotate in the first rotation direction R1.

The third swingable piece 220C is contactable with the third protrusion 257C of the fourth cam 150C during the translational motion of the translation plate from the first position to the second position. When the translational motion of the translation plate 200 from the first position to the second position causes the third swingable piece 220C to contact the third protrusion 257C, the third swingable piece 220C causes the cams 150Y, 150M and 150C to rotate in the first rotation direction R1, to thereby cause the cam followers 170Y, 170M and 170C to be positioned in the no-push position.

Next, a description will be given of an operation of the translation plate 200.

As shown in FIG. 28A, in which the cams 150 take such phases as observed immediately after the second cam follower 170Y has moved to its no-push position, the second swingable piece 220B of the translation plate 200 positioned in the first position is contactable with the second protrusion 257B of the second cam 150Y.

Figure 28B:
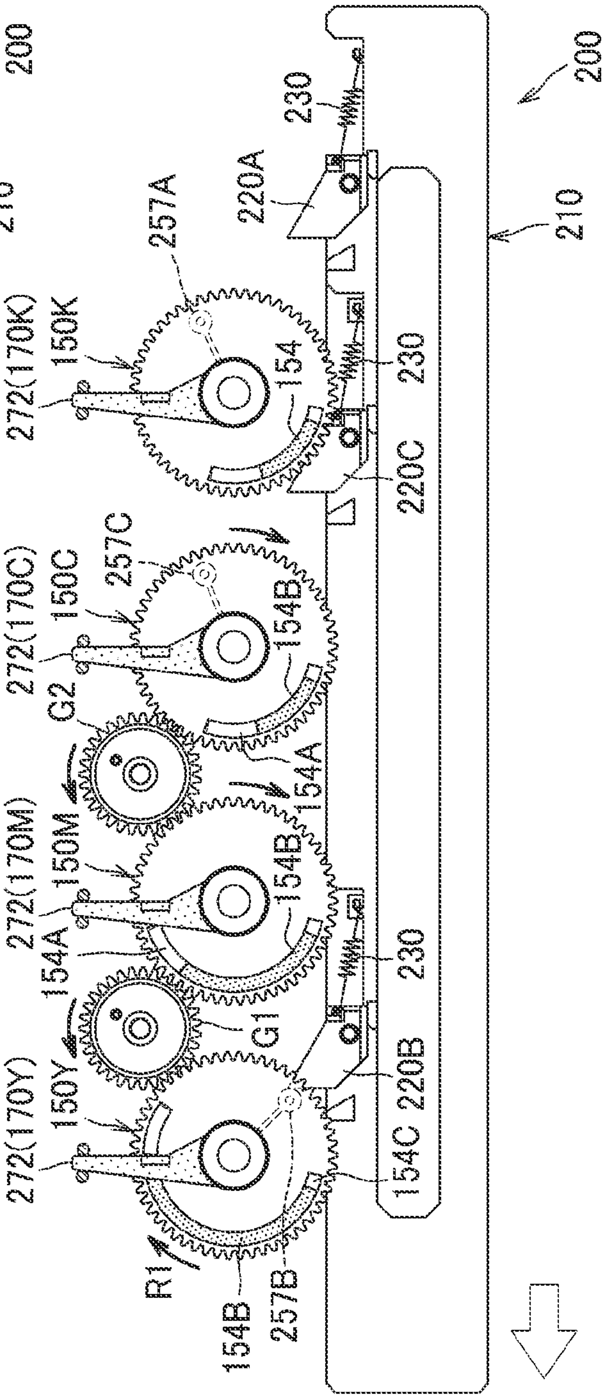

The translation plate 200 moves frontward as shown in FIG. 28B from the first position toward the second position, in synchronization with the operation of opening the cover 11. In this process, the second swingable piece 220B comes in contact with the second protrusion 257B. Then, as the translation plate 200 moves further frontward, the second protrusion 257B is pushed by the second swingable piece 220B, whereby the cams 150Y, 150M and 150C are caused to rotate in the first rotation direction R1.

Figure 29A:
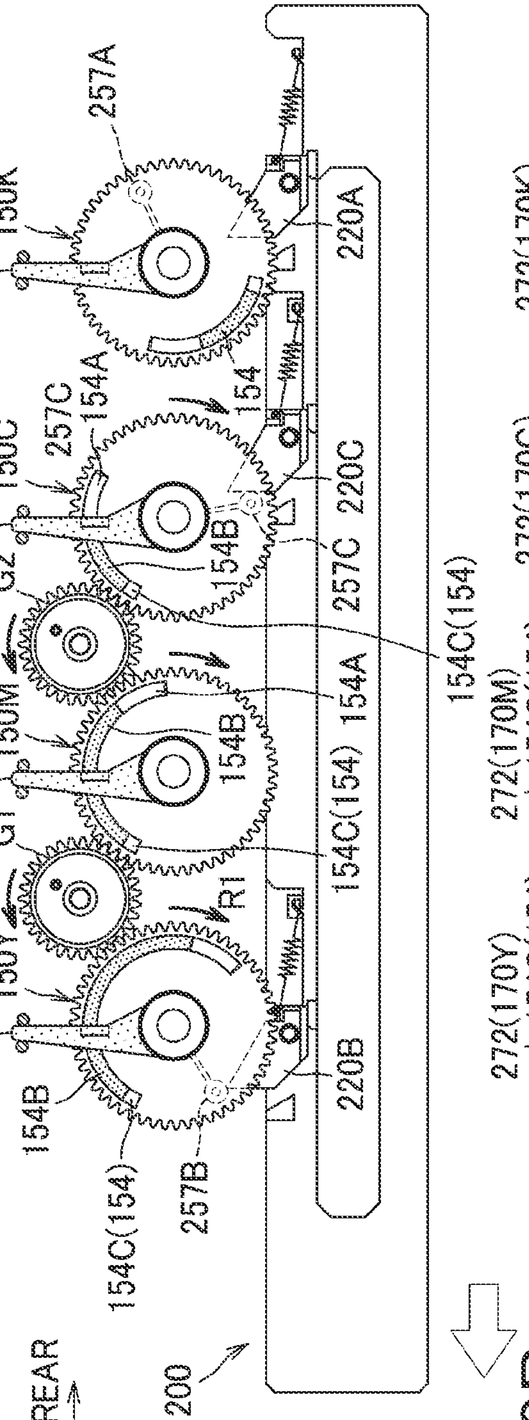

Accordingly, as shown in FIG. 29A, the contact arm 272 of the second cam follower 170Y slides on the retaining surface 154B of the second cam 150Y toward the second guide surface 154C of the second cam 150Y. The contact arm 272 of the third cam follower 170M contacts the first guide surface 154A of the third cam 150M, slides on the first guide surface 154A of the third cam 150M, and then contacts the retaining surface 154B of the third cam 150M, and slides on the retaining surface 154B of the third cam 150M toward the second guide surface 154C of the third cam 150M. The contact arm 272 of the fourth cam follower 170C contacts the first guide surface 154A of the fourth cam 150C, slides on the first guide surface 154A of the fourth cam 150C, and then contacts the retaining surface 154B of the fourth cam 150C.

After the second protrusion 257B gets out of contact with, and no longer pushed by, the second swingable piece 220B, the third swingable piece 220C in turn comes in contact with the third protrusion 257C of the fourth cam 150C. Further translational motion of the translation plate 200 frontward causes the third protrusion 257C to be pushed by the third swingable piece 220C whereby the cams 150Y, 150M and 150C are caused to rotate in the first rotation direction R1.

Figure 29B:
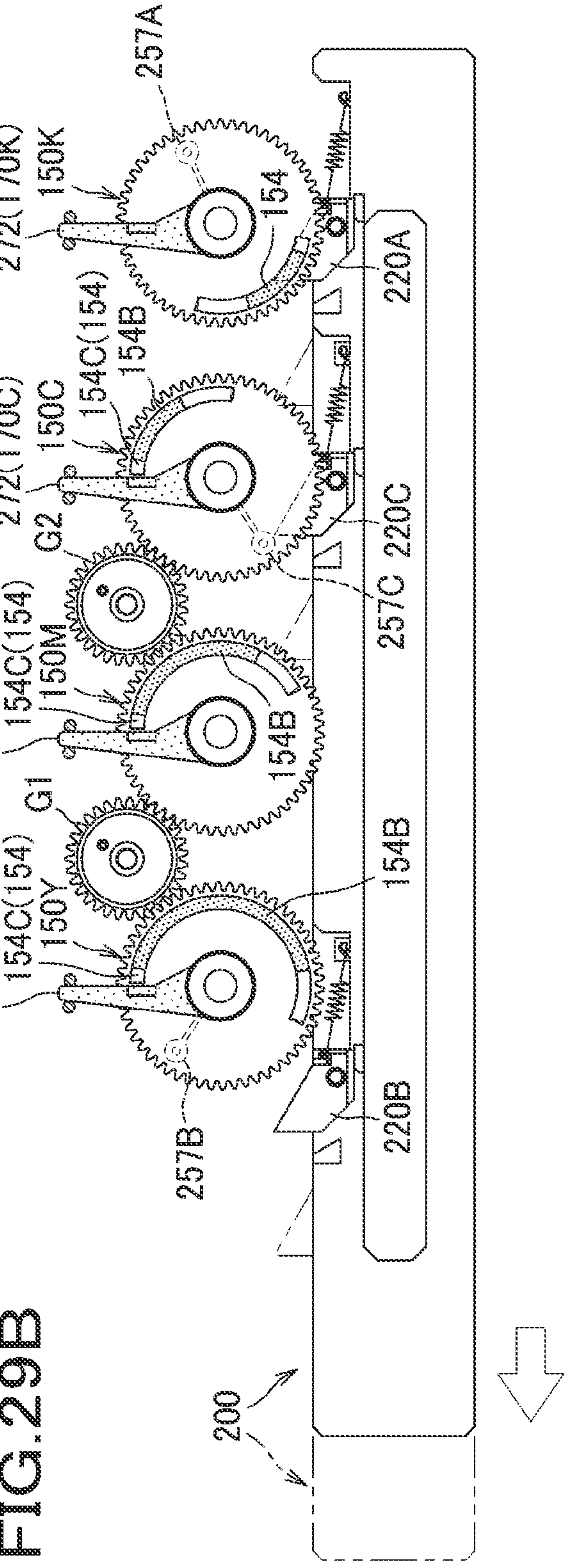

Accordingly, the contact arms 272 of the cam followers 170Y, 170M and 170C are caused to slide on the retaining surfaces 154B of the corresponding cams 150Y, 150M and 150C toward the second guide surfaces 154C of the cams 150Y, 150M and 150C and thus guided from the retaining surfaces 154B to the second guide surfaces 154C, and then caused to slide on the second guide surfaces 154C, and as shown in FIG. 29B, get out of contact with the cam surfaces 154. In this way, the cam followers 170Y, 170M and 170C are caused to slide from the push positions to the no-push positions, and the development cartridges 60Y, 60M and 60C are caused to move from the separate positions to the contact positions. When the cover 11 is opened, the translation plate 200 is positioned in the second position as indicated by the chain double-dashed line.

When the first swingable piece 220A of the translation plate 200 moving from the first position to the second position comes in contact with the first protrusion 257A of the first cam 150K as shown in FIG. 27C, the first protrusion 257A is pushed by the first swingable piece 220A whereby the first cam 150K is caused to rotate in the first rotation direction R1. Accordingly, the contact arm 272 of the first cam follower 170K is caused to slide on the retaining surface 154B of the first cam 150K toward the second guide surface 154C of the first cam 150K and thus guided from the retaining surface 154B to the second guide surface 154C, then caused to slide on the second guide surface 154C, and get out of contact with the cam surface 154. In this way, the first cam follower 170K is caused to slide from the push position to the no-push position, and the development cartridge 60K is caused to move from the separate position to the contact position.

Next, a fourth embodiment will be described below with reference mainly to FIGS. 30A, 30B, 30C, 30D, 30E and 30F. In describing the fourth embodiment, an explanation and illustration of a mechanism for switching between transmission of a driving force to the development rollers 61 and disconnection of the transmission, and a mechanism for causing the cam followers 170 to move to the no-push positions in synchronization with the operation of opening the cover 11 will be omitted.

Figure 30A:
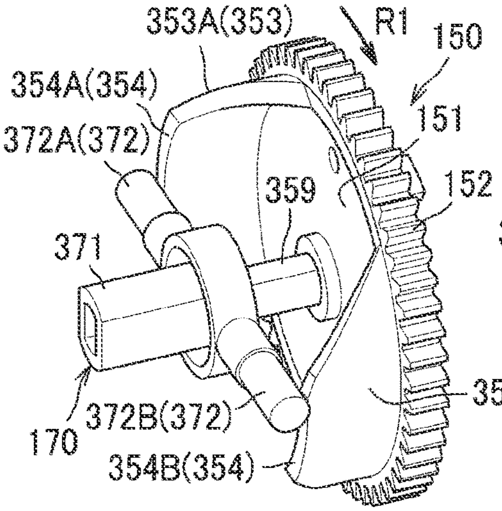
FIGS. 30A, 30B, 30C, 30D, 30E and 30F are diagrams for explaining the cams and cam followers configured according to a fourth embodiment.

As shown in FIG. 30A, the cam 150 in the fourth embodiment comprises a disk portion 151, a gear portion 152, and a cam portion 353. The cam follower 170 is slidable in directions parallel to a rotation axis of the cam 150 between a push position shown in FIG. 30A and a no-push position shown in FIG. 30E.

The cam portion 353 protrudes from a side surface of the disk portion 151 in a direction parallel to the rotation axis. The cam portion 353 has a cam surface 354 configured to cause the cam follower 170 to move between the push position and the non-push position to thereby cause the development cartridge 60 to move between the separate position and the contact position. The cam portion 353 includes a first cam portion 353A and a second cam portion 353B. The second cam portion 353B is configured to have a shape symmetric to that of the first cam portion 353A with respect to the rotation axis of the cam 150.

Figure 30B:
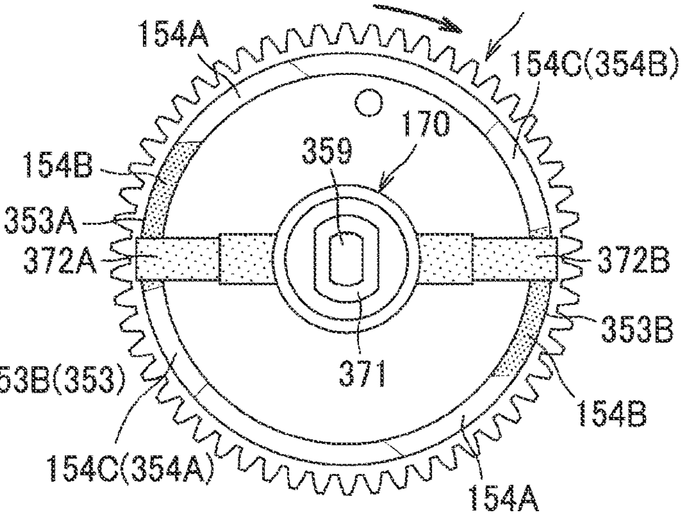

The cam surface 354 includes a first cam surface 354A provided on the first cam portion 353A, and a second cam surface 354B provided on the second cam portion 353B. The second cam surface 354B is configured to have a shape symmetric to that of the first cam surface 354A with respect to the rotation axis of the cam 150. As shown in FIG. 30B, each of the first cam surface 354A and the second cam surface 354B includes a first guide surface 154A configured to cause the cam follower 170 to move from the no-push position to the push position, a retaining surface 154B configured to retain the cam follower 170 in the push position, and a second guide surface 154C configured to cause the cam follower 170 to move from the push position to the no-push position.

As shown in FIG. 30A, the cam follower 170 includes a first shaft 371 and a contact arm 372.

The first shaft 371 is supported slidably in directions parallel to the rotation axis. Specifically, the image forming apparatus 1 comprises a second shaft 359 by which the cam 150 is rotatably supported, and the first shaft 371 is engaged with the second shaft 359, slidably along the second shaft 359 (in the directions parallel to the rotation axis of the cam 150). Accordingly, the cam follower 170 is slidable between the push position and the no-push position in the directions parallel to the rotation axis.

The contact arm 372 comprises a first contact arm 372A and a second contact arm 372B. The first contact arm 372A extends from the first shaft 371 in a direction perpendicular to the rotation axis. The first contact arm 372A is contactable with the first cam surface 354A and the second cam surface 354B alternately as the cam 150 rotates. The second contact arm 372B extends from the first shaft 371 in a direction perpendicular to the rotation axis. The direction in which the second contact arm 372B extends from the first shaft 371 is opposite to the direction in which the first contact arm 372A extends. The second contact arm 372B is contactable with the second cam surface 354B and the first cam surface 354A alternately. In FIGS. 30B, 30D and 30F, the contact arm 372 (372A, 372B) and the retaining surface 154B are shown with dot hatch patterns.

Figure 30C:
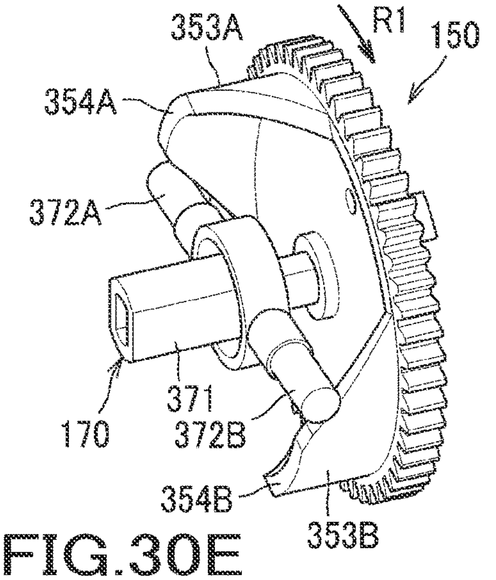
Figure 30D:
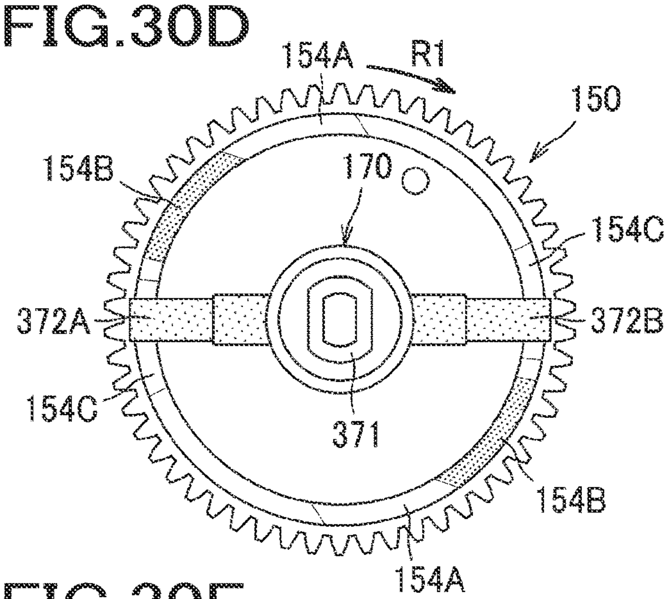
Figure 30E:
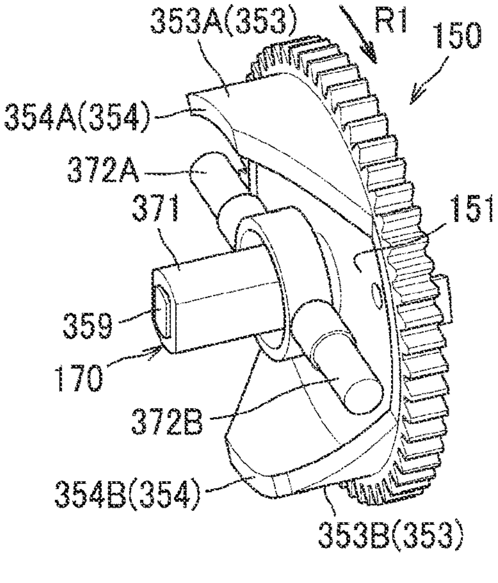
Figure 30F:
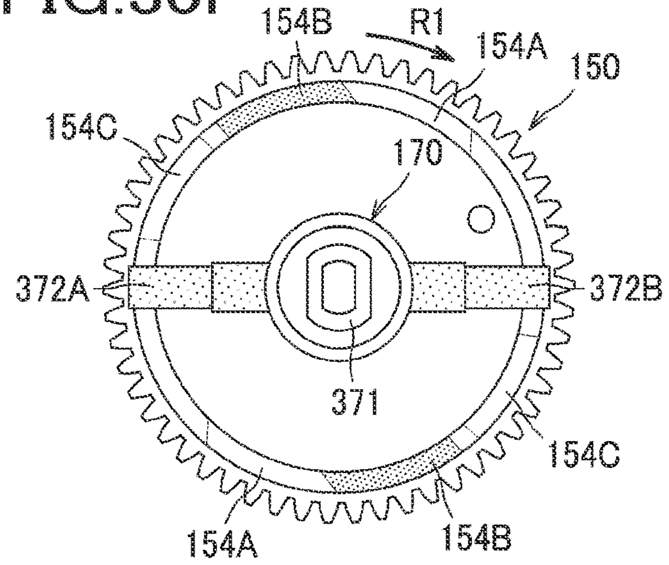

Rotation of the cam 150 in the first rotation direction R1, made when the cam follower 170 is located in the push position as shown in FIGS. 30A and 30B, causes the contact arm 372 (372A, 372B) to be guided from the retaining surface 154B to the second guide surface 154C and slide on the second guide surface 154C as shown in FIGS. 30C and 30D. In this way, the cam follower 170 is caused to slide from the push position toward the no-push position. Thereafter, when the contact arm 372 (372A, 372B) gets out of contact with the cam surface 154 as shown in FIGS. 30E and 30F, the cam follower 170 is positioned in the no-push position.

Rotation of the cam 150 in the first rotation direction R1, made when the cam follower 170 is located in the no-push position, causes contact arm 372 (372A, 372B) to come in contact with the first guide surface 154A, and slide on the first guide surface 154A. In this way, the cam follower 170 is caused to slide from the no-push position toward the push position. Thereafter, when the contact arm 372 (372A, 372B) comes in contact with the retaining surface 154B, the cam follower 170 is positioned in the push position.

With the cam 150 configured as described above in the fourth embodiment, the load imposed on the cam 354 (354A, 354B) from the contact arm 372 (372A, 372B) can be distributed approximately uniformly over the cam surface. Accordingly, the wearing away, for example, of the contact arm 372 and/or the cam surface 354 can be restrained. Moreover, the cam 150 and/or the cam follower 170 can be restrained from inclining at an angle with respect to the second shaft 359, so that cam 150 and the cam follower 170 can be caused to operate stably.

Next, a fifth embodiment will be described below with reference mainly to FIGS. 31 to 39. In describing the fifth embodiment, an explanation and illustration of a mechanism for switching between transmission of a driving force to the development rollers 61 and disconnection of the transmission, and a mechanism for causing the cam followers 170 to move to the no-push positions in synchronization with the operation of opening the cover 11 will be omitted.

Figure 31:
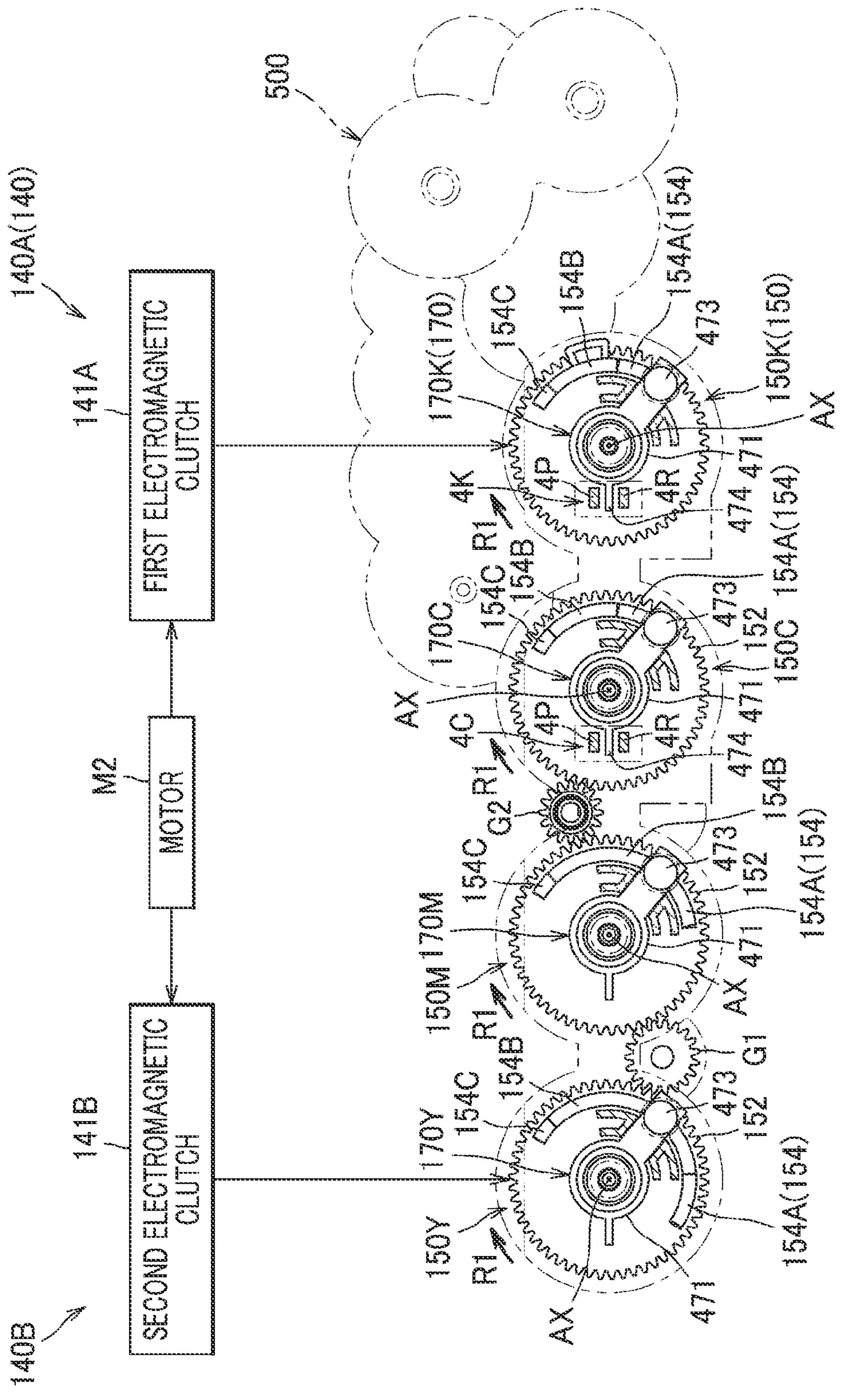
FIG. 31 is a diagram for explaining cams, cam followers, and a mechanism for transmitting a driving force to the cams, configured according to a fifth embodiment.

As shown in FIG. 31, the image forming apparatus 1 comprises a motor M2, a cam driving gear train 140, a plurality of cams 150, and a plurality of cam followers 170.

The motor M2 is a driving source used mainly for causing the cams 150 to rotate, specifically, for causing a first cam 150K, a second cam 150Y, a third cam 150M, and a fourth cam 150C.

The cam driving gear train 140 is capable of transmitting a driving force of the motor M2 to the cams 150. The cam driving gear train 140 comprises a first cam driving gear train 140A capable of transmitting the driving force to the first cam 150K, and a second cam driving gear train 140B capable of transmitting the driving force to the second cam 150Y, the third cam 150M, and the fourth cam 150C.

The first cam driving gear train 140A includes a first electromagnetic clutch 141A. The first electromagnetic clutch 141A selectively transmits and stops transmitting the driving force from the motor M2 to the first cam 150K by connecting or disconnecting the motor M2 and the first cam 150K, to switch the operation of the first cam 150K, i.e., selectively causing the first cam 150K to rotate and stop rotating. For example, when the first electromagnetic clutch 141A is energized, it transmits the driving force (from the motor M2 to the first cam 150K). Accordingly, the first cam 150K is caused to rotate. On the other hand, when the first electromagnetic clutch 141A is not energized, it stops transmitting the driving force to the first cam 150K. Accordingly, the first cam 150K is caused to stop rotating. The controller 2 (see FIG. 1) controls the first electromagnetic clutch 141A to selectively transmit and stop transmitting the driving force from the motor M2, to thereby cause the first cam 150K to rotate and stop rotating.

The second cam driving gear train 140B includes a second electromagnetic clutch 141B. The second electromagnetic clutch 141B selectively transmits and stops transmitting the driving force from the motor M2 to the second cam 150Y, the third cam 150M and the fourth cam 150C (e.g., by connecting or disconnecting the motor M2 and the second cam 150Y interlocked with the third cam 150M and the fourth cam 150C via idle gears G1 and G2), to switch the operations of the second cam 150Y, the third cam 150M, and the fourth cam 150C, i.e., selectively causing the second cam 150Y, the third cam 150M, and the fourth cam 150C to rotate and stop rotating. For example, when the second electromagnetic clutch 141B is energized, it transmits the driving force (from the motor M2 to the second cam 150Y). Accordingly, the second cam 150Y, the third cam 150M and the fourth cam 150C are caused to rotate. On the other hand, when the second electromagnetic clutch 141B is not energized, it stops transmitting the driving force to the second cam 150Y, the third cam 150M, and the fourth cam 150C. Accordingly, the second cam 150Y, the third cam 150M and the fourth cam 150C are caused to stop rotating. The controller 2 controls the second electromagnetic clutch 141A to selectively transmit and stop transmitting the driving force from the motor M2, to thereby cause the second cam 150Y, the third cam 150M, and the fourth cam 150C to rotate and stop rotating selectively.

The controller 2 comprises a central processing unit or CPU, a read-only memory or ROM, a random-access memory, an input/output unit and other components, and executes pre-stored programs to execute various processes of control. The controller 2 controls the operation of the motor M2 and the electromagnetic clutches 141A and 141B to thereby control the operation of the cams 150. Accordingly, the development rollers 61 are selectively brought into contact with and separated from the corresponding photosensitive drums 50 under control of the controller 2.

Figure 32:
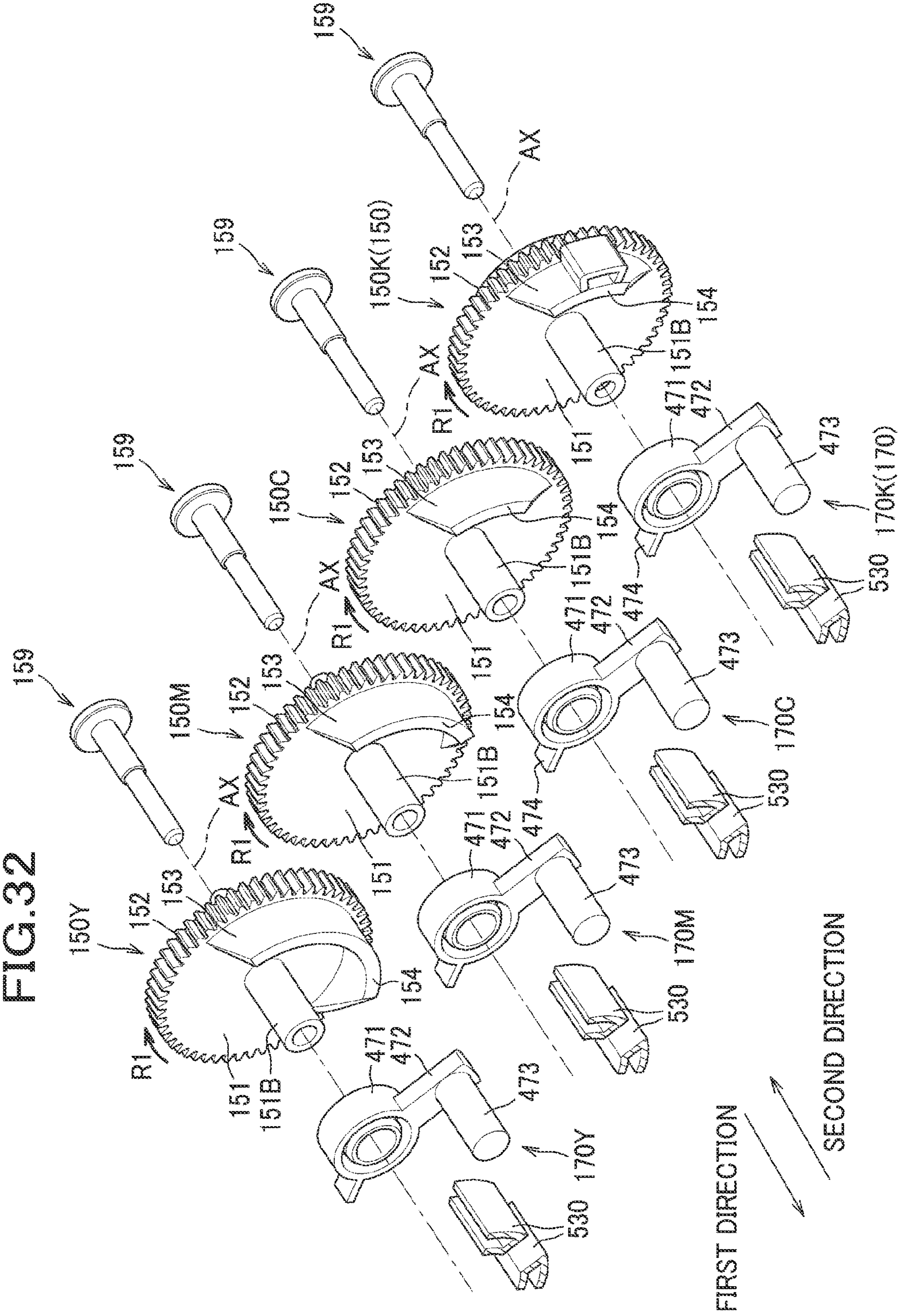
FIG. 32 is a perspective view showing cams, cam followers and stoppers.

The cams 150 rotate as shown in FIG. 32, to cause the development cartridges 60 to move between the contact positions and the separate positions. The cams 150 include a first cam 150K, a second cam 150Y, a third cam 150M and a fourth cam 150C. As the first cam 150K rotates, the first development cartridge 60K is caused to move between the contact position and the separate position by the first cam 150K. As the second cam 150Y rotates, the second development cartridge 60Y is caused to move between the contact position and the separate position by the second cam 150Y. As the third cam 150M rotates, the third development cartridge 60M is caused to move between the contact position and the separate position by the third cam 150M. As the fourth cam 150C rotates, the fourth development cartridge 60C is caused to move between the contact position and the separate position by the fourth cam 150C.

The cam followers 170 are slidable in directions parallel to rotation axes AX (indicated by alternate long and short dashed lines in FIG. 32) of the cams 150. The two opposite directions parallel to the rotation axis AX will be hereinafter referred to as "first and second directions" where appropriate. Each cam follower 170 is caused to slide, as the corresponding cam 150 rotates, between a push position as shown in FIG. 33B in which the corresponding development cartridge 60 is pushed by the cam follower 170 and positioned in the separate position and a no-push position as shown in FIG. 33A in which the corresponding development cartridge 170 is positioned in the contact position.

Figures 33A, 33B:
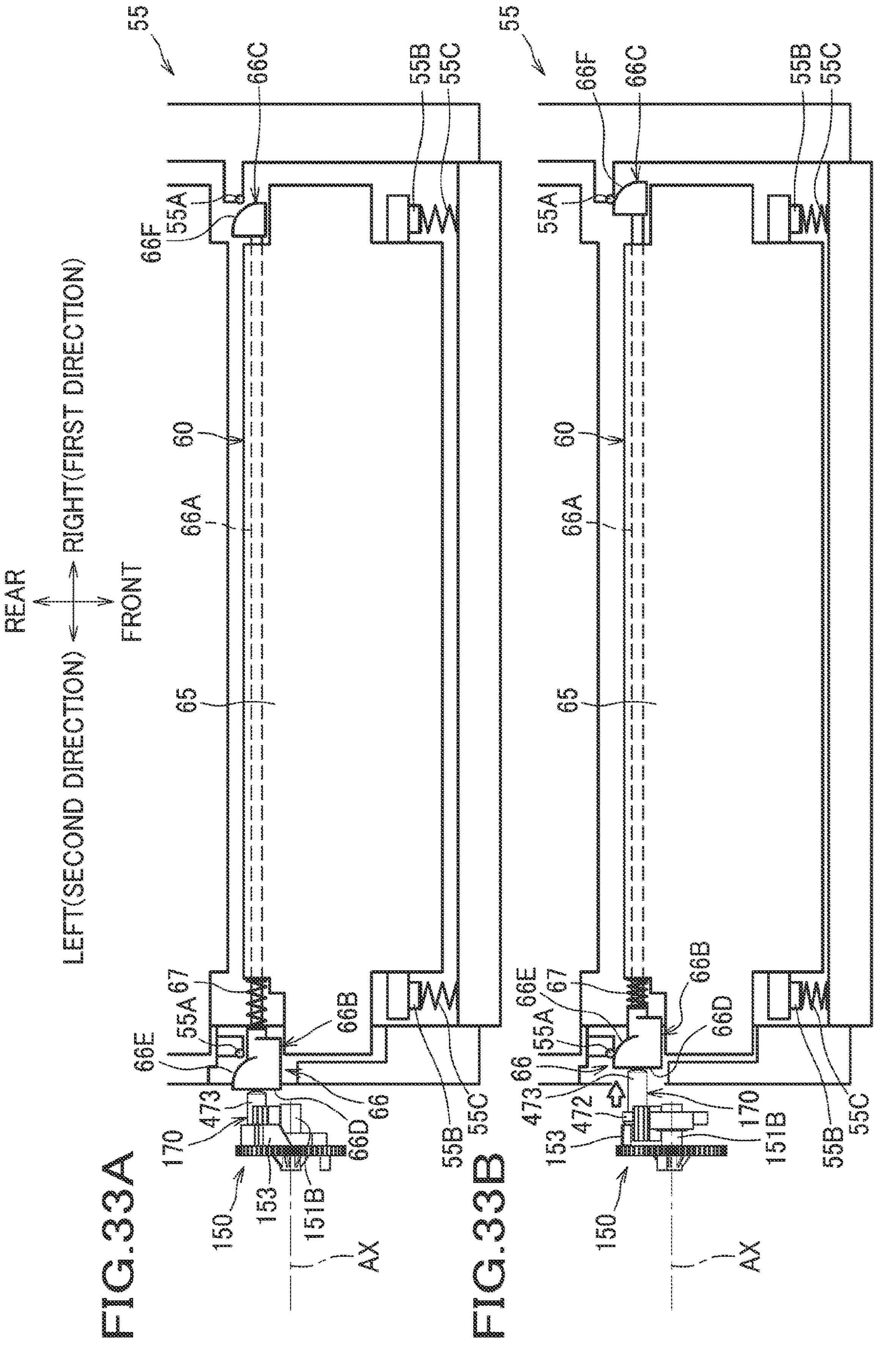
FIGS. 33A and 33B are diagrams for explaining an arrangement for moving a development cartridge, showing a state in which the development cartridge is positioned in a contact position and a state in which the development cartridge is positioned in a separate position, respectively.

As shown in FIGS. 33A and 33B, the development cartridge 60 is slidably supported by the drawer 55 so that the development cartridge 60 can slide frontward and rearward. The drawer 55 includes contact portions 55A and push members 55B. The contact portions 55A are portions with which a slide member 66, which will be described below, is contactable. Each of the contact portions 55A consists of a roller rotatable on a vertical axis. The push members 55B are biased by springs 55C rearward. When the development cartridge 60 is installed in the drawer 55, the push member 55B pushes and causes the development cartridge 60 to move to the contact position in which the development roller 61 is in contact with the photosensitive drum 50.

The development cartridge 60 comprises a case 65 that holds toner, and a slide member 66. The slide member 66 is slidable relative to the case 65 in the directions parallel to the rotation axis AX. When the slide member 66 is pushed by the cam follower 170, the slide member 66 is caused to move in a direction parallel to the rotation axis AX. The slide member 66 comprises a shaft 66A, a first contact member 66B and a second contact member 66C. The shaft 66A is oriented parallel to the rotation axis AX and slidably supported by the case 66A. The first contact member 66B is provided at one end of the shaft 66A and the second contact member 66C is provided at the other end of the shaft 66A.

The first contact member 66B has a to-be-pushed surface 66D and an inclined surface 66E. The inclined surface 66E is a surface inclined with respect to the rotation axis AX of the cam 150 and parallel to the axis on which the contact portion 55A of the drawer 55 is rotatable. The second contact member 66C has an inclined surface 66F similar to the inclined surface 66E. The to-be-pushed surface 66D is pushed by the cam follower 170. When the slide member 66 is pushed by the cam follower 170, the inclined surfaces 66C and 66E come in contact with the contact portions 55A, and bias and cause the development cartridge 60 to move in a direction perpendicular to the rotation axis AX to the separate position in which the development roller 61 is separate from the photosensitive drum 50. A spring 67 is located between the first contact member 66B and the case 65 to bias the slide member 66 leftward.

Referring back to FIG. 32, the cam followers 170 include a first cam follower 170K, a second cam follower 170Y, a third cam follower 170M and a fourth cam follower 170C.

The first cam follower 170K is caused to slide, as the first cam 150K rotates, between a push position in which the first development cartridge 60K is pushed by the first cam follower 170K and positioned in the separate position and a no-push position in which the first development cartridge 60K is positioned in the contact position. The first cam follower 170K is caused to slide in the directions parallel to the rotation axis AX between the push position and the no-push position by the action of a cam surface 154, which will be described later, of the first cam 150K as exerted when the first cam 150K rotates.

The second cam follower 170Y is caused to slide, as the second cam 150Y rotates, between a push position in which the second development cartridge 60Y is pushed by the second cam follower 170Y and positioned in the separate position and a no-push position in which the second development cartridge 60Y is positioned in the contact position. The second cam follower 170Y is caused to slide in the directions parallel to the rotation axis AX between the push position and the no-push position by the action of the cam surface 154 of the second cam 150Y as exerted when the second cam 150Y rotates.

The third cam follower 170M is caused to slide, as the third cam 150M rotates, between a push position in which the third development cartridge 60M is pushed by the third cam follower 170M and positioned in the separate position and a no-push position in which the third development cartridge 60M is positioned in the contact position. The third cam follower 170M is caused to slide in the directions parallel to the rotation axis AX between the push position and the no-push position by the action of the cam surface 154 of the third cam 150M as exerted when the third cam 150M rotates.

The fourth cam follower 170C is caused to slide, as the fourth cam 150C rotates, between a push position in which the fourth development cartridge 60C is pushed by the fourth cam follower 170C and positioned in the separate position and a no-push position in which the fourth development cartridge 60C is positioned in the contact position. The fourth cam follower 170C is caused to slide in the directions parallel to the rotation axis AX between the push position and the no-push position by the action of the cam surface 154 of the fourth cam 150C as exerted when the fourth cam 150C rotates.

The cams 150 (the first cam 150K, the second cam 150Y, the third cam 150M, and the fourth cam 150C) are end cams. Each cam 150 comprises a disk portion 151, a boss 151B, a gear portion 152, and a cam portion 153.

Figure 34A:
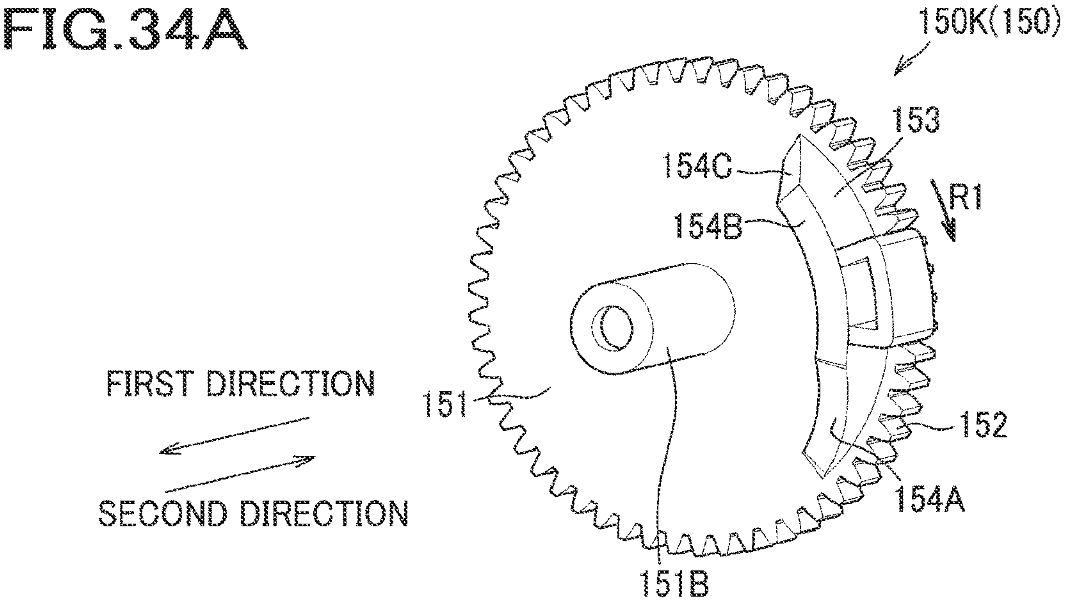
FIG. 34A is a perspective view of a first cam, showing a side thereof on which a cam portion is provided.
Figure 34B:
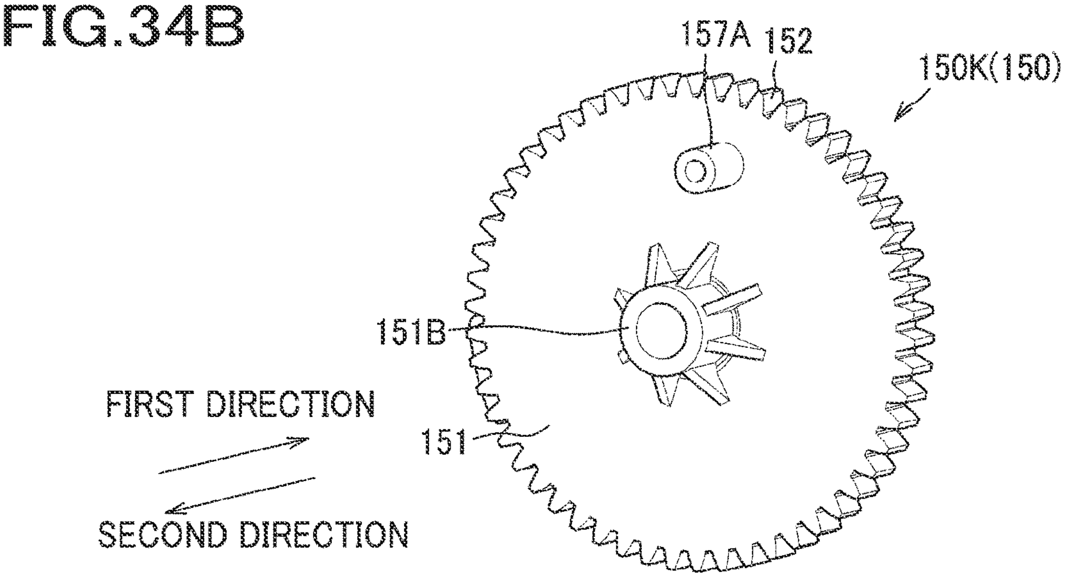
FIG. 34B is a perspective view of the first cam, showing another side thereof on which a protrusion is provided, that is an opposite side of the first cam opposite to the side on which the cam portion is provided as shown in FIG. 34A.

The boss 151B extends from the center of the disk portion 151 in a direction (first direction) parallel to the rotation axis AX (see also FIGS. 34A and 34B). The boss 151B has a cylindrical shape.

The image forming apparatus 1 further comprises four second shafts 159. Each of the second shafts 159 supports the corresponding cam 150 (i.e., the first cam 150K, the second cam 150Y, the third cam 150M, or the fourth cam 150C). The second shafts 159 are provided in the housing 10. The boss 151 is fitted on the corresponding second shaft 159, whereby the cam 150 is rotatably supported by the housing 10.

The gear portion 152 is formed on a circumference of the disk portion 151.

The cam portion 153 protrudes from a side surface of the disk portion 151 in the direction (first direction) parallel to the rotation axis AX. The cam portion 153 has a cam surface 154 configured to cause the cam follower 170 to move between the push position and the non-push position to thereby cause the development cartridge 60 to move between the separate position and the contact position. The cam surface 154 of each cam 150 (the first cam 150K, the second cam 150Y, the third cam 150M, and the fourth cam 150C) includes a first guide surface 154A, a retaining surface 154B, and a second guide surface 154C, as shown in FIG. 34A which illustrates the first cam 150K as a typified example.

The first guide surface 154A is configured to cause the corresponding cam follower 170 to move from the no-push position to the push position when the cam 150 rotates in a first rotation direction R1. For example, the first guide surface 154A of the first cam 150K rotating in the first rotation direction R1 causes the first cam follower 170K to move from the no-push position to the push position. The first guide surface 154A is inclined with respect to the circumference of the disk portion 151 extending in the first rotation direction R1 of the cam 150. The first guide surface 154A slopes gradually away from the disk portion 151 with distance from its downstream end toward its upstream end.

The retaining surface 154B is configured to retain the corresponding cam follower 170 in the push position. For example, the retaining surface 154B of the first cam 150K rotating in the first rotation direction R1 retains the first cam follower 170K in the push position (see FIGS. 36A and 36B). The retaining surface 154B is approximately parallel to the circumference of the disk portion 151 extending in the first rotation direction R1 of the cam 150. Note that the retaining surface 154B depicted in the drawing figures such as FIG. 35B which will be referenced later is shown with a dot hatch pattern.

The second guide surface 154C is configured to cause the corresponding cam follower 170 to move from the push position to the no-push position when the cam 150 rotates in the first rotation direction R1. For example, the second guide surface 154C of the first cam 150K rotating in the first rotation direction R1 causes the first cam follower 170K to move from the push position to the non-push position. The second guide surface 154C is inclined with respect to the circumference of the disk portion 151 extending in the first rotation direction R1 of the cam 150. The second guide surface 154C slopes gradually closer to the disk portion 151 with distance from its downstream end toward its upstream end.

Figure 34C:
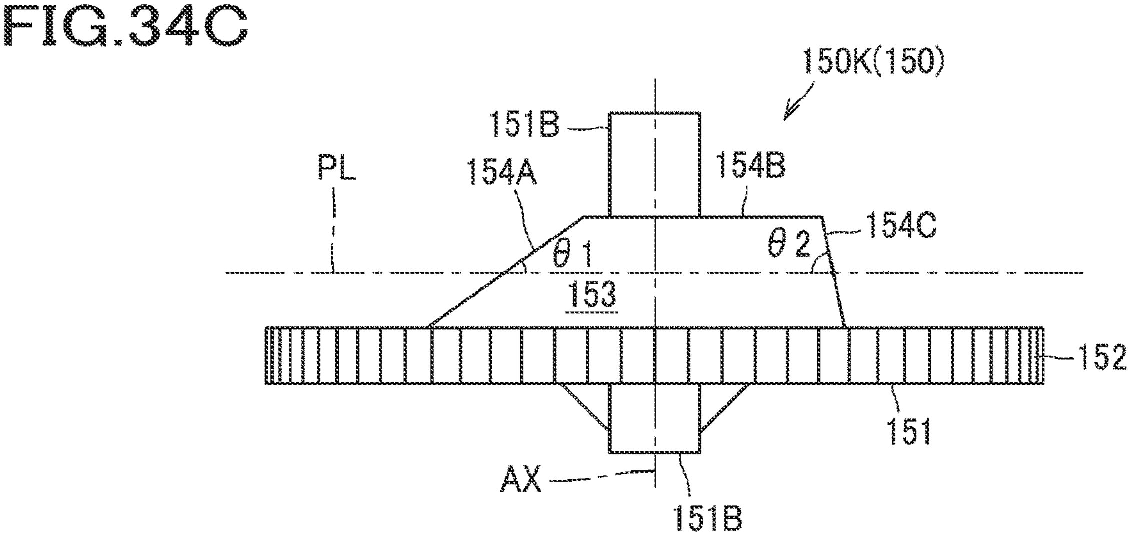
FIG. 34C is a side elevational view of the first cam.

As shown in FIG. 34C, an angle $\theta 2$ of the second guide surface 154C with respect to a plane PL perpendicular to the rotation axis AX is greater than an angle $\theta 1$ of the first guide surface 154A with respect to the plane PL perpendicular to the rotation axis AX. In other words, the second guide surface 154C is inclined steeper than the first guide surface 154A.

To move the first development cartridge 60K between the contact position and the separate position, the controller 2 causes the first cam 150K to rotate in the first rotation direction R1. To move the second development cartridge 60Y, the third development cartridge 60M, and the fourth development cartridge 60C between the respective contact positions and the respective separate positions, the controller 2 causes the second cam 150Y, the third cam 150M, and the fourth cam 150C to rotate in the first rotation direction R1 (see FIG. 32).

Figure 35A:
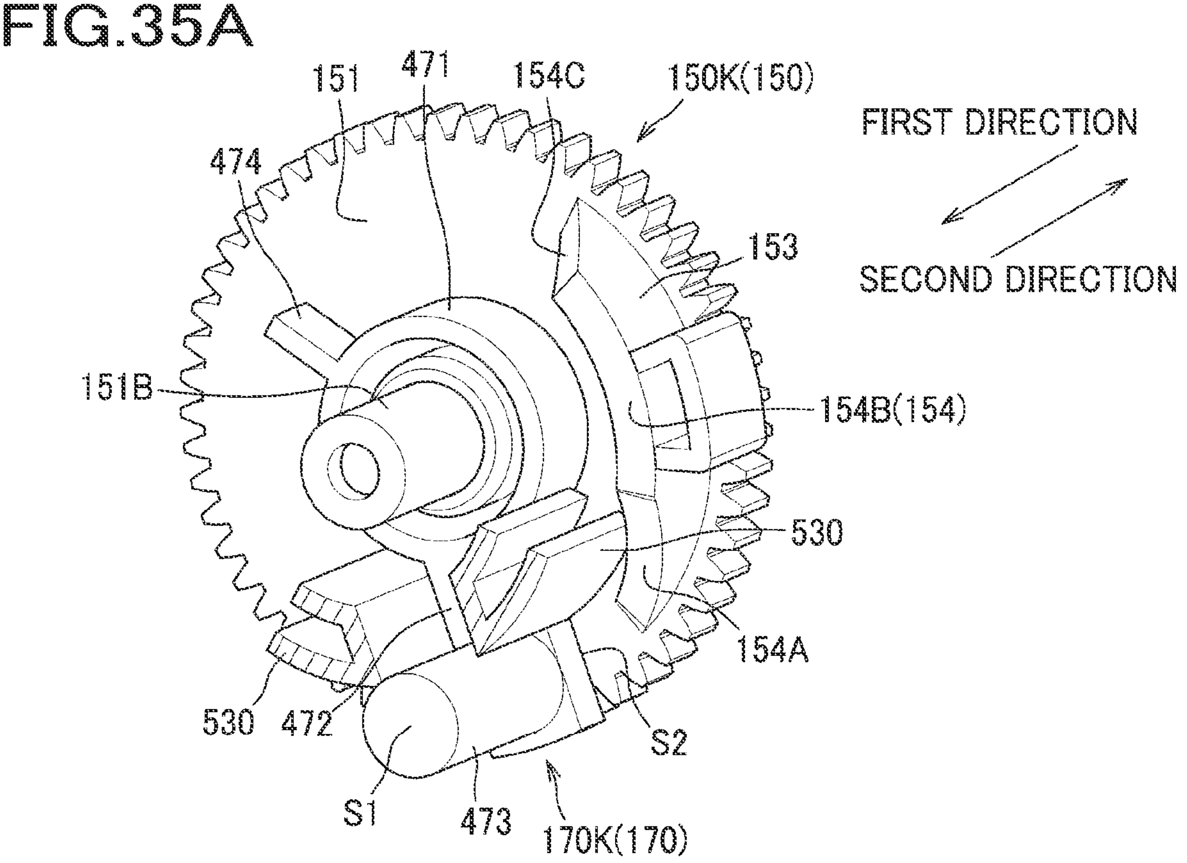
FIG. 35A is a perspective view showing the cam and the cam follower, as illustrated when the development cartridge is positioned in the contact position.
Figure 35B:
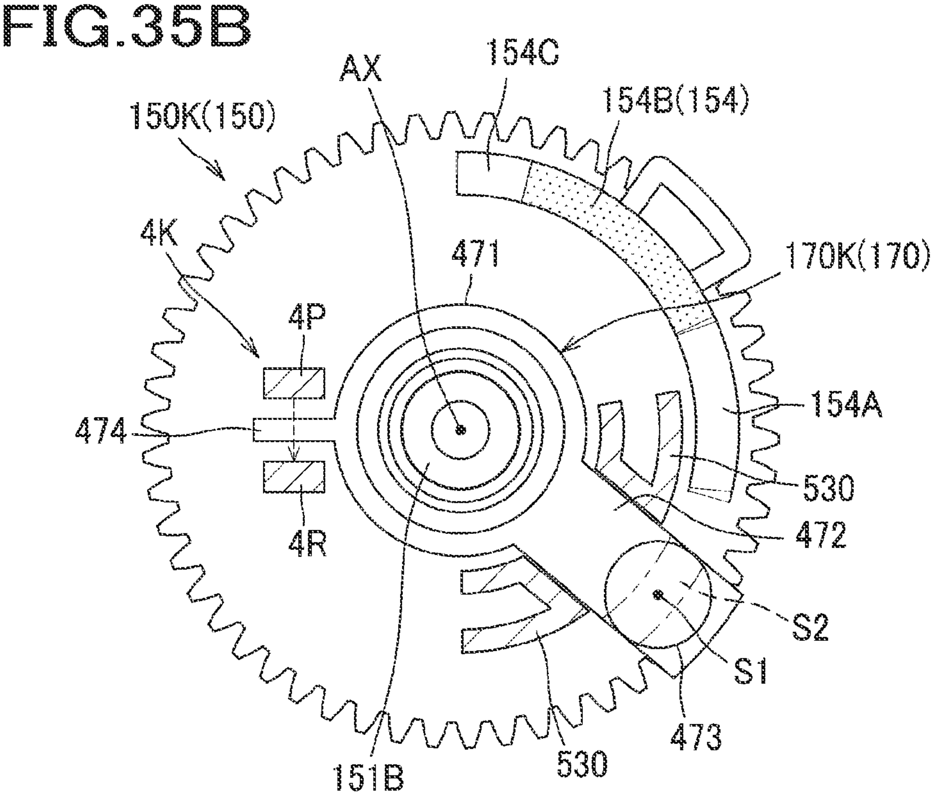
FIG. 35B is a side elevational view showing the cam and the cam follower, as illustrated when the development cartridge is positioned in the contact position.

As shown in FIGS. 35A and 35B, the cam follower 170 (the first cam follower 170K, the second cam follower 170Y, the third cam follower 170M, and the fourth cam follower 170C) has a pushing surface S1 and a contact surface S2. In addition, the cam follower 170 includes a slide shaft 471, an arm 472, a pin 473, and a rib 474.

The slide shaft 471 is supported slidably in directions parallel to the rotation axis AX. Specifically, the slide shaft 471 has a cylindrical shape. The slide shaft 471 is engaged with the boss 151B (oriented parallel to the rotation axis AX) of the cam 150, and thus movable relative to, i.e., slidable along, the boss 151B. Accordingly, the cam follower 170 is rendered slidable in the directions parallel to the rotation axis AX between the no-push position shown in FIGS. 35A and 35B and the push position shown in FIGS. 36A and 36B. The cam follower 170 is biased by a first spring 430 (see FIGS. 38A and 38B) toward the no-push position.

The arm 472 extends from the slide shaft 471 perpendicularly to the rotation axis AX, specifically, outward in a radial direction of the slide shaft 471. The arm 472 has a shape of a plate.

The pin 473 protrudes from the arm 472 in the direction (first direction) parallel to the rotation axis AX. Specifically, the pin 473 protrudes from a distal end portion of the arm

472 (i.e., one of the two ends that is the farther from the slide shaft 471) in the first direction parallel to the rotation axis AX. The pin 473 has a cylindrical shape. The end of the pin 473 has a surface in a convex shape (see FIGS. 38A and 38B).

Figure 36A:
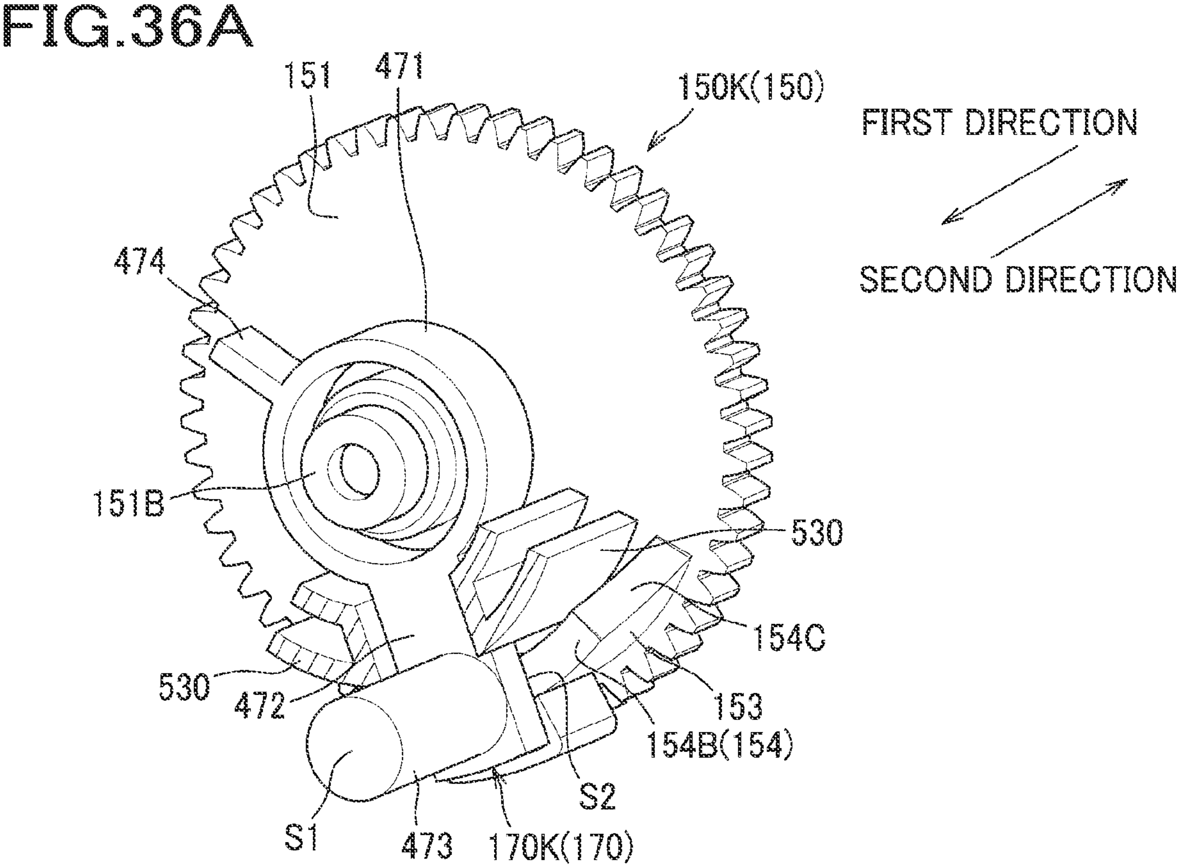
FIG. 36A is a perspective view showing the cam and the cam follower, as illustrated when the development cartridge is positioned in the separate position.
Figure 36B:
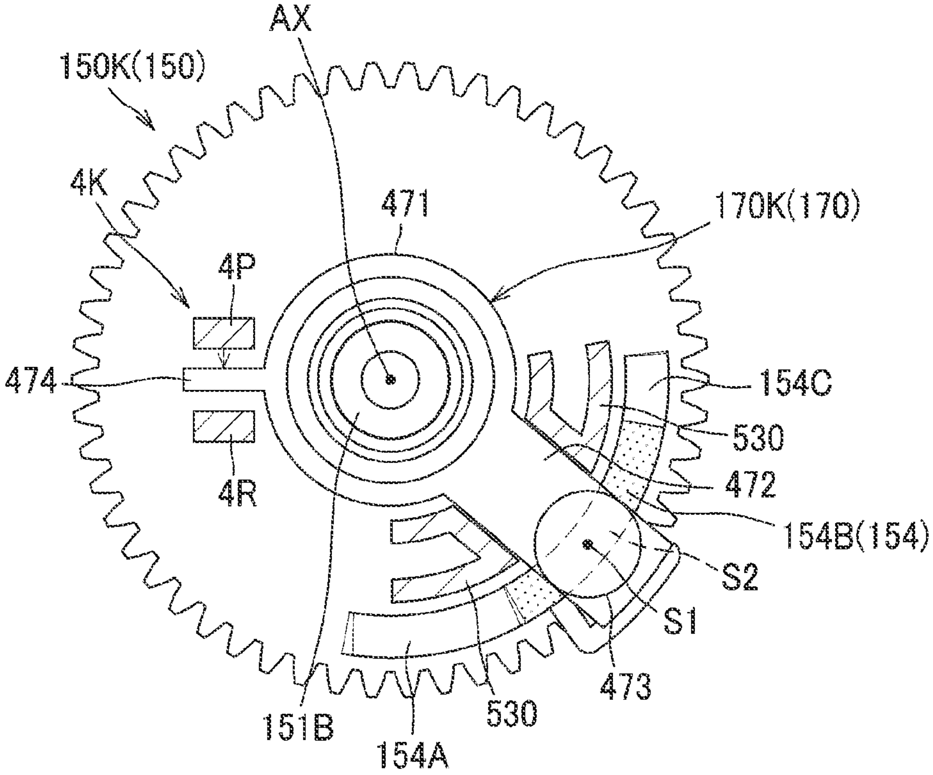
FIG. 36B is a side elevational view showing the cam and the cam follower, as illustrated when the development cartridge is positioned in the separate position.

The arm 472 of the cam follower 170 has a pushing surface S1 provided at the end of the pin 473, and a contact surface S2 provided on a side of the arm facing in a direction (second direction) opposite to the first direction parallel to the rotation axis AX. As shown in FIGS. 36A and 36B, the contact surface S2 is a surface that contacts the cam surface 154 of the corresponding cam 150 (the first cam 150K, the second cam 150Y, the third cam 150M and the fourth cam 150C).

The pushing surface S1 is a surface that pushes the corresponding development cartridge (the first development cartridge 60K, the second development cartridge 60Y, the third development cartridge 60M, and the fourth development cartridge 60C). More specifically, the pushing surface S1 pushes a to-be-pushed surface 66D of a first contact member 66B provided at the corresponding development cartridge 60 (see FIGS. 33A and 33B).

The rib 474, similar to the arm 472, extends from the slide shaft 471 perpendicularly to the rotation axis AX, specifically, outward in a radial direction of the slide shaft 471. To be more specific, the rib 474 extends from the slide shaft 471 perpendicularly to the rotation axis AX, outward in a radial direction of the slide shaft 471 that is a direction different from the direction in which the arm 472 extends from the slide shaft 471. In the fifth embodiment, the rib 474 extends from the slide shaft 471 leftward in FIG. 36B, and the arm 472 extends from the slide shaft 471 in an obliquely-rightward-and-downward direction in FIG. 36B.

Figure 37A:
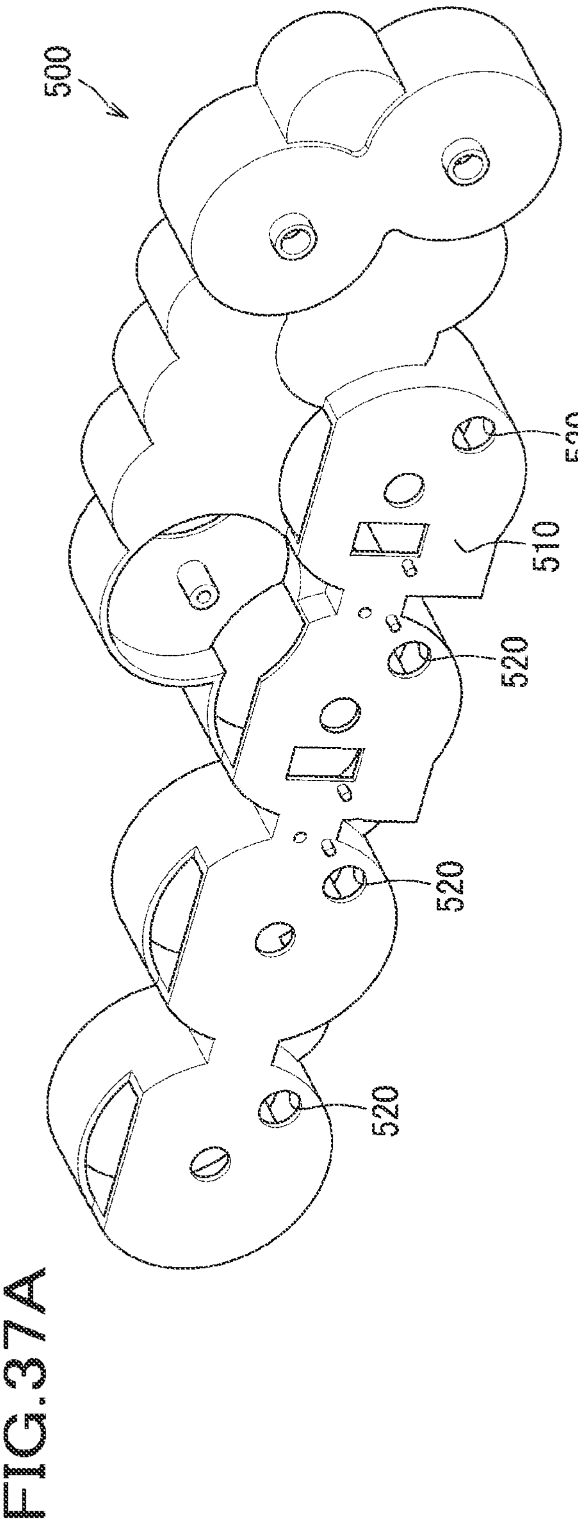
FIG. 37A is a perspective view of a first cover, showing an outside thereof.
Figure 37B:
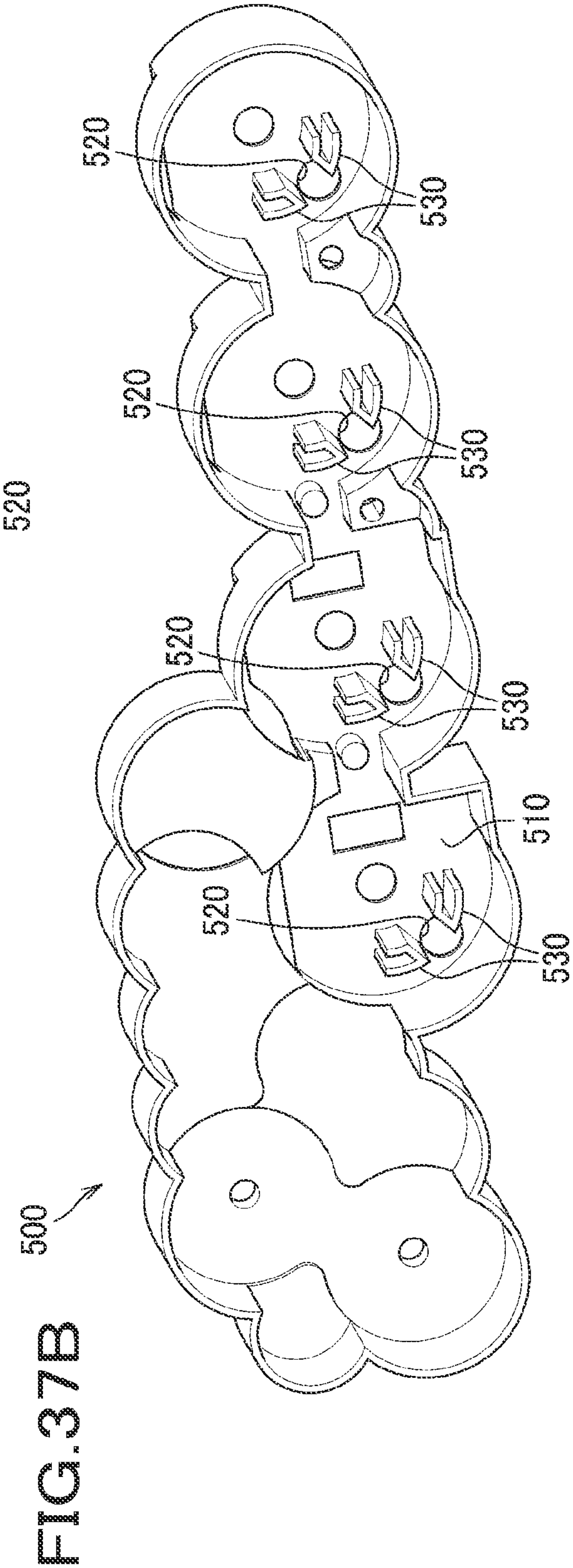
FIG. 37B is a perspective view of the first cover, showing an inside thereof.

The image forming apparatus 1 further comprises stoppers 530 by which the cam followers 170 (the first cam follower 170K, the second cam follower 170Y, the third cam follower 170M, and the fourth cam follower 170C) are restrained from rotating about the boss 151 (on the rotation axis AX). The stoppers 530 are provided in pair for each of the cam followers 170. As shown in FIGS. 31, 37A and 37B, the image forming apparatus 1 further comprises a first cover 500 with which at least part of each cam 150 and at least part of each cam follower 170 are covered.

The first cover 500 is provided in the housing 10. To be more specific, the first cover 500 is fixed to a metal sheet (not shown) to which the second shafts 159 (see FIG. 32) are fixed. The first cover 500 comprises a cover wall 510 with which the cams 150 and the cam followers 170 are covered, four insertion holes 520 in which the pins 473 of the cam followers 170 are inserted, and four pairs of the stoppers 530. Sides of the cams 150 and the cam followers 170 facing in the first direction parallel to the rotation axis AX are covered with the cover wall 510 which however does not cover the opposite sides thereof facing in the second direction opposite to the first direction (on which the second shafts 159 are provided).

Each pair of the stoppers 530 consists of two element each having a shape of a wall. As shown in FIGS. 35A, 35B, 36A and 36B, the two wall-shaped elements of each pair of the stoppers 530 are arranged side by side around the circumference of the cam 150, in positions equidistant from the slide shaft 471, on both sides of the arm 472 of the cam follower 170 to hold the arm 472. With this arrangement, the cam follower 170 (the first cam follower 170K, the second cam follower 170Y, the third cam follower 170M and the fourth cam follower 170C) is restrained from rotating about the boss 151B.

Figure 38A:
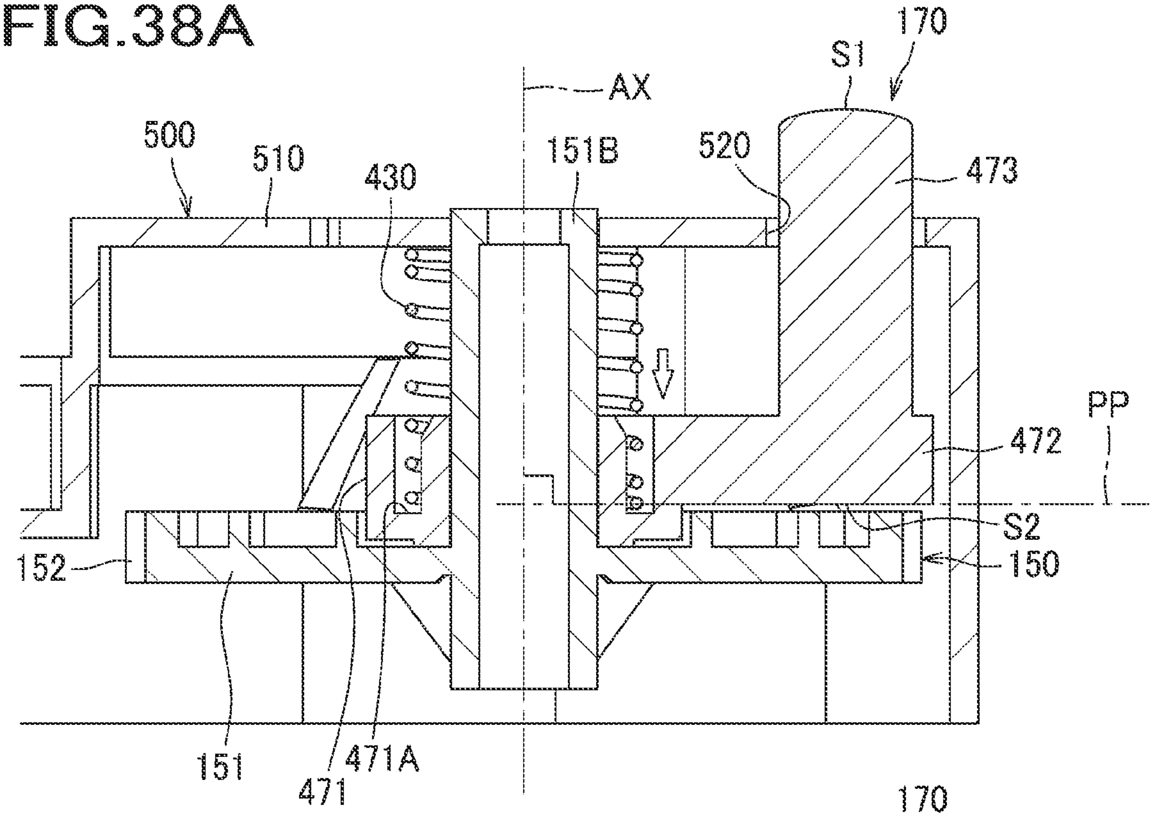
FIG. 38A is a sectional view showing the cam, the cam follower and a first spring, showing a state in which the cam follower is in the no-push position.
Figure 38B:
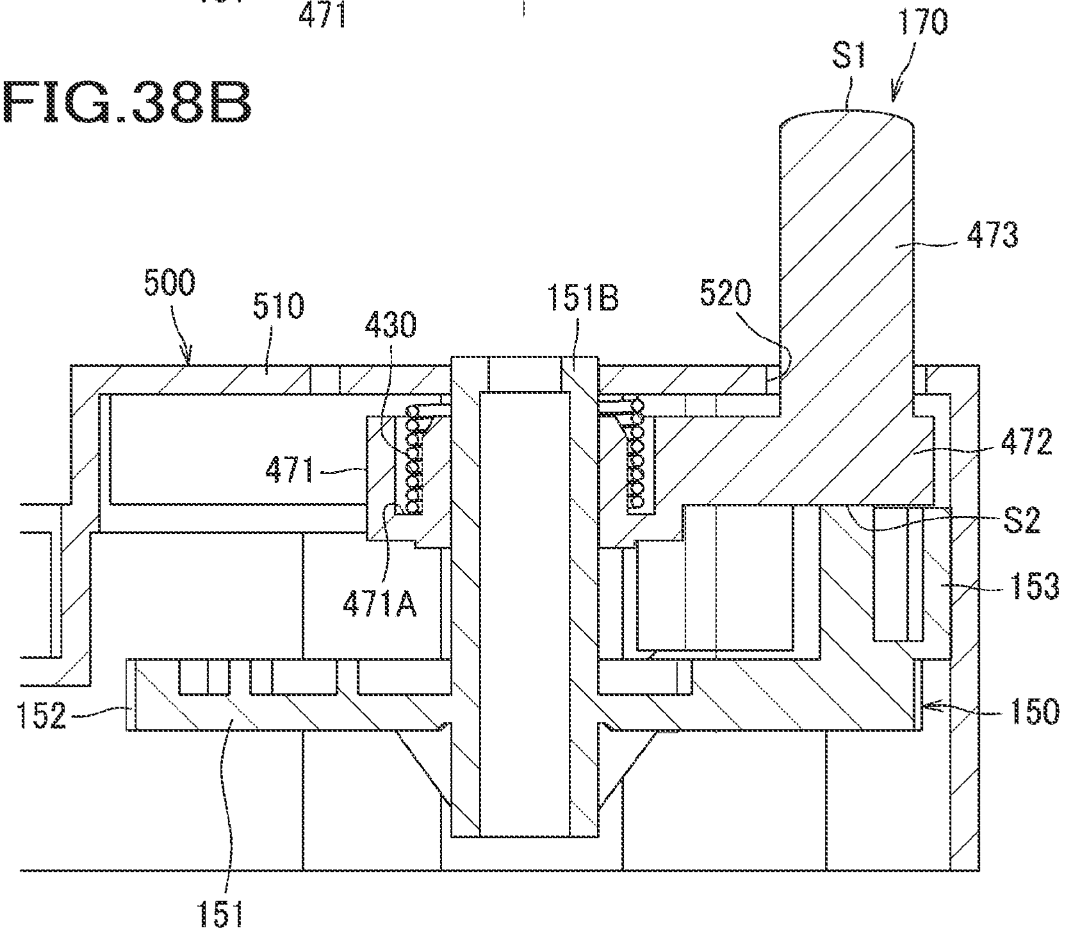
FIG. 38B is a sectional view showing the cam, the cam follower and the first spring, showing a state in which the cam follower is in the push position.

As shown in FIGS. 38A and 38B, the image forming apparatus 1 further comprises a first spring 430. Four first spring 430 are provided one for each the four cam followers 170. The first spring 430 is a spring that bias the cam follower 170 to move from the push position shown in FIG. 38A toward the no-push position shown in FIG. 38B. The first spring 430 is, for example, a compression coil spring. The first spring 430 is located between the first cover 500 and the slide shaft 471 of the corresponding cam follower 170. To be more specific, the first spring 430 is located between the cover wall 510 and the slide shaft 471.

The slide shaft 471 includes a spring-receiving recess 471A. The spring-receiving recess 471A is an annular recess that opens toward an inside surface (facing in the second direction) of the cover wall 510. At least one end portion (lower end in FIGS. 38A and 38B) of the first spring 430 is located in the spring-receiving recess 471A. The spring-receiving recess 471A serves to prevent an undesirable shift in the position of the first spring 430.

As shown in FIG. 31, the image forming apparatus 1 further comprises sensors 4K and 4C. The sensor 4K is a sensor configured to detect a position of the first cam follower 170K, and the sensor 4C is a sensor configured to detect positions of the second cam follower 170Y, the third cam follower 170M, and the fourth cam follower 170C. In the strict sense of the term, what the sensor 4C detects directly is the position of the fourth cam follower 170C only. The positions of the second cam follower 170Y and the third cam follower 170M are indirectly determined based on the result of detection by the sensor 4C.

Each of the sensors 4K and 4C includes a light-emitting element 4P, and light-receptive element 4R. The light-emitting element 4P emits a light beam to be detected. The light-receptive element 4R is located opposite to the light-emitting element 4P to receive the light beam emitted by the light-emitting element 4P.

The sensor 4K is located in such a position that the rib 474 of the first cam follower 170K in the push position is positioned in a space between the light-emitting element 4P and the light-receptive element 4R, and the rib 474 of the first cam follower 170K in the no-push position is positioned out of the space between the light-emitting element 4P and the light-receptive element 4R. Similarly, the sensor 4C is located in such a position that the rib 474 of the fourth cam follower 170C in the push position is positioned in a space between the light-emitting element 4P and the light-receptive element 4R, and the rib 474 of the fourth cam follower 170C in the no-push position is positioned out of the space between the light-emitting element 4P and the light-receptive element 4R.

Accordingly, the light-receptive element 4R of the sensor 4K, 4C fails to receive a light beam when the corresponding cam follower 170 is in the push position because the light beam emitted from the light-emitting element 4P is interrupted by the rib 474 of the cam follower 170 as shown in FIG. 36B (see an arrow); on the other hand, the light-receptive element 4R of the sensor 4K, 4C successfully receives a light beam as shown in FIG. 35B (see an arrow indicated by broken line) when the corresponding cam follower 170 is in the no-push position. The sensor 4K, 4C produces a signal for determining whether the corresponding cam follower 170 is in the push position or in the no-push position by detecting the change in the state of light reception.

When the cam follower 170 is in the push position, the corresponding development cartridge 60 is in the separate position. When the cam follower 170 is in the no-push position, the corresponding development cartridge 60 is in the contact position. Therefore, the sensor 4K, 4C can detect the position of the development cartridge 60, i.e., can produce a signal for determining whether the development cartridge 60 is in the separate position or in the contact position, by detecting the position of the cam follower 170.

The rib 474 of the first cam follower 170K is detectable by the sensor 4K. The rib 474 of the fourth cam follower 170C is detectable by the sensor 4C. In the fifth embodiment, all the four cam followers 170 are common parts having the same shape provided with the rib 474; however, the ribs 474 of the second cam follower 170Y and the third cam follower 170M do not function as a portion to be detected by the sensor 4K or 4C.

As shown in FIG. 31, the slide shaft 471 (first shaft) of each of the cam followers is disposed inside a contour of the corresponding cam 150 as viewed from a direction parallel to the rotation axis AX. Specifically, the slide shaft 471 of the first cam follower 170K is disposed inside a contour of the first cam 150K as viewed from the direction parallel to the rotation axis AX. The slide shaft 471 of the second cam follower 170Y is disposed inside a contour of the second cam 150Y as viewed from the direction parallel to the rotation axis AX. The slide shaft 471 of the third cam follower 170M is disposed inside a contour of the third cam 150M as viewed from the direction parallel to the rotation axis AX. The slide shaft 471 of the fourth cam follower 170C is disposed inside a contour of the fourth cam 150C as viewed from the direction parallel to the rotation axis AX.

Moreover, the pin 473 protruding from the arm 472 (contact arm) of each of the cam followers 170 is disposed inside a contour of the corresponding cam 150 as viewed from a direction parallel to the rotation axis AX. Specifically, the pin 473 of the first cam follower 170K is disposed inside a contour of the first cam 150K as viewed from the direction parallel to the rotation axis AX. The pin 473 of the second cam follower 170Y is disposed inside a contour of the second cam 150Y as viewed from the direction parallel to the rotation axis AX. The pin 473 of the third cam follower 170M is disposed inside a contour of the third cam 150M as viewed from the direction parallel to the rotation axis AX. The pin 473 of the fourth cam follower 170C is disposed inside a contour of the fourth cam 150C as viewed from the direction parallel to the rotation axis AX.

Furthermore, as shown in FIG. 36B, the pushing surface S1 of each of the cam followers 170 (the first cam follower 170K, the second cam follower 170Y, the third cam follower 170M and the fourth cam follower 170C) is located in such a position that orthographic projections of the pushing surface S1 and the contact surface S2 on a picture plane PP (see FIG. 38A) perpendicular to the rotation axis AX overlap each other. For convenience of illustration, the picture plane PP is shown in FIG. 38A as a line containing the contact surface S2 (which is a flat surface perpendicular to the rotation axis AX, in this illustrative non-limiting embodiment), and an orthographic projection of the pushing surface S1 on the picture plane PP intersecting or containing the contact surface S2 is shown in FIG. 36A as overlapping the contact surface S2. Specifically, the pushing surface S1 has a contact spot (see an area in vicinity of a dot depicted in FIG. 36B) contactable with the corresponding development cartridge 60, and orthographic projections of this contact spot of the pushing surface S1 and the contact surface S2 on the picture plane PP perpendicular to the rotation axis AX overlap each other. As can be seen in FIG. 36B, the orthographic projections of the contact spot of the pushing surface S1 and the cam surface 154 overlap each other.

In other words, the pushing surface S1 and the contact surface S2 are so provided as to overlap each other as viewed from a direction parallel to the rotation axis AX. Specifically, the contact spot of the pushing surface S1 that is contactable with the corresponding development cartridge 60 is so provided as to overlap the contact surface S2 as viewed from a direction parallel to the rotation axis AX. The contact spot of the pushing surface S1 that is contactable with the corresponding development cartridge 60 is so provided as to overlap the cam surface 154 as viewed from a direction parallel to the rotation axis AX.

When the image forming apparatus 1 is in a standby state before executing a printing process, all the development cartridges 60 are located in the separate positions. In this situation, as shown in FIGS. 36A and 36B, each cam follower 170 is located in the push position and each arm 472 (contact surface S2) is in contact with the retaining surface 154B of the corresponding cam 150.

When a printing process is executed, the controller 2 switches the first electromagnetic clutch 141A and/or the second electromagnetic clutch 141B into a transmissible state, selectively in accordance with colors of toner to be used for the printing process, to allow the driving force to be transmitted to the cam(s) 150 which is in turn caused to rotate in the first rotation direction R1. Accordingly, the relevant cam follower(s) 170 is guided by the retaining surface(s) 154B and the second guide surface(s) 154C, which slide on the arm(s) 472 in this sequence, until the cam surface(s) 154 gets out of contact with the arm(s) 472, whereby the cam follower(s) 170 slides along the boss(es) 151B from the push position to the no-push position as shown in FIGS. 35A and 35B by the action (biasing force) of the first spring(s) 430 (see FIGS. 38A and 38B), so that the corresponding development cartridge(s) 60 is caused to move from the separate position to the contact position. When the development cartridge(s) 60 moves to the contact position, the controller 2 switches the first electromagnetic clutch 141 and/or the second electromagnetic clutch 141B into a disconnecting state so that the cam(s) 150 is caused to stop rotating.

When a development process by the development roller(s) 61 finishes, the controller 2 switches the first electromagnetic clutch 141A and/or the second electromagnetic clutch 141B into a transmissible state again, to cause the cam(s) 150 to rotate in the first rotation direction R1. Accordingly, the first guide surface(s) 154A of the cam surface(s) 154 comes in contact with the arm(s) 472 of the cam follower(s) 170, and slides on the arm(s) 472 of the cam follower(s) 170 until the retaining surface(s) 154B of the cam surface(s) 154 comes in contact with the arm(s) 472. Accordingly, the cam follower(s) slides along the boss(es) 151B from the no-push position to the push position as shown in FIGS. 36A and 36B, so that the corresponding development cartridge(s) 60 is caused to move from the contact position to the separate position. When the development cartridge(s) 60 moves to the separate position, the controller 2 switches the first electromagnetic clutch 141 and/or the second electromagnetic clutch 142 into the disconnecting state so that the cam(s) 150 is caused to stop rotating.

The cam surface 154 of the second cam 150Y, the cam surface 154 of the third cam 150M, and the cam surface 154 of the fourth cam 150C are configured such that the third cam follower 170M is caused to start moving from the no-push position to the push position at a time after completion of movement of the second cam follower 170Y to the push position. The cam surface 154 of the second cam 150Y, the cam surface 154 of the third cam 150M, and the cam surface 154 of the fourth cam 150C are configured such that the fourth cam follower 170C is caused to start moving from the no-push position to the push position at a time after completion of movement of the third cam follower 170M to the push position.

Further, the cam surface 154 of the second cam 150Y, the cam surface 154 of the third cam 150M, and the cam surface 154 of the fourth cam 150C are configured such that there is a point in time at which the second cam follower 170Y, the third cam follower 170M and the fourth cam follower 170C are positioned in the respective push positions thereof concurrently.

Further, the cam surface 154 of the second cam 150Y, the cam surface 154 of the third cam 150M, and the cam surface 154 of the fourth cam 150C are configured such that motion of the second cam follower 170Y from the push position to the no-push position, motion of the third cam follower 170M from the push position to the no-push position and motion of the fourth cam follower 170C from the push position to the no-push position overlap in time.

Specifically, as shown in FIG. 31, the third cam 150M is configured to rotate in synchronization with the second cam 150Y. The fourth cam 150C is configured to rotate in synchronization with the third cam 150M. More specifically, the image forming apparatus 1 comprises idle gears G1 and G2. The idle gear G1 engages with the gear portion 152 of the second cam 150Y and the gear portion 152 of the third cam 150M. The idle gear G2 engages with the gear portion 152 of the third cam 150M and the gear portion 152 of the fourth cam 150C. Accordingly, when a driving force from the motor M2 is transmitted to the second cam 150Y, the cams 150Y, 150M, 150C rotate concurrently in synchronization with one another.

The length of the retaining surface 154B of the second cams 150Y in a direction of rotation of the second cam 150Y is longer than the length of the retaining surface 154B of the third cam 150M in a direction of rotation of the third cam 150M, and the length of the retaining surface 154B of the third cam 150M in the direction of rotation of the third cam 150M is longer than the length of the retaining surface 154B of the fourth cam 150C in a direction of rotation of the fourth cam 150C. The cams 150Y, 150M and 150C are configured such that the phases of the second guide surfaces 154C thereof coincide substantially with one another, and the phases of the first guide surfaces 154A thereof are shifted from one another. To be more specific, the first guide surface 154A of the third cam 150M is located upstream of the first guide surface 154A of the fourth cam 150C in the first rotation direction R1, and the first guide surface 154A of the second cam 150Y is located upstream of the first guide surface 154A of the third cam 150M in the first rotation direction R1.

Therefore, rotation of the cams 150Y, 150M and 150C in the first rotation direction R1, made when the cam followers 170Y, 170M and 170C are located in the no-push position, first causes the second cam follower 170Y to move from the no-push position to the push position to thereby cause the second development cartridge 60Y to move from the contact position to the separate position, and then causes the third cam follower 170M to move from the no-push position to the push position to thereby cause the third development cartridge 60M to move from the contact position to the separate position, and finally causes the fourth cam follower 170C to move from the no-push position to the push position to thereby cause the fourth development cartridge 60C to move from the contact position to the separate position.

Rotation of the cams 150Y, 150M and 150C in the first rotation direction R1, made when the cam followers 170Y, 170M and 170C are located in the push positions, causes the cam followers 170Y, 170M and 170C to move substantially concurrently from the push positions to the no-push positions, to thereby cause the development cartridges 60Y, 60M and 60C to move substantially concurrently from the separate position to the contact position.

In the image forming apparatus 1 configured according to the fifth embodiment, the following advantageous effects can be achieved.

Since the pushing surface S1 of each cam follower 170 is located in such a position that an orthographic projection thereof on a picture plate PP perpendicular to the rotation axis AX overlaps an orthographic projection of the contact surface S2 on the same picture plane PP, the force received by the contact surface S2 from the cam surface 154 of the corresponding cam 150 can be efficiently utilized as a force for causing the pushing surface S1 to be pressed against the corresponding development cartridge 60.

Moreover, since the pushing surface S1 of each cam follower 170 is located in such a position that orthographic projections of the contact spot (i.e., spot contactable with the corresponding development cartridge 60) of the pushing surface S1 and the contact surface S2 on the picture plane PP overlap each other, the force received by the contact surface S2 from the cam surface 154 of the corresponding cam 150 can be more efficiently utilized as a force for causing the pushing surface S1 to be pressed against the development cartridge 60.

Since the cam follower 170 is configured to include the slide shaft 471 engaged with the boss 151B extending in a direction parallel to the rotation axis AX, the arm 472, and the pin 473 having the pushing surface S1 which overlaps the contact surface S2, the cam follower 170 can be located to overlap the corresponding cam 150 as viewed from a direction parallel to the rotation axis AX. Accordingly, the cam follower 170 and the corresponding cam 150 can be arranged in a compact manner.

Since the cam follower 170 comprise the rib 474 configured to be detectable by the sensor 4K, 4C, the position of the development cartridge 60 can be determined from the position of the cam follower 170 which is pressed against the development cartridge 60.

Since the first cover 500 comprising a pair of stoppers 530 is provided, the cam follower 170 can be restrained from rotating about the boss 151B of the cam 150.

The cam follower 170 can be biased toward the no-push position in a simple configuration with the first spring 430 located between the first cover 500 and the slide shaft 471 of the cam follower 170.

Since the arm 472 of the cam follower 170 has a shape of a plate, the contact area of the contact surface S2 of the arm 472 contactable with the corresponding cam 150 can be made larger. Accordingly, for example, the wearing away of the cam follower 170 and the cam 150 can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiments, the second cam 150Y comprises the second protrusion 157B, 257B, and the fourth cam 150C comprises the third protrusion 157C, 257C; however, various other configurations may be feasible. Specifically, if one of the second cam, the third cam and the fourth cam comprises a second protrusion protruding parallel to the rotation axis, and another of the second cam, the third cam and the fourth cam comprises a third protrusion protruding parallel to the rotation axis, the same advantages can be achieved. For example, the third cam may comprise a third protrusion. As another alternative, for example, the fourth cam and the second cam may comprise a second protrusion and a third protrusion, respectively.

In the above-described embodiments, the mechanism for switching between transmission of a driving force to the development rollers 61Y, 61M and 61C and disconnection of the transmission is different from the mechanism for switching between transmission of a driving force to the first development roller 61K and disconnection of the transmission; however the mechanisms do not have to be different from each other. For example, the image forming apparatus may be configured to comprise switching lever and a planetary gear train for each cam, which comprises a switching protrusion for causing the corresponding switching lever to move between the first transmission position and the first disconnection position.

The mechanism for switching between transmission of a driving force to the development rollers and disconnection of the transmission may alternatively be configured to comprise a motor for causing the development roller to rotate, and a clutch for switching between transmission of a driving force from the motor to the development roller and disconnection of the transmission. Such a mechanism for switching between transmission and disconnection with the motor and the clutch may be provided for each development roller.

In the above-described embodiments, the first development roller 61K is caused to rotate by the first motor M1, and the second development roller 61Y, the third development roller 61M, and the fourth development roller 61C are caused to rotate by the third motor M3; however, all the four development rollers may be caused to rotate by one and the same motor. In other words, a single motor may be used as the first motor and the third motor, for causing all the development rollers to rotate. In this alternative configuration, as well, it may be preferable that the motor for causing the development roller to rotate and the motor for causing the cam to rotate be provided individually.

In the above-described embodiments, examples of configuration for restraining the cam follower 170 on the rotation axis AX of the cam 150 (about the second shaft 159) as illustrated includes: the stopper 179 (consisting of two bars) in which the restraint arm 173 of the cam follower 170 is held; and the stopper 279 (consisting of two bars) in which the contact arm 272 of the cam follower 170 is held; i.e., the restraint arm 173 or the contact arm 272 of the cam follower 170 is held between the two bars of the stopper 179, 279. However, in cases where the cam is rotatable only in one direction, a stopper consisting of a single bar may be used instead, located in such a position that the restraint arm or the contact arm contacts the bar whereby the cam follower is restrained from rotating. As another alternative, a portion of the first shaft 371 of the cam follower 170 in which the shaft 359 is engaged and a portion of the shaft 359 on which the portion of the first shaft 371 is slidably supported may be shaped so as not to rotate on the rotation axis AX of the cam 150 for example, those engaged portions may have a non-circular cross section, e.g., a substantially quadrilateral in cross section as shown in FIG. 30B, so that the cam follower 170 is restrained from rotating. The cross section of a portion of the first shaft of the cam follower in which a corresponding shaft is engaged and a portion of the corresponding shaft on which the portion of the first shaft is slidably supported may, for example, have a shape of a letter D, or an oval or elliptic form.

In the above-described embodiments, an angle θ2 of the second guide surface 154C with respect to a plane PP perpendicular to the rotation axis AX is greater than an angle θ1 of the first guide surface 154A with respect to the plane PP perpendicular to the rotation axis AX; it is however to be understood that the angle θ2 of the second guide surface 154C with respect to the plane PP perpendicular to the rotation axis AX may be equal to the angle θ1 of the first guide surface 154A with respect to the plane PP perpendicular to the rotation axis AX.

In the above-described embodiments, the first protrusion 157A has a cylindrical surface contactable with the first swingable piece 220A; it is however to be understood that the first protrusion may be configured to have a shape of a rib, or the like. The same applies to the second protrusion and the third protrusion.

In the above-described embodiments, the times at which the cam followers 170Y, 170M and 170C are caused to move from the respective no-push positions to the respective push positions are shifted from one another; it is however to be understood that the times at which the cam followers 170Y, 170M and 170C may be set to coincide with each other; the times at which force is applied to the cam followers 170Y, 170M an 170C can be shifted so as not to coincide with each other. An example of this alternative configuration may be such that any one of the second cam, the third cam and the fourth cam comprises a protrusion, and the translation plate moving from the first position to the second position when the second cam follower, the third cam follower and the fourth cam follower are in their push positions comes in contact with the protrusion, to cause the second cam, the third cam and the fourth cam to rotate whereby the second cam follower, the third cam follower and the fourth cam follower is caused to be positioned in the no-push position.

In the above-described embodiments, the motions of the cam followers 170Y, 170M and 170C from their push positions to their no-push positions overlap in time; it is however to be understood that the times at which the cam followers are caused to move from their push positions to their no-push positions may be shifted so as not to coincide with each other, and the second cam follower, the third cam follower and the fourth cam follower may be caused to move in this sequence from the push position to the no-push position.

In the above-described embodiments, when the translational motion of the translation plate 200 from the second position to the first position causes the first swingable piece 220A to contact the first protrusion 157A, the first swingable piece 220A retreats; it is however to be understood that when the translational motion of the translation plate from the second position to the first position does not cause the first swingable piece to contact the first protrusion, the first swingable piece may not retreat. The same goes for the second swingable piece and the third swingable piece.

In the above-described embodiments, the translation 200 comprises the first swingable piece 220A (first contact piece and the third contact piece) contactable with the first protrusion 157A; it is however to be understood that a portion of the translation plate contactable with the first protrusion may be formed, for example, as an integral part of the translation plate. The same goes for the second contact piece.

Figure 39:
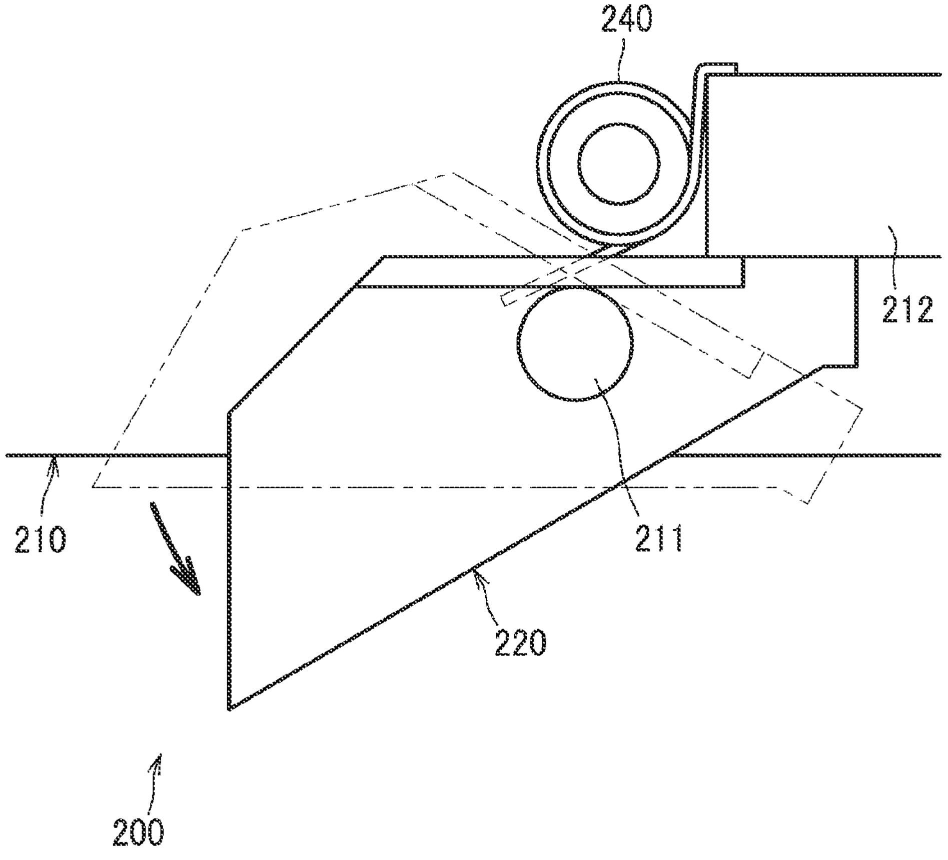
FIG. 39 is a diagram showing a modified example of a second spring.

In the above-described embodiments, the spring 230 (second spring) that biases the swingable piece 220 (contact piece) toward the acting position is configured as an extension spring; it is however to be understood that a second coil spring may, for example, be a torsion coil spring as the spring 240 shown in FIG. 39. With the spring 240 configured as a torsion coil spring, the spring 240 can be arranged in a compact manner, more space-efficient in comparison with the extension coil spring; therefore, the translation plate 200 can be made smaller in size.

In the above-described embodiments, with the cam surface 154 and the switching protrusion 156 located on the same side of the first cam 150K as shown in FIG. 5A, the switching protrusion 156 is located on the flange portion 155; it is however to be understood that the switching protrusion may be located for example on the disk portion 151. In the above-described embodiments, with the cam surface 154 and the first protrusion 257 located on the same side of the first cam 150K, the first protrusion 257 is located on the flange portion 255; it is however to be understood that the first protrusion 257 may be located for example on the disk portion 151.

In the above-described embodiments, the switching protrusion 156 is located at least partially within bounds confined by two straight lines L1 and L2 of a sector which are drawn from the rotation axis AX of the first cam 150K through the two ends E1 and E2 of the retaining surface 154B, as shown in FIG. 7B; it is however to be understood that the switching protrusion may be located outside the bounds confined by the straight lines L1 and L2 of the sector which are drawn from the rotation axis AX through the two ends E1 and E2 of the retaining surface 154B. In the above-described embodiments, the first protrusion 257 is located at least partially within bounds confined by two straight lines L1 and L2 of a sector which are drawn from the rotation axis AX of the first cam 150K through the two ends E1 and E2 of the retaining surface 154B; it is however to be understood that the first protrusion may be located outside the bounds confined by the straight lines L1 and L2 of the sector which are drawn from the rotation axis through the two ends E1 and E2 of the retaining surface 154B.

In the above-described embodiments, the first shaft 171 of the cam follower 170 is slidably engaged with the second shaft 159 by which the cam 150 is rotatably supported; it is however to be understood that the shaft by which the first shaft is slidably supported may be a separate shaft provided independently of the second shaft.

In the above-described embodiments, the arm 472 of the cam follower 170 is configured to have a shape of a plate; it is however to be understood that the arm may be configured, for example, to have a shape of a bar.

In the above-described embodiments, the stopper 530 is configured to have a shape of a wall; it is however to be understood that the stopper may be configured to have a shape of a bar. In the above-described embodiments, the stoppers 530 are formed integrally with the cover wall 510; it is however to be understood that such a stopper may be a member fixed to the cover wall. In cases where the cam is rotatable only in one direction, a single-part stopper may be used instead of a pair of stoppers between which the arm is held, and located in such a position that the arm contacts the stopper whereby the cam follower is restrained from rotating. The first cover may not comprise any stopper, but instead, a portion of the boss of the cam on which the slide shaft of the cam follower is slidably supported and a portion of the slide shaft of the cam follower in which boss of the cam in which engaged may be shaped to have such a cross-sectional shape as a triangle, quadrilateral, a letter of D, an oval or elliptic form, so that the cam follower is restrained from rotating.

In the above-described embodiments, the first spring 430 is configured as a compression coil spring; it is however to be understood that the first spring may be any other type of spring, such as an extension spring, etc. The image forming apparatus may not include the first cover as illustrated in the above-described embodiments.

In the above-described embodiments, the cam follower 170 comprises a rib 474 configured to be detectable by the sensor 4K, 4C; it is however to be understood that the cam follower may not comprise any such rib as detectable by the sensor. In this alternative configuration, the image forming apparatus may not comprise a sensor configured to detect the position of the cam follower.

In the above-described embodiments, the contact surface S2 of the cam follower 170 is provided on the arm 472; it is however to be understood that the cam follower may be configured to have a pin, extending from the arm in both directions parallel to the rotation axis, of which one end has a pushing surface and the other end has a contact surface.

In the above-described embodiments, the cam follower 170 is slidably supported by the cam 150; it is however to be understood that the cam follower may be slidably supported by another member. In such alternative configuration, the cam follower may not necessarily be configured to comprise a slide shaft, an arm, and a pin.

In the above-described embodiments, orthographic projections of the contact spot (contactable with the development cartridge 60) of the pushing surface S1 and the contact surface S2 on a picture plane PP perpendicular to the rotation axis AX overlap each other; it is however to be understood that as long as the orthographic projection of the pushing surface on the picture plane overlaps the orthographic projection of the contact surface on the picture plane, the orthographic projection of the contact spot on the picture plane may not overlap the orthographic projection on the picture plane.

In the above-described embodiment, the image forming apparatus 1 is a multicolor printer comprising a plurality of photosensitive drums 50; it is however to be understood that the image forming apparatus may be a monochrome printer comprising only one photosensitive drum. Furthermore, the image forming apparatus may be a photocopier, a multifunction printer, or the like.

The image forming apparatus may not comprise a mechanism for causing a cam follower to move to a no-push position in synchronization with the operation of opening a second cover. In other words, the image forming apparatus may not comprise a translation plate.

Each element explained above in connection with the embodiments and modified examples may be combined where appropriate for practical implementation.

What is claimed is:

1. An image forming apparatus, comprising:

a photosensitive drum;

a development cartridge including a development roller, the development cartridge being movable between a contact position in which the development roller is in contact with the photosensitive drum and a separate position in which the development roller is separate from the photosensitive drum;

a cam having a cam surface, the cam being configured to rotate to thereby cause the development cartridge to move between the contact position and the separate position; and a cam follower including a shaft supported slidably in directions parallel to a rotation axis of the cam, and a contact arm extending from the shaft to contact the cam surface of the cam, the cam follower being configured to be caused to slide, as the cam rotates, between a push position in which the development cartridge is pushed by the cam follower and positioned in the separate position and a no-push position in which the development cartridge is positioned in the contact position, wherein a projection of the shaft onto the cam in a direction parallel to the rotation axis is positioned inside a contour of the cam.

2. The image forming apparatus according to claim 1, wherein the shaft comprises a first shaft, the image forming apparatus further comprising a second shaft by which the cam is rotatably supported, wherein the first shaft is engaged with the second shaft, slidably along the second shaft whereby the cam follower is slidable between the push position and the no-push position.

3. The image forming apparatus according to claim 2, wherein the cam follower is restrained from rotating about the rotation axis of the cam.

4. The image forming apparatus according to claim 3, further comprising a stopper by which the first cam follower is restrained from rotating about the rotation axis of the cam, wherein the cam follower further includes a restraint arm extending from the first shaft, the restraint arm being provided independently of the contact arm and held in the stopper.

5. The image forming apparatus according to claim 3, further comprising a stopper by which the cam follower is restrained from rotating about the rotation axis of the cam, wherein the contact arm is held in the stopper.

6. The image forming apparatus according to claim 2, wherein the cam surface of the cam includes a first cam surface, and a second cam surface symmetric to the first cam surface with respect to the rotation axis of the cam, wherein the contact arm comprises:

a first contact arm extending from the shaft, the first contact arm being contactable with the first cam surface and the second cam surface alternately; and a second contact arm extending from the shaft in a direction opposite to a direction in which the first contact arm extends, the second contact arm being contactable with the second cam surface and the first cam surface alternately.

7. The image forming apparatus according to claim 1, further comprising:

a housing having an opening;

a cover movable between a closing position in which the opening is closed and an open position in which the opening is uncovered; and a translation plate configured to make a translational motion synchronized with the cover's motion between the closing position and the open position, and thereby caused to move between a first position in which the translation plate is located when the cover is in the closing position and a second position in which the translation plate is located when the cover is in the open position, wherein the translational motion of the translation plate from the first position to the second position, made when the cam follower is positioned in the push position, causes the cam to rotate and thereby causes the cam follower to be moved and positioned in the no-push position.

8. The image forming apparatus according to claim 7, wherein the cam includes a protrusion protruding parallel to the rotation axis, wherein the translation plate includes a first contact piece that contacts the protrusion when the cam follower is positioned in the push position and the translation plate moves from the first position to the second position, and wherein when the contact piece of the translation plate moving from the first position to the second position contacts the protrusion, the cam is caused to rotate, whereby the cam follower is positioned in the no-push position.

9. The image forming apparatus according to claim 8, wherein the contact piece has a contact surface that contacts the protrusion when the cam follower is positioned in the push position and the translation plate moves from the first position to the second position.

10. The image forming apparatus according to claim 8, wherein the contact piece has a second contact surface that is contactable with the protrusion when the translation plate moves from the second position to the first position, and wherein when the translational motion of the translation plate from the second position to the first position causes the second contact surface to contact the protrusion, the contact piece retreats to prevent the cam from rotating.

11. The image forming apparatus according to claim 8, wherein the protrusion has a cylindrical surface contactable with the contact piece.

12. The image forming apparatus according to claim 1, further comprising a controller configured to cause the cam to rotate in a first rotation direction to move the development cartridge between the contact position and the separate position, wherein the cam is an end cam, and the cam surface includes a first guide surface configured to cause the cam follower to move from the no-push position to the push position when the cam rotates in the first rotation direction, and a second guide surface configured to cause the cam follower to move from the push position to the no-push position when the cam rotates in the first rotation direction, and wherein an angle of the second guide surface with respect to a plane perpendicular to the rotation axis is greater than an angle of the first guide surface with respect to the plane perpendicular to the rotation axis.

13. The image forming apparatus according to claim 1, further comprising:

a second photosensitive drum;

a third photosensitive drum located downstream of the second photosensitive drum in a sheet conveyance direction;

a fourth photosensitive drum located downstream of the third photosensitive drum in the sheet conveyance direction;

a second development cartridge including a second development roller, the second development cartridge being movable between a contact position in which the second development roller is in contact with the second photosensitive drum and a separate position in which the second development roller is separate from the second photosensitive drum;

a third development cartridge including a third development roller, the third development cartridge being movable between a contact position in which the third development roller is in contact with the third photosensitive drum and a separate position in which the third development roller is separate from the third photosensitive drum;

a fourth development cartridge including a fourth development roller, the fourth development cartridge being movable between a contact position in which the fourth development roller is in contact with the fourth photosensitive drum and a separate position in which the fourth development roller is separate from the fourth photosensitive drum;

a second cam having a cam surface, the second cam being configured to rotate to thereby cause the second development cartridge to move between the contact position and the separate position;

a third cam having a cam surface, the third cam being configured to rotate in synchronization with the second cam to thereby cause the third development cartridge to move between the contact position and the separate position;

a fourth cam having a cam surface, the fourth cam being configured to rotate in synchronization with the second cam and the third cam to thereby cause the fourth development cartridge to move between the contact position and the separate position;

a second cam follower including a shaft supported slidably in the directions parallel to the rotation axis, and a contact arm extending from the shaft of the second cam follower to contact the cam surface of the second cam, the second cam follower being configured to be caused to slide, as the second cam rotates, between a push position in which the second development cartridge is pushed by the second cam follower and positioned in the separate position and a no-push position in which the second development cartridge is positioned in the contact position;

a third cam follower including a shaft supported slidably in the directions parallel to the rotation axis, and a contact arm extending from the shaft of the third cam follower to contact the cam surface of the third cam, the third cam follower being configured to be caused to slide, as the third cam rotates, between a push position in which the third development cartridge is pushed by the third cam follower and positioned in the separate position and a no-push position in which the third development cartridge is positioned in the contact position; and a fourth cam follower including a shaft supported slidably in the directions parallel to the rotation axis, and a contact arm extending from the shaft of the fourth cam follower to contact the cam surface of the fourth cam, the fourth cam follower being configured to be caused to slide, as the fourth cam rotates, between a push position in which the fourth development cartridge is pushed by the fourth cam follower and positioned in the separate position and a no-push position in which the fourth development cartridge is positioned in the contact position, wherein a projection of the shaft of the second cam follower onto the second cam in the direction parallel to the rotation axis is positioned inside a contour of the second cam, a projection of the shaft of the third cam follower onto the third cam in the direction parallel to the rotation axis is positioned inside a contour of the third cam, and a projection of the shaft of the fourth cam follower onto the fourth cam in the direction parallel to the rotation axis is positioned inside a contour of the fourth cam.

14. The image forming apparatus according to claim 13, further comprising:

a housing having an opening;

a cover movable between a closing position in which the opening is closed and an open position in which the opening is uncovered; and a translation plate configured to make a translational motion synchronized with the cover's motion between the closing position and the open position, and thereby caused to move between a first position in which the translation plate is located when the cover is in the closing position and a second position in which the translation plate is located when the cover is in the open position, wherein the translational motion of the translation plate from the first position to the second position, made when at least one of the second cam follower, the third cam follower and the fourth cam follower is positioned in the push position, causes the second cam, the third cam and the fourth cam to rotate and thereby causes the second cam follower, the third cam follower and the fourth cam follower to be positioned in the respective no-push positions thereof.

15. The image forming apparatus according to claim 14, wherein the second cam, the third cam and the fourth cam are end cams, wherein the cam surfaces of the second cam, the third cam and the fourth cam are configured such that:

the third cam follower is caused to start moving from the no-push position to the push position at a time after the second cam follower reaches the push position;

the fourth cam follower is caused to start moving from the no-push position to the push position at a time after of the third cam follower reaches the push position; and there is a point in time at which the second cam follower, the third cam follower and the fourth cam follower are positioned in the respective push positions thereof concurrently.

16. The image forming apparatus according to claim 15, wherein one of the second cam, the third cam and the fourth cam comprises a first protrusion protruding parallel to the rotation axis, and another of the second cam, the third cam and the fourth cam comprises a second protrusion protruding parallel to the rotation axis, wherein the translation plate comprises:

a first contact piece contactable with the first protrusion during the translational motion of the translation plate from the first position to the second position, made when the cam follower corresponding to the cam comprising the first protrusion is in the push position, which first contact piece, when caused to contact the first protrusion by the translational motion of the translation plate, causes the second cam, the third cam and the fourth cam to rotate; and a second contact piece contactable with the second protrusion during the translational motion of the translation plate from the first position to the second position, which second contact piece, when caused to contact the second protrusion by the translational motion of the translation plate, causes the second cam, the third cam and the fourth cam to rotate, to thereby cause the second cam follower, the third cam follower and the fourth cam follower to be positioned in the respective no-push positions thereof, wherein when the translational motion of the translation plate from the first position to the second position causes the first contact piece and the second contact piece to contact the first protrusion and the second protrusion, respectively, the second contact piece is caused to contact the second protrusion at a time after the first contact piece is caused to contact the first protrusion.

17. The image forming apparatus according to claim 16, wherein the translation plate is configured such that the second contact piece is caused to contact the second protrusion, at a time after the first contact piece is caused to separate from the first protrusion, by the translational motion of the translation plate from the first position to the second position.

18. The image forming apparatus according to claim 15, further comprising a controller configured to cause the second cam, the third cam and the fourth cam to rotate in a first rotation direction to move the second development cartridge, the third development cartridge and the fourth development cartridge between the respective contact positions and the respective separate positions, wherein the translational motion of the translation plate from the first position to the second position, made when at least the second cam follower is positioned in the push position, causes the second cam, the third cam and the fourth cam to rotate in a second rotation direction opposite to the first rotation direction and thereby causes the second cam follower, the third cam follower and the fourth cam follower to be positioned in the respective no-push positions thereof.

19. The image forming apparatus according to claim 15, wherein the cam surfaces of the second cam, the third cam and the fourth cam are configured such that motion of the second cam follower from the push position to the no-push position, motion of the third cam follower from the push position to the no-push position and motion of the fourth cam follower from the push position to the no-push position overlap in time.

20. The image forming apparatus according to claim 14, further comprising:

a motor that drives the second development roller, the third development roller and the fourth development roller;

an input gear that receives a driving force derived from the motor;

an output gear that transmits the driving force to the second development roller, the third development roller and the fourth development roller;

a movable gear that engages with the input gear, and is movable between a transmission position in which the movable gear engages with the output gear and a disconnection position in which the movable gear is disengaged from the output gear; and a switching cam configured to rotate in synchronization with the second cam to thereby cause the movable gear to move between the transmission position and the disconnection position.

21. The image forming apparatus according to claim 20, wherein the switching cam is configured such that the movable gear is caused to move to the transmission position at a time before the second development cartridge reaches the contact position, and to move to the disconnection position at a time after the fourth development cartridge reaches the separate position.

22. The image forming apparatus according to claim 1, wherein the cam follower comprises a pushing surface that pushes the west development cartridge, and a contact surface that contacts the cam surface, and wherein orthographic projections of the pushing surface and the contact surface on a picture plane perpendicular to the rotation axis overlap each other.

23. The image forming apparatus according to claim 22, wherein the pushing surface comprises a contact spot contactable with the first development cartridge, and orthographic projections of the contact spot of the pushing surface and the contact surface on the picture plane overlap each other.

24. The image forming apparatus according to claim 22, wherein the first cam includes a boss extending in a direction parallel to the rotation axis, and wherein the cam follower comprises:

a slide shaft that is engaged with the boss, slidably along the boss in directions parallel to the rotation axis;

an arm extending from the slide shaft perpendicularly to the rotation axis; and a pin protruding from the arm in the direction parallel to the rotation axis, the pin having the pushing surface.

25. The image forming apparatus according to claim 24, wherein the contact surface is provided on a side of the arm facing in a direction parallel to the rotation axis, and the pin protrudes from another side of the arm opposite to the side on which the contact surface is provided.

26. The image forming apparatus according to claim 25, wherein the arm has a shape of a plate.

27. The image forming apparatus according to claim 24, further comprising a sensor configured to detect a position of the cam follower, wherein the cam follower further comprises a rib extending from the slide shaft perpendicularly to the rotation axis, in a direction different from a direction in which the arm extends from the slide shaft, the rib being configured to be detectable by the sensor.

28. The image forming apparatus according to claim 24, further comprising a cover with which at least part of the cam and at least part of the cam follower are covered, wherein the cover comprises a pair of stoppers extending toward the cam, between which the arm is located.

29. The image forming apparatus according to claim 24, further comprising:

a cover with which at least part of the cam and at least part of the cam follower are covered; and a spring located between the cover and the slide shaft to bias the cam follower toward the no-push position.

30. The image forming apparatus according to claim 22, further comprising:

a housing having an opening;

a cover movable between a closing position in which the opening is closed and an open position in which the opening is uncovered; and a translation plate configured to make a translational motion synchronized with the cover's motion between the closing position and the open position, and thereby caused to move between a first position in which the translation plate is located when the cover is in the closing position and a second position in which the translation plate is located when the cover is in the open position, wherein the cam includes a protrusion protruding parallel to the rotation axis, wherein the translation plate comprises:

a contact piece that is contactable with the protrusion during the translational motion of the translation plate between the first position and the second position, made when the cam follower is positioned in the push position, the contact piece being swingable between an acting position and a retreating position; and a spring configured to bias the contact piece toward the acting position, wherein when the translational motion of the translation plate from the first position to the second position causes the contact piece to contact the protrusion, the cam is caused to rotate, whereby the cam follower is positioned in the no-push position, wherein when the translational motion of the translation plate from the second position to the first position causes the contact piece to contact the protrusion, the contact piece is caused to retreat from the acting position to the retreating position, whereby the cam is prevented from rotating.

31. The image forming apparatus according to claim 30, wherein the spring is a torsion coil spring.

* * * * *